United States Patent
Wu et al.

(10) Patent No.: US 12,016,048 B2
(45) Date of Patent: Jun. 18, 2024

(54) CSI MEASUREMENT METHOD AND APPARATUS

(71) Applicant: HUAWEI TECHNOLOGIES CO., LTD., Shenzhen (CN)

(72) Inventors: Ye Wu, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 17/488,838

(22) Filed: Sep. 29, 2021

(65) Prior Publication Data

US 2022/0022196 A1    Jan. 20, 2022

Related U.S. Application Data

(63) Continuation of application No. PCT/CN2020/083071, filed on Apr. 2, 2020.

(30) Foreign Application Priority Data

Apr. 3, 2019 (CN) .......................... 201910267620.4

(51) Int. Cl.
  *H04W 72/08* (2009.01)
  *H04L 5/00* (2006.01)
  (Continued)

(52) U.S. Cl.
  CPC ......... *H04W 72/542* (2023.01); *H04L 5/0051* (2013.01); *H04W 72/0446* (2013.01); *H04W 72/0453* (2013.01); *H04W 76/28* (2018.02)

(58) Field of Classification Search
  CPC ............... H04W 72/542; H04W 76/28; H04W 72/0446; H04W 72/0453; H04W 72/543;
  (Continued)

(56) References Cited

U.S. PATENT DOCUMENTS

2017/0250740 A1\*  8/2017  Liang ................... H04L 5/0007
2018/0205440 A1   7/2018  Enescu et al.
(Continued)

FOREIGN PATENT DOCUMENTS

CN        101540631 A      9/2009
CN        102223726 A     10/2011
(Continued)

OTHER PUBLICATIONS

Further discussion on remaining issues on SRS France, Oct. 8, 2017 (Year: 2017).\*

(Continued)

*Primary Examiner* — Mewale A Ambaye
(74) *Attorney, Agent, or Firm* — HAUPTMAN HAM, LLP

(57) ABSTRACT

This application provides a CSI measurement method and apparatus. In the method, a terminal may send, to a network device, a first RS that occupies a plurality of frequency domain resource segments in one time domain unit, where the plurality of frequency domain resource segments are discontinuously distributed on a frequency band of the terminal, and the network device receives the first RS on a corresponding frequency domain resource segment, and measures CSI based on the first RS. Currently, to avoid channel aging, a method is to shorten an SRS periodicity. Because frequency domain resources occupied by the SRS are continuously distributed on an entire frequency band, this method leads to a waste of time-frequency resources. However, the first RS in this application is discontinuously distributed on a frequency band of the terminal, and a relatively small quantity of time-frequency resources are occupied.

20 Claims, 38 Drawing Sheets

(51) Int. Cl.
*H04W 72/0446* (2023.01)
*H04W 72/0453* (2023.01)
*H04W 72/542* (2023.01)
*H04W 76/28* (2018.01)

(58) Field of Classification Search
CPC .............. H04W 36/0083; H04W 52/02; H04L 5/0051; H04L 5/0023; H04L 5/001; H04L 5/0041; H04L 5/0052; H04L 5/0094
See application file for complete search history.

(56) References Cited

U.S. PATENT DOCUMENTS

| | | | | |
|---|---|---|---|---|
| 2021/0297217 | A1* | 9/2021 | Xu | H04L 5/0051 |
| 2021/0360616 | A1* | 11/2021 | Yi | H04L 5/0012 |
| 2021/0376894 | A1* | 12/2021 | Cha | H04B 7/0695 |
| 2022/0014298 | A1* | 1/2022 | Ibrahim | H04B 17/309 |

FOREIGN PATENT DOCUMENTS

| | | |
|---|---|---|
| CN | 102461052 A | 5/2012 |
| CN | 108631847 A | 10/2018 |
| CN | 108809454 A | 11/2018 |
| CN | 109391395 A | 2/2019 |
| WO | 2017050155 A1 | 3/2017 |

OTHER PUBLICATIONS

Chinese Office Action issued in corresponding Chinese Application No. 201910267620.4, dated Mar. 3, 2022, pp. 1-13.
ETRI, RE mapping for PUCCH of 1 or 2 bits, 3GPP TSG RAN WG1 Meeting NR#3 Nagoya, Japan, Sep. 18-21, 2017, R1-1715764, 3 pages.
Chinese Office Action issued in corresponding Chinese Application No. 201910267620.4, dated Mar. 15, 2021, pp. 1-9.
Catt: "Further discussion on remaining issues on SRS", 3GPP Draft; R1-1717820, Oct. 8, 2017, XP051341005, total 4 pages.
Huawei et al: "UL beam management", 3GPP Draft; R1-1712223, Aug. 20, 2017, XP051315040, total 4 pages.
European Search Report issued in corresponding European Application No. 20783681.8, dated Apr. 22, 2022, pp. 1-18.
3GPP TSG-RAN WG1 #88, R1-1703178, On the CSI-RS configurations for NR CSI acquisition,Nokia, Alcatel-Lucent Shanghai Bell ,Athens, Greece Feb. 13-17, 2017,total 4 pages.
Chinese Notice of Allowance issued in corresponding Chinese Application No. 201910267620.4, dated Nov. 4, 2022, pp. 1-4.

* cited by examiner

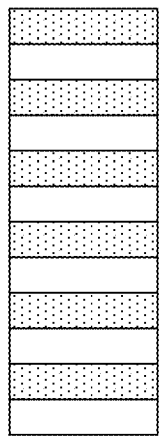
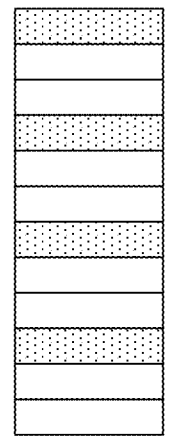
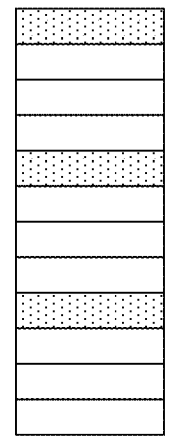
Comb 2  
FIG. 3(a)
Comb 3  
FIG. 3(b)
Comb 4  
FIG. 3(c)
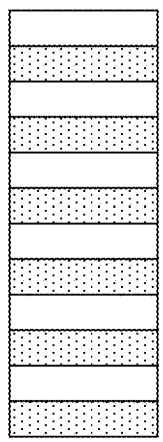
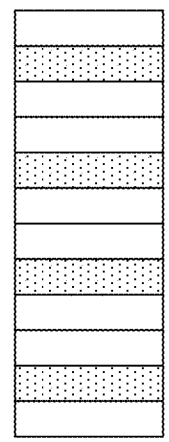
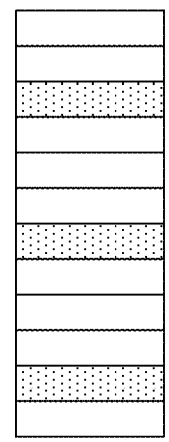
Comb 2  
FIG. 3(d)
Comb 3  
FIG. 3(e)
Comb 4  
FIG. 3(f)
 Frequency-domain unit that carries a signal or data
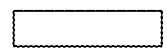 Frequency-domain unit that does not carry a signal or data

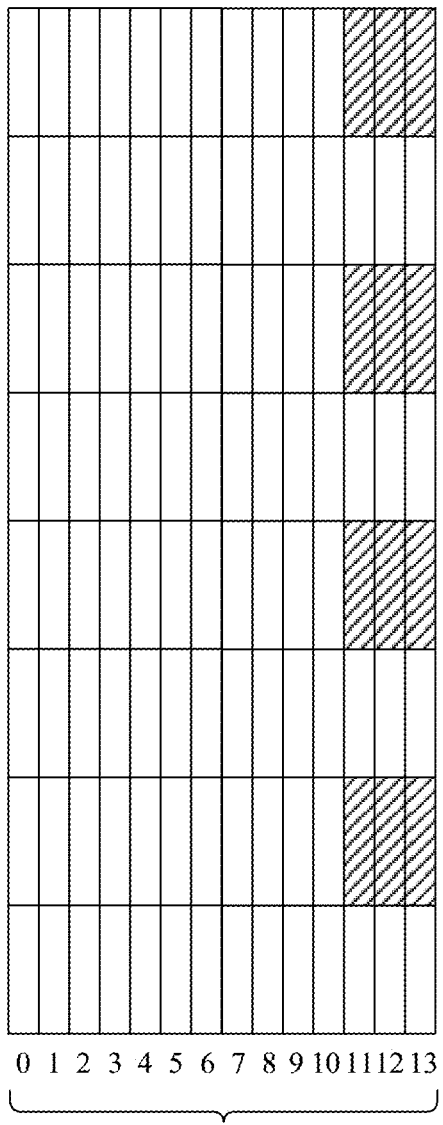 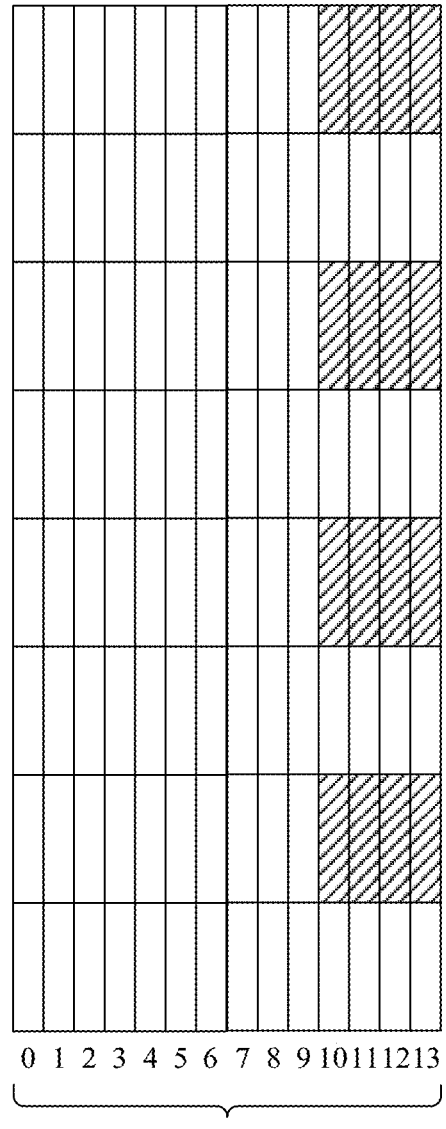
FIG. 9(c)
FIG. 9(d)

24 subcarriers or a frequency domain width of 2 PRBs

CSI MEASUREMENT METHOD AND APPARATUS

CROSS-REFERENCE TO RELATED APPLICATIONS

This application is a continuation of International Application No. PCT/CN2020/083071, filed on Apr. 2, 2020, which claims priority to Chinese Patent Application No. 201910267620.4, filed on Apr. 3, 2019. The disclosures of the aforementioned applications are hereby incorporated by reference in their entireties.

TECHNICAL FIELD

This application relates to the field of communication technologies, and in particular, to a channel state information (channel state information, CSI for short) measurement method and apparatus.

BACKGROUND

In a current technology, a terminal may send a sounding reference signal (sounding reference signal, SRS for short) to a base station, so that the base station obtains uplink CSI by using the received SRS, determines downlink CSI based on the uplink CSI, and further determines a precoding matrix based on the downlink CSI. After precoding a physical downlink shared channel (physical downlink shared channel, PDSCH for short) based on the precoding matrix, the base station sends the precoded physical downlink shared channel to the terminal.

In a case, the terminal may periodically send the SRS. Assuming that a sending periodicity of the SRS is x milliseconds (ms), and a preparation time for the base station to send the PDSCH is y ms, as shown in FIG. 1, a maximum interval between a time for the base station to send the PDSCH and a time for the base station to receive the SRS is x+y ms. In a terminal mobility (mobility) scenario, because a channel between a terminal and a base station changes rapidly, the base station may obtain uplink CSI by measuring a received SRS, and obtain downlink CSI (denoted as first downlink CSI) through calculation based on the uplink CSI. The first downlink CSI has been greatly different from downlink CSI (denoted as second downlink CSI) used when a PDSCH is sent. Correspondingly, a precoding matrix determined based on the first downlink CSI is no longer a precoding matrix that best matches the second downlink CSI. This phenomenon may be referred to as channel aging (channel aging). Channel aging causes a deterioration in receiving quality of a physical downlink shared channel (physical downlink shared channel, PDSCH for short) received by a terminal. To avoid channel aging, a solution is to shorten an SRS sending periodicity, but this method causes a waste of time-frequency resources.

SUMMARY

Embodiments of this application provide a CSI measurement method and an apparatus, to improve receiving quality of receiving a PDSCH by a terminal.

To achieve the foregoing objective, the embodiments of this application provide the following technical solutions.

According to a first aspect, a CSI measurement method is provided. The method includes: A network device receives a first RS that is sent by a terminal and that is used to measure CSI, and measures the CSI based on the first RS. The first RS occupies n frequency domain resource segments in one time domain unit, the n frequency domain resource segments are discontinuously distributed on a frequency band of a terminal, the time domain unit is a set of a plurality of consecutive OFDM symbols, and n is an integer greater than 1.

According to the method provided in the first aspect, for one time domain unit, a plurality of frequency domain resource segments occupied by the first RS are discontinuously distributed on the frequency band of the terminal. However, frequency domain resources occupied by a current SRS are continuously distributed on an entire frequency band. Therefore, compared with the current SRS, the first RS in this embodiment of this application occupies fewer time-frequency resources. To avoid channel aging, a method is to shorten an SRS periodicity. Because frequency domain resources occupied by the SRS are continuously distributed on an entire frequency band, this method leads to a waste of time-frequency resources. However, because the first RS in this embodiment of this application occupies fewer time-frequency resources, a periodicity of the first RS can be shorter, thereby avoiding channel aging. In addition, because the first RS in this embodiment of this application occupies fewer time-frequency resources, time-frequency resources of a same quantity can be allocated to more terminals, thereby improving resource utilization.

With reference to the first aspect, in a possible implementation, the method further includes: The network device sends, to the terminal, at least one of the following configuration information used to configure each of the n frequency domain resource segments: an occupied time-frequency resource and a carried sequence, where the time-frequency resource includes a time domain resource and a frequency domain resource. In other words, the configuration information may be about a time-frequency resource occupied by the frequency domain resource segment, or may be about a sequence carried on the frequency domain resource segment, or may configure both a time-frequency resource occupied by the frequency domain resource segment and a sequence carried on the frequency domain resource segment. Descriptions of the configuration information below are the same, and are not described again.

In this possible implementation, the network device configures, for the terminal, one or more of the occupied time-frequency resource and the carried sequence of each of the n frequency domain resource segments, so that the terminal determines to send one or more of an occupied time-frequency resource and a carried sequence of the first RS.

With reference to the first aspect, in a possible implementation, the method further includes: The network device receives, from the terminal, a second RS used to measure CSI, and measures the CSI based on the first RS and the second RS. At least some of antenna ports that are of the terminal and that correspond to RS ports included in the second RS are the same as antenna ports that are of the terminal and that correspond to RS ports included in the first RS. In this possible implementation, the network device may obtain, through joint measurement by using the first RS and the second RS, downlink CSI used when the PDSCH is sent, to obtain instantaneous CSI of the terminal in a terminal movement scenario, and further determine a precoding matrix that better matches a current downlink CSI. When one of the first RS and the second RS is an SRS, and the other is a DT-RS, the DT-RS may be sent interleaved between SRSs. This is equivalent to shortening a periodicity of an RS used to perform uplink CSI measurement, thereby avoiding channel aging, and improving the receiving quality of PDSCHs received by the terminal.

According to a second aspect, a network device is provided. The network device includes a transceiver unit and a processing unit. The transceiver unit is configured to receive a first RS that is sent by a terminal and that is used to measure CSI, where the first RS occupies n frequency domain resource segments on one time domain unit, the n frequency domain resource segments are discontinuously distributed on a frequency band of the terminal, the time domain unit is a set of a plurality of consecutive OFDM symbols, and n is an integer greater than 1. The processing unit is configured to measure the CSI based on the first RS.

With reference to the second aspect, in a possible implementation, the transceiver unit is further configured to send, to the terminal, at least one of the following configuration information used to configure each of the n frequency domain resource segments: an occupied time-frequency resource and a carried sequence, where the time-frequency resource includes a time domain resource and a frequency domain resource.

With reference to the second aspect, in a possible implementation, the transceiver unit is further configured to receive, from the terminal, a second RS used to measure CSI, where at least some of antenna ports that are of the terminal and that correspond to RS ports included in the second RS are the same as antenna ports that are of the terminal and that correspond to RS ports included in the first RS; the processing unit is specifically configured to measure the CSI based on the first RS and the second RS.

According to a third aspect, a CSI measurement method is provided. The method includes: A terminal determines a first RS used to measure CSI, and sends the first RS to a network device, where the first RS occupies n frequency domain resource segments on one time domain unit, the n frequency domain resource segments are discontinuously distributed on a frequency band of the terminal, the time domain unit is a set of a plurality of consecutive OFDM symbols, and n is an integer greater than 1. According to the method provided in the third aspect, for one time domain unit, a plurality of frequency domain resource segments occupied by the first RS are discontinuously distributed on the frequency band of the terminal. However, frequency domain resources occupied by a current SRS are continuously distributed on an entire frequency band. Therefore, compared with the current SRS, the first RS in this embodiment of this application occupies fewer time-frequency resources. In this case, to avoid channel aging, a method is to shorten an SRS periodicity. Because frequency domain resources occupied by the SRS are continuously distributed on an entire frequency band, this method leads to a waste of time-frequency resources. However, because the first RS in this embodiment of this application occupies fewer time-frequency resources, a periodicity of the first RS can be shorter, thereby avoiding channel aging. In addition, time-frequency resources of a same quantity can be allocated to more terminals, thereby improving resource utilization.

With reference to the third aspect, in a possible implementation, the method further includes: The terminal receives, from the network device, at least one of the following configuration information used to configure each of the n frequency domain resource segments: an occupied time-frequency resource and a carried sequence, where the time-frequency resource includes a time domain resource and a frequency domain resource; and the terminal sends the first RS to the network device based on the configuration information. In this possible implementation, the network device configures, for the terminal, one or more of the occupied time-frequency resource and the carried sequence of each of the n frequency domain resource segments, so that the terminal determines to send one or more of an occupied time-frequency resource and a carried sequence of the first RS.

With reference to the third aspect, in a possible implementation, the method further includes: The terminal sends, to the network device, a second RS used to measure CSI, where at least some of antenna ports that are of the terminal and that correspond to RS ports included in the second RS are the same as antenna ports that are of the terminal and that correspond to RS ports included in the first RS. In this possible implementation, the network device may obtain, through joint measurement by using the first RS and the second RS that are sent by the terminal, downlink CSI used when the PDSCH is sent, to obtain instantaneous CSI of the terminal in a terminal movement scenario, and further determine a precoding matrix that better matches a current downlink CSI. When one of the first RS and the second RS is an SRS, and the other is a DT-RS, the DT-RS may be sent interleaved between SRSs. This is equivalent to shortening a periodicity of an RS used to perform uplink CSI measurement, thereby avoiding channel aging, and improving the receiving quality of PDSCHs received by the terminal.

According to a fourth aspect, a terminal is provided. The terminal includes a transceiver unit and a processing unit. The processing unit is configured to determine a first RS used to measure CSI. The transceiver unit is configured to send the first RS to a network device. The first RS occupies n frequency domain resource segments in one time domain unit, the n frequency domain resource segments are discontinuously distributed on a frequency band of a terminal, the time domain unit is a set of a plurality of consecutive OFDM symbols, and n is an integer greater than 1.

With reference to the fourth aspect, in a possible implementation, the transceiver unit is further configured to receive, from the network device, at least one of the following configuration information used to configure each of the n frequency domain resource segments: an occupied time-frequency resource and a carried sequence, where the time-frequency resource includes a time domain resource and a frequency domain resource; and the transceiver unit is specifically configured to send the first RS to the network device based on the configuration information.

With reference to the fourth aspect, in a possible implementation, the transceiver unit is further configured to send, to the network device, a second RS used to measure CSI, where at least some of antenna ports that are of the terminal and that correspond to RS ports included in the second RS are the same as antenna ports that are of the terminal and that correspond to RS ports included in the first RS.

With reference to the method provided in the first aspect, the network device provided in the second aspect, the method provided in the third aspect, or the terminal provided in the fourth aspect, in a possible implementation, quantities of frequency domain units included in any two of the n frequency domain resource segments are the same, or quantities of frequency domain units included in at least two of the n frequency domain resource segments are different. In this possible implementation, when quantities of frequency domain units included in any two of the n frequency domain resource segments are the same, the network device may conveniently perform resource scheduling.

With reference to the method provided in the first aspect, the network device provided in the second aspect, the method provided in the third aspect, or the terminal provided in the fourth aspect, in a possible implementation, there are n−1 frequency domain resource segment spacings between the n frequency domain resource segments, the frequency domain resource segment spacing is a spacing between two adjacent frequency domain resource segments, and quantities of frequency domain units included in any two adjacent frequency domain resource segment spacings in the n−1 frequency domain resource segment spacings are the same, or quantities of frequency domain units included in at least two of the n−1 frequency domain resource segment spacings are different. In this possible implementation, when quantities of frequency domain units included in any two adjacent frequency domain resource segment spacings in of the n−1 frequency domain resource segment spacings are the same, the network device may conveniently perform resource scheduling.

With reference to the method provided in the first aspect, the network device provided in the second aspect, the method provided in the third aspect, or the terminal provided in the fourth aspect, in a possible implementation, the n frequency domain resource segments are located on one or more OFDM symbols in the last m OFDM symbols in the time domain unit, and m is an integer greater than 0 and less than or equal to 14.

With reference to the method provided in the first aspect, the network device provided in the second aspect, the method provided in the third aspect, or the terminal provided in the fourth aspect, in a possible implementation, all of the n frequency domain resource segments are located on each of the one or more OFDM symbols in the last m OFDM symbols in the time domain unit; or different frequency domain resource segments in the n frequency domain resource segments are located on different OFDM symbols in a plurality of OFDM symbols in the last m OFDM symbols in the time domain unit; or at least two of the n frequency domain resource segments are located on different OFDM symbols in a plurality of OFDM symbols in the last m OFDM symbols in the time domain unit, and at least two of the n frequency domain resource segments are located on a same OFDM symbol in the plurality of OFDM symbols in the last m OFDM symbols in the time domain unit. In this possible implementation, if the frequency domain resource segments are located on different OFDM symbols, a PAPR can be reduced; if the frequency domain resource segments are located on a same OFDM symbol, a larger bandwidth for CSI measurement can be provided for the device.

With reference to the method provided in the first aspect, the network device provided in the second aspect, the method provided in the third aspect, or the terminal provided in the fourth aspect, in a possible implementation, first RSs carried on each of the n frequency domain resource segments are distributed in a comb structure in frequency domain. In this possible implementation, a time-frequency resource occupied by the first RS can be saved.

With reference to the method provided in the first aspect, the network device provided in the second aspect, the method provided in the third aspect, or the terminal provided in the fourth aspect, in a possible implementation, comb structures used by the first RSs carried on each of the n frequency domain resource segments are the same, and start frequency domain positions and end frequency domain positions of the first RSs on respective frequency domain resource segments are the same. In this possible implementation, patterns of the first RSs on frequency domain resource segments in different OFDM symbols or on different frequency domain resource segments in a same OFDM symbol are the same, so that the network device can conveniently perform resource scheduling.

With reference to the method provided in the first aspect, the network device provided in the second aspect, the method provided in the third aspect, or the terminal provided in the fourth aspect, in a possible implementation, the first RSs carried on different frequency domain resource segments in the n frequency domain resource segments are from one sequence, and elements included in the first RSs carried on the different frequency domain resource segments are all different, or elements included in the first RSs carried on the different frequency domain resource segments are at least partially the same; or the first RSs carried on different frequency domain resource segments in the n frequency domain resource segments are from some or all elements in respective corresponding sequences.

According to a fifth aspect, a network device is provided. The network device includes a processor. The processor is connected to a memory, the memory is configured to store computer-executable instructions, and the processor executes the computer-executable instructions stored in the memory, to implement any method provided in the first aspect. The memory and the processor may be integrated together, or may be independent components. If the memory and the processor are independent components, the memory may be located in the network device, or may be located outside the network device.

In a possible implementation, the processor includes a logic circuit and at least one of an input interface and an output interface. The output interface is configured to perform a sending action in a corresponding method, and the input interface is configured to perform a receiving action in a corresponding method.

In a possible implementation, the network device further includes a communication interface and a communication bus. The processor, the memory, and the communication interface are connected by using the communication bus. The communication interface is configured to perform receiving and sending actions in a corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in a corresponding method.

In a possible implementation, the network device exists in a product form of a chip.

According to a sixth aspect, a terminal is provided. The terminal includes a processor. The processor is connected to a memory, the memory is configured to store computer-executable instructions, and the processor executes the computer-executable instructions stored in the memory, to implement any method provided in the third aspect. The memory and the processor may be integrated together, or may be independent components. If the memory and the processor are independent components, the memory may be located in the terminal, or may be located outside the terminal.

In a possible implementation, the processor includes a logic circuit and at least one of an input interface and an output interface. The output interface is configured to perform a sending action in a corresponding method, and the input interface is configured to perform a receiving action in a corresponding method.

In a possible implementation, the terminal further includes a communication interface and a communication bus. The processor, the memory, and the communication interface are connected by using the communication bus. The communication interface is configured to perform receiving and sending actions in a corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in a corresponding method.

In a possible implementation, the terminal exists in a product form of a chip.

According to a seventh aspect, a communication system is provided. The communication system includes the terminal provided in the second aspect and the network device provided in the fourth aspect.

According to an eighth aspect, a computer-readable storage medium is provided. The computer-readable storage medium includes instructions, and when the instructions are run on a computer, the computer is enabled to perform any method provided in the first aspect or the third aspect.

According to a ninth aspect, a computer program product including instructions is provided. When the instructions are run on a computer, the computer is enabled to perform any method provided in the first aspect or the third aspect.

For technical effects brought by any implementation in the second aspect or the fourth to the ninth aspects, refer to technical effects brought by a corresponding implementation in the first aspect or the third aspect. Details are not described herein again.

It should be noted that various possible implementations of any one of the foregoing aspects may be combined provided that the solutions are not contradictory.

BRIEF DESCRIPTION OF DRAWINGS

FIG. 3(a) to FIG. 3(f) are a schematic diagram of distribution of signals or data of comb structures in time-frequency resources;

DESCRIPTION OF EMBODIMENTS

The following describes technical solutions in embodiments of this application with reference to the accompanying drawings in the embodiments of this application. In descriptions of this application, unless otherwise specified, "/" means "or". For example, A/B may represent A or B. In addition, in the descriptions of this application, unless otherwise specified, "a plurality of" means two or more, and "at least one" means one or more.

In addition, for convenience of clear description of the technical solutions in the embodiments of this application, in the embodiments of this application, terms such as "first", "second", and the like are used to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference.

The technical solutions in the embodiments of this application may be applied to various communication systems, for example, an orthogonal frequency division multiple access (orthogonal frequency-division multiple access, OFDMA for short) system, a single-carrier frequency-division multiple access (single carrier frequency-division multiple access, SC-FDMA for short), and another system. The terms "system" and "network" can be interchanged with each other. A radio technology such as evolved universal terrestrial radio access (evolved universal terrestrial radio access, E-UTRA for short) or ultra mobile broadband (ultra mobile broadband, UMB for short) may be implemented in an OFDMA system. E-UTRA is an evolved version of a universal mobile telecommunications system (universal mobile telecommunications system, UMTS for short). The 3rd generation partnership project (3rd generation partnership project, 3GPP for short) uses a new version of E-UTRA in long term evolution (long term evolution, LTE for short) and various versions evolved based on LTE. A 5th generation (5th generation, 5G for short) communication system or new radio (new radio, NR for short) is a next generation communication system under research. The 5G communication system includes a 5G non-standalone (non-standalone, NSA for short) mobile communication system, a 5G standalone (standalone, SA for short) mobile communication system, or both a 5G NSA mobile communication system and a 5G SA mobile communication system. In addition, the communication systems may further be applicable to a future-oriented communication technology, and are applicable to the technical solutions provided in the embodiments of this application. The foregoing communication systems applicable to this application are merely examples, and the communication systems applicable to this application are not limited thereto.

Figure 1:
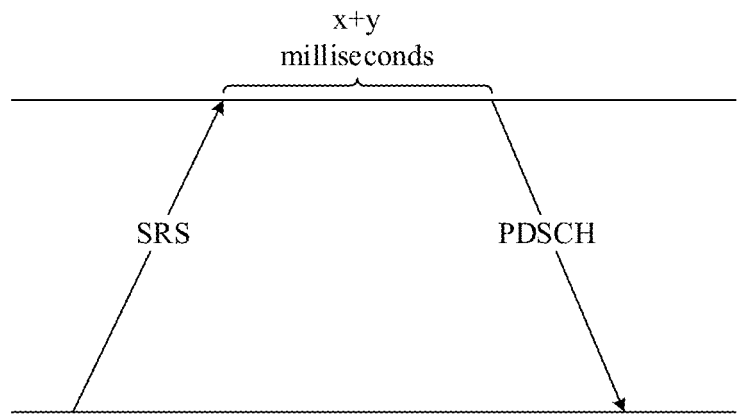
FIG. 1 is a schematic diagram of an interval between a time for a network device to receive an SRS and a time for the network device to send a PDSCH.
Figure 2:
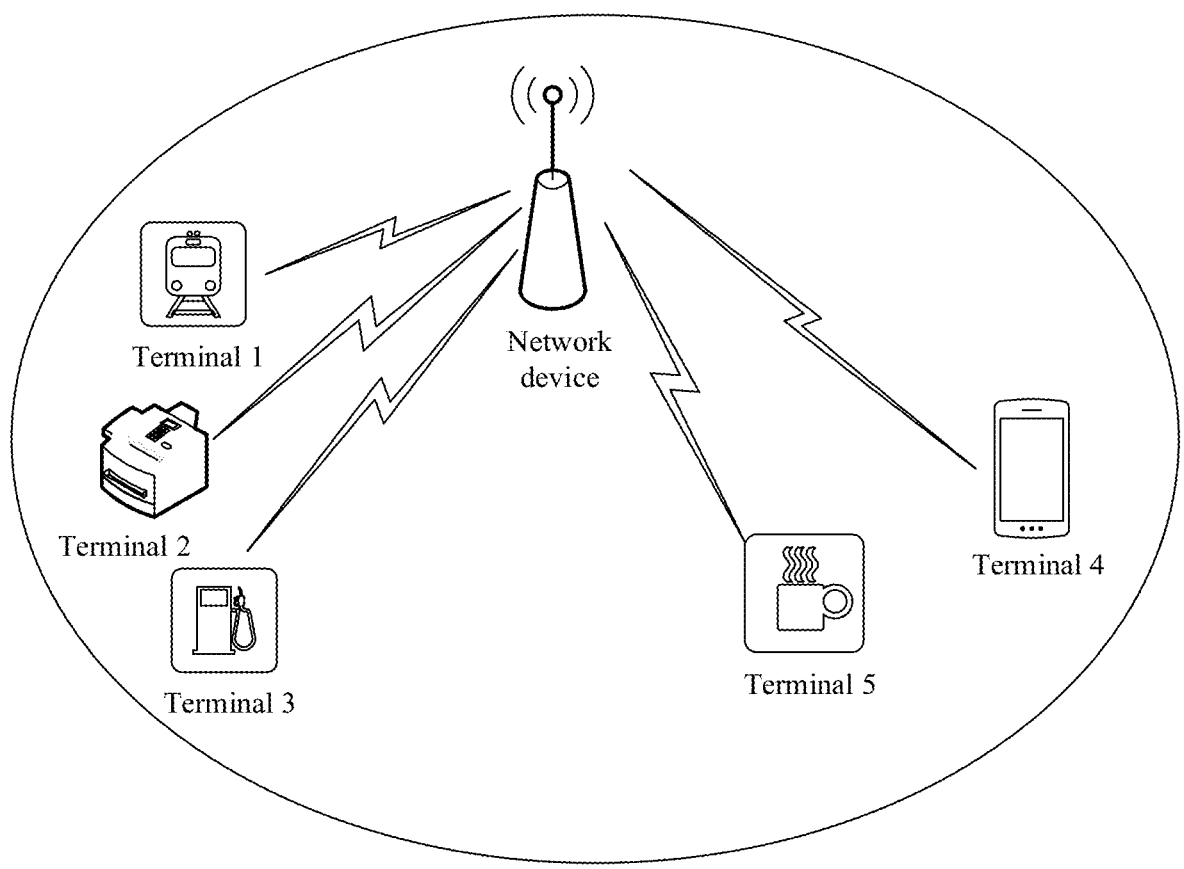
FIG. 2 is a schematic diagram of a network architecture.

Network elements in the embodiments of this application include a network device and a terminal. For example, FIG. 2 is a schematic diagram of a communication system according to an embodiment of this application. The communication system may include at least one network device (FIG. 2 shows only one network device) and at least one terminal (FIG. 2 shows five terminals, which are respectively a terminal 1 to a terminal 5). One or more terminals of the terminal 1 to the terminal 5 may communicate with the network device, to transmit data. The terminal in this embodiment of this application may be any terminal that communicates with the network device.

The network device is an entity that is on a network side and that is configured to send a signal, or receive a signal, or send a signal and receive a signal. The network device may be an apparatus that is deployed in a radio access network (radio access network, RAN for short) and that provides a wireless communication function for the terminal, for example, may be a base station. The network device may be various forms of macro base station, micro base station (also referred to as a small cell), relay station, access point (access point, AP for short), and the like, or may include various forms of control nodes, for example, a network controller. The control node may be connected to a plurality of base stations, and configure resources for a plurality of terminals covered by the plurality of base stations. In systems using different radio access technologies, names of devices having base station functions may be different. For example, the base station may be referred to as a base transceiver station (base transceiver station, BTS for short) in a global system for mobile communications (global system for mobile communications, GSM for short) or code division multiple access (code division multiple access, CDMA for short) network, may be referred to as a base station (NodeB) in a wideband code division multiple access (wideband code division multiple access, WCDMA for short) network, may be referred to as an evolved NodeB (evolved NodeB, eNB or eNodeB for short) in an LTE system, or may be referred to as a next generation node base station (next generation node base station, gNB for short) in an NR communication system. A specific name of the base station is not limited in this application. Alternatively, the network device may be a radio controller in a cloud radio access network (cloud radio access network, CRAN for short) scenario, a network device in a future evolved public land mobile network (public land mobile network, PLMN for short), a transmission reception point (transmission reception point, TRP for short), or the like.

The terminal is configured to provide one or more of a voice service and a data connectivity service for the user, and the terminal is an entity that is on a user side and that is configured to receive a signal, send a signal, or receive a signal and send a signal. Alternatively, the terminal may also be referred to as user equipment (user equipment, UE for short), a terminal device, an access terminal, a subscriber unit, a subscriber station, a mobile station, a remote station, a remote terminal, a mobile device, a user terminal, a wireless communication device, a user agent, or a user apparatus. The terminal may be a mobile station (mobile station, MS for short), a subscriber unit (subscriber unit), an unmanned aerial vehicle, an internet of things (internet of things, IoT for short) device, a station (station, ST for short) in a wireless local area network (wireless local area networks, WLAN for short), a cellular phone (cellular phone), a smartphone (smartphone), a cordless phone, a wireless data card, a tablet computer, a session initiation protocol (session initiation protocol, SIP for short) phone, a wireless local loop (wireless local loop, WLL for short) station, a personal digital assistant (personal digital assistant, PDA for short) device, a laptop computer (laptop computer), a machine type communication (machine type communication, MTC for short) terminal, a handheld device with a wireless communication function, a computing device or another processing device connected to a wireless modem, a vehicle-mounted device, or a wearable device (which may also be referred to as a wearable intelligent device). The terminal may alternatively be a terminal in a next generation communication system, for example, a terminal in a future evolved PLMN, or a terminal in an NR communication system.

To make this application clearer, some concepts involved in this application are first briefly described.

1. Time Domain Unit

A time domain unit is a resource unit in a time domain resource. The time domain unit in the embodiments of this application is a set of a plurality of consecutive orthogonal frequency division multiplexing (orthogonal frequency division multiplexing, OFDM for short) symbols. For example, the time domain unit may be a mini slot (mini slot), a slot (slot), a subframe (subframe), a transmission time interval (transmission time interval, TTI for short), or the like.

In an NR communication system, for a normal (normal) cyclic prefix (cyclic prefix, CP for short), one slot includes 14 OFDM symbols. For an extended (extended) CP, one slot includes 12 OFDM symbols. In the embodiments of this application, unless otherwise specified, one slot includes 14 OFDM symbols.

In one slot, 14 OFDM symbols are sequentially numbered in ascending order, where a minimum number is 0, and a maximum number is 13. In the embodiments of this application, an OFDM symbol whose index (namely, number) is i is denoted as an OFDM symbol #i. In this case, one slot includes an OFDM symbol #0 to an OFDM symbol #13.

The time domain unit may also be referred to as a time unit, a time-domain granularity, or the like.

2. Time-Frequency Unit

A time-frequency unit is a resource unit in a time-frequency resource. For example, the time-frequency unit may be a resource element (resource element, RE for short), a physical resource block (physical resource block, PRB for short), or the like.

3. Frequency Domain Resource Segment

A frequency domain resource segment in the embodiments of this application refers to a frequency domain resource including a plurality of consecutive frequency domain units.

A frequency domain unit is a resource unit in a frequency domain resource. The frequency domain unit may be a frequency domain width of one or more PRBs. For example, the frequency domain unit may include frequency domain widths of x PRBs. x may be any positive integer. For example, x may be 1, 2, 4, 8, 16, or the like. The frequency domain unit may alternatively be one or more subcarriers. For example, the frequency domain unit may include y subcarriers. y may be any positive integer. For example, y may be 1, 12, 60, 120, or the like. The frequency domain unit may alternatively be a predefined subband (subband), a frequency band (band), a bandwidth part (bandwidth part, BWP for short), a component carrier (component carrier, CC for short), or the like.

4. Comb (Comb) Structure

A comb structure may be used to indicate a distribution manner of signals or data on frequency domain resources. The signals or data distributed based on the comb structure are evenly distributed on the frequency domain resources at an equal interval. In other words, the signals or data distributed based on the comb structure are periodically distributed on the frequency domain resources. A periodicity of the signals or the data is a size of a comb, and may be denoted as K. A comb K (comb K) indicates a comb structure with a periodicity of K. K is an integer greater than 1.

For example, referring to FIG. 3(a) to FIG. 3(f), for distribution, on frequency domain resources, of signals or data distributed based on a comb 2, refer to FIG. 3(a) and FIG. 3(d); for distribution, on frequency domain resources, of signals or data distributed based on a comb 3, refer to FIG.

3(b) and FIG. 3(e); and for distribution, on frequency domain resources, of signals or data distributed based on a comb 4, refer to FIG. 3(c) and FIG. 3(f).

5. Sequence

A sequence in the embodiments of this application refers to a sequence that may be used as a pilot. Therefore, the sequence may also be referred to as a pilot sequence. One sequence may include a plurality of elements. For example, each element may be a complex symbol.

The sequence in the embodiments of this application may be a ZC (Zadoff Chu) sequence, a sequence obtained after modulation of a gold (gold) sequence, or a sequence obtained after another operation (for example, discrete Fourier transform (discrete Fourier transform, DFT for short)) is performed on a sequence obtained after modulation of a gold sequence.

6. Frequency Band of the Terminal

A bandwidth of a frequency band of the terminal may be a system bandwidth of the terminal, may be a BWP, or may be a transmission bandwidth of the terminal.

The system bandwidth refers to a bandwidth supported by the terminal or a bandwidth configured by the terminal, and may also be referred to as a carrier bandwidth. The BWP is a part of the system bandwidth. The transmission bandwidth refers to a bandwidth or a quantity of resources that may be used for data transmission and that are in the system bandwidth or in the BWP.

7. Antenna Port

An antenna port is a logical concept. One antenna port may correspond to one physical transmit antenna, or may correspond to a plurality of physical transmit antennas. In both the cases, a receiver (receiver) of the terminal does not decompose a signal from a same antenna port. This is because from a perspective of the terminal, regardless of whether a channel includes a single physical transmit antenna or includes a plurality of physical transmit antennas, the antenna port is defined by a reference signal (reference signal, RS for short) corresponding to the antenna port, and the terminal may obtain a channel estimation of the antenna port based on the reference signal. One antenna port is one channel, and the terminal may perform channel estimation and data demodulation based on the reference signal corresponding to the antenna port.

Figure 4:
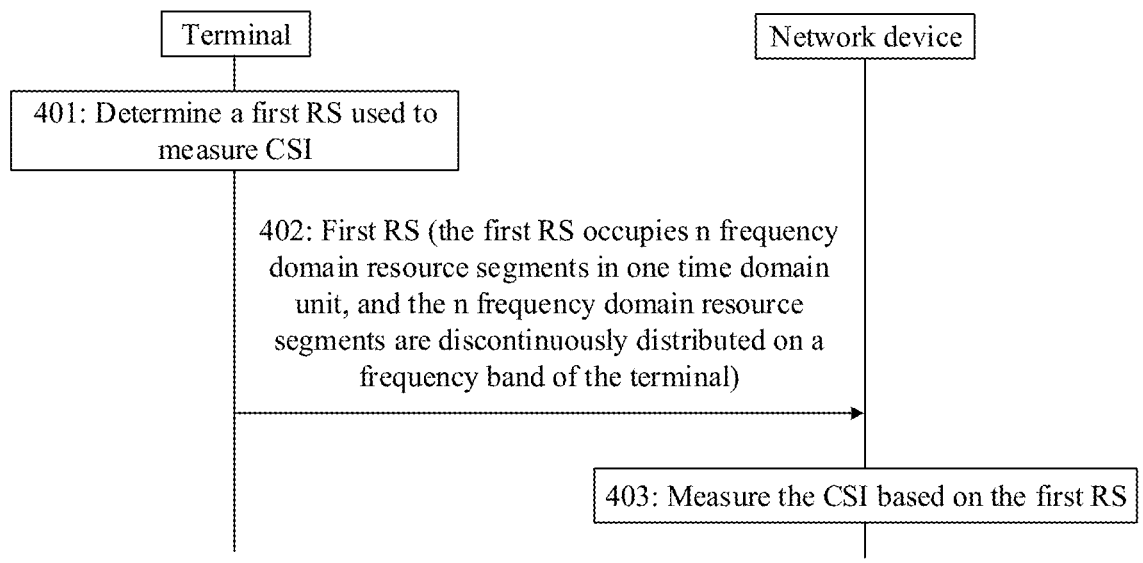
FIG. 4 is an interactive flowchart of a CSI measurement method according to an embodiment of this application.

An embodiment of this application provides a CSI measurement method. As shown in FIG. 4, the method includes the following steps.

401: A terminal determines a first RS, where the first RS is used to measure CSI.

Any RS that can be used to measure the CSI may be used as the first RS in this embodiment of this application. For example, the first RS may be an SRS, or may be a Doppler tracking RS (Doppler tracking RS, DT-RS for short). The DT-RS is an enhanced SRS. The DT-RS herein is merely an example. The first RS may alternatively have another name, and may refer to another RS that is used to measure the CSI other than the SRS, or the first RS in this application may also be referred to as an SRS.

The first RS may be used to measure uplink CSI. After the uplink CSI is obtained through measurement, downlink CSI may be obtained through measurement based on mutual heterogeneity between uplink and downlink channels. Therefore, it is also considered that the first RS may be used to measure the downlink CSI.

402: The terminal sends the first RS to a network device. Correspondingly, the network device receives the first RS sent by the terminal.

The first RS occupies n frequency domain resource segments in one time domain unit, the n frequency domain resource segments are discontinuously distributed on a frequency band of the terminal, the time domain unit is a set of a plurality of consecutive OFDM symbols, and n is an integer greater than 1.

403: The network device measures the CSI based on the first RS.

During specific implementation of step 403, the network device may measure the uplink CSI based on the first RS. Further, the downlink CSI may be obtained through measurement based on mutual heterogeneity between uplink and downlink channels. A specific method is well known to a person skilled in the art, and details are not described herein.

According to the method provided in this embodiment of this application, for one time domain unit, a plurality of frequency domain resource segments occupied by the first RS are discontinuously distributed on the frequency band of the terminal. However, frequency domain resources occupied by a current SRS are continuously distributed on an entire frequency band. Therefore, compared with the current SRS, the first RS in this embodiment of this application occupies fewer time-frequency resources. To avoid channel aging, a method is to shorten an SRS periodicity. Because frequency domain resources occupied by the SRS are continuously distributed on an entire frequency band, this method leads to a waste of time-frequency resources. However, because the first RS in this embodiment of this application occupies fewer time-frequency resources, a periodicity of the first RS can be shorter, thereby avoiding channel aging. In addition, because the first RS in this embodiment of this application occupies fewer time-frequency resources, time-frequency resources of a same quantity can be allocated to more terminals, thereby improving resource utilization.

Optionally, the foregoing method further includes: The terminal sends a second RS to the network device. Correspondingly, the network device receives the second RS from the terminal. In this case, during specific implementation, step 403 may include: The network device measures the CSI based on the first RS and the second RS.

The second RS is used to measure the CSI. At least some of antenna ports (UE antenna ports) that are of the terminal and that correspond to RS ports included in the second RS are the same as antenna ports that are of the terminal and that correspond to RS ports included in the first RS.

Any RS that can be used to measure the CSI may be used as the second RS in this embodiment of this application. For example, the second RS may be an SRS, or may be a DT-RS. The DT-RS herein is merely an example. The second RS may alternatively have another name, and may refer to another RS that is used to measure the CSI other than the SRS, or the second RS in this application may also be referred to as an SRS.

At least some of the antenna ports that are of the terminal and that correspond to the RS ports included in the second RS are the same as the antenna ports that are of the terminal and that correspond to the RS ports included in the first RS. To be specific, some of the antenna ports that are of the terminal and that correspond to the RS ports included in the second RS are the same as the antenna ports that are of the terminal and that correspond to the RS ports included in the first RS (this is denoted as an example 1); or all of the antenna ports that are of the terminal and that correspond to the RS ports included in the second RS are the same as the antenna ports that are of the terminal and that correspond to the RS ports included in the first RS (this is denoted as an example 2).

The example 1 specifically means that at least one RS port included in the second RS respectively corresponds to at least one RS port included in the first RS. The example 2 specifically means that all RS ports included in the second RS respectively correspond to all RS ports included in the first RS. Two RS ports that have a correspondence correspond to a same antenna port of the terminal.

During specific implementation of step 403, the network device may perform joint measurement based on the first RS and the second RS to obtain uplink CSI used when the network device sends a PUSCH, and may further perform joint measurement to obtain downlink CSI used when the network device sends a PDSCH. For example, during specific implementation, step 403 may include: The network device performs joint measurement based on the first RS carried on a first resource and the second RS carried on a second resource, to obtain the downlink CSI used when the network device sends the PDSCH. The first resource is a time-frequency resource occupied by an RS port included in the first RS, and the second resource is a time-frequency resource occupied by an RS port that is included in the second RS and that corresponds to the RS port included in the first RS.

In a first possible implementation, a joint measurement process may include: The network device obtains uplink CSI 1 of a first time domain unit (namely, a time domain unit for sending the first RS) through calculation based on the first RS carried on the first resource, and obtains downlink CSI 1 through calculation based on the uplink CSI 1; obtains uplink CSI 2 of a second time domain unit (namely, a time domain unit for sending the second RS) through calculation based on the second RS carried on the second resource, and obtains downlink CSI 2 through calculation based on the uplink CSI 2; and performs machine learning or linear/nonlinear prediction based on the downlink CSI 1 and the downlink CSI 2, to obtain the downlink CSI used when the network device sends the PDSCH.

In a second possible implementation, a joint measurement process may include: The network device obtains uplink CSI 1 of a first time domain unit through calculation based on the first RS carried on the first resource, and obtains downlink CSI 1 through calculation based on the uplink CSI 1; obtains uplink CSI 2 of a second time domain unit through calculation based on the second RS carried on the second resource, and obtains downlink CSI 2 through calculation based on the uplink CSI 2; obtains, through calculation by using an interpolation algorithm, one or more pieces of uplink CSI corresponding to one or more time domain units between the first time domain unit and the second time domain unit, and calculates corresponding downlink CSI based on the one or more pieces of uplink CSI; and performs machine learning or linear/nonlinear prediction based on all pieces of downlink CSI obtained through calculation, to obtain the downlink CSI used when the network device sends the PDSCH.

In a third possible implementation, a joint measurement process may include: The network device obtains uplink CSI 1 of a first time domain unit through calculation based on the first RS carried on the first resource, and obtains downlink CSI 1 through calculation based on the uplink CSI 1; obtains uplink CSI 2 of a second time domain unit through calculation based on the second RS carried on the second resource, and obtains downlink CSI 2 through calculation based on the uplink CSI 2; and averages the downlink CSI 1 and the downlink CSI 2 to obtain the downlink CSI used when the network device sends the PDSCH.

In the foregoing embodiment, the network device may obtain the downlink CSI through calculation based on the uplink CSI by using mutual heterogeneity between uplink and downlink channels.

According to the method provided in this embodiment of this application, the network device may obtain, through joint measurement by using the first RS and the second RS, downlink CSI used when the PDSCH is sent, to obtain instantaneous CSI of the terminal in a terminal movement scenario, and further determine a precoding matrix that better matches a current downlink CSI. When one of the first RS and the second RS is an SRS, and the other is a DT-RS, the DT-RS may be sent interleaved between SRSs. This is equivalent to shortening a periodicity of an RS used to perform uplink CSI measurement, thereby avoiding channel aging, and improving the receiving quality of PDSCHs received by the terminal.

In a current technology, antenna ports corresponding to RS ports included in SRSs are not limited, and the terminal may autonomously select an antenna port for sending an SRS, so that joint measurement cannot be implemented. According to the method provided in this embodiment of this application, at least some of the antenna ports that are of the terminal and that correspond to the RS ports included in the second RS are the same as the antenna ports that are of the terminal and that correspond to the RS ports included in the first RS, so that joint measurement can be performed based on the first RS and the second RS. In this way, the receiving quality of receiving the PDSCH by the terminal is improved.

A time-frequency resource occupied by each of the plurality of frequency domain resource segments and a sequence carried on each frequency domain resource segment may be specified in a protocol, may be configured by a network, or may be jointly determined by using information specified in the protocol and information configured by the network. If the occupied time-frequency resource and the carried sequence are configured by the network, optionally, the method further includes: The network device sends configuration information to the terminal, where the configuration information is at least one of the following information used to configure each of the n frequency domain resource segments: the occupied time-frequency resource and the carried sequence. Correspondingly, the terminal receives the configuration information from the network device. In this case, during specific implementation, step 402 may include: The terminal sends the first RS to the network device based on the configuration information. Specifically, the terminal may determine, based on the configuration information, a time-frequency resource occupied by and a sequence carried on each of the n frequency domain resource segments, and send the first RS on the determined resource. The time-frequency resource occupied by the frequency domain resource segment includes a time domain resource occupied by the frequency domain resource segment and a frequency domain resource occupied by the frequency domain resource segment.

The network device may configure, for the terminal in at least one of the following manner 1 and manner 2, the time-frequency resource occupied by each of the n frequency domain resource segments. The time-frequency resource occupied by each of the n frequency domain resource segments includes a frequency domain resource and a time domain resource on which each frequency domain resource is located as a whole, also includes a frequency domain position and a time domain position of an RE of the first RS on each frequency domain resource segment, and may further include the sequence carried on each frequency domain resource segment.

Manner 1: The network device configures a pattern identifier of a pattern of a frequency domain resource segment for the terminal.

In this case, information included in the configuration information may be the identifier of the pattern of the frequency domain resource segment. A pattern (Pattern) of the frequency domain resource segment represents a position distribution of the frequency domain resource segment on a time-frequency resource. One pattern of the frequency domain resource segment corresponds to one pattern identifier.

In the manner 1, the network device and the terminal may store a pattern of one or more frequency domain resource segments. When the network device indicates the pattern identifier of the pattern to the terminal, the terminal may determine the pattern of the frequency domain resource segment based on the pattern identifier.

Manner 2: The network device configures, for the terminal, a specific position of a frequency domain resource segment on a time-frequency resource.

In the manner 2, the configuration information may include one or more of the following information: a quantity of frequency domain resource segments, a frequency domain position of the frequency domain resource segment (or a spacing between adjacent frequency domain resource segments), an OFDM symbol occupied by the frequency domain resource segment (or a frequency domain resource segment carried on an OFDM symbol), a comb structure used by the first RS on the frequency domain resource segment, a start frequency domain position (or an end frequency domain position) of the frequency domain resource segment, a frequency domain position and a time domain position of an RE of the first RS on the frequency domain resource segment, and a start frequency-domain position (or an end frequency-domain position) of the first RS on the frequency domain resource segment.

Specifically, the configuration information may configure a time-frequency resource occupied by and a sequence carried on each frequency domain resource segment, or may configure a time-frequency resource occupied by and a sequence carried on a specific frequency domain resource segment or some frequency domain resource segments, and configure offsets between the specific frequency domain resource segment or some frequency domain resource segments and other frequency domain resource segments.

When the configuration information configures a time-frequency resource occupied by and a sequence carried on each frequency domain resource segment, the terminal may determine the time-frequency resource occupied by and the sequence carried on each frequency domain resource segment based on information included in the configuration information.

When the configuration information configures a time-frequency resource occupied by and a sequence carried on a specific frequency domain resource segment or some frequency domain resource segments, and configures offsets between the specific frequency domain resource segment or some frequency domain resource segments and other frequency domain resource segments, the terminal may determine the time-frequency resource occupied by and the sequence carried on a specific frequency domain resource segment or some frequency domain resource segments based on information included in the configuration information, and then derives, based on the offsets, time-frequency resources occupied by and sequences carried on other frequency domain resource segments.

Besides that the network device configures, by using the configuration information, a time-frequency resource occupied by frequency domain resource segments in a plurality of frequency domain resource segments, information in the configuration information may further be specified in a protocol.

When the time-frequency resource occupied by and the sequence carried on each of the plurality of frequency domain resource segments are configured by the network, the network device may send the configuration information to the terminal by using radio resource control (radio resource control, RRC for short) signaling, medium access control (medium access control, MAC for short) control element (MAC control element, MAC CE for short) signaling, or downlink control information (downlink control information, DCI for short).

The frequency domain resource segment in this embodiment of this application has one or more features of the following feature 1 to feature 6. One or more features of the feature 1 to the feature 6 may all be features of a frequency domain resource segment specified in the protocol, or may all be features of a frequency domain resource segment configured by the network, or some may be features of a frequency domain resource segment specified in the protocol, and the others are features of a frequency domain resource segment configured by the network.

Feature 1: The feature 1 may be specifically the following feature 1-a or feature 1-b.

Feature 1-a: Quantities of frequency domain units included in any two of the n frequency domain resource segments are the same, that is, quantities of frequency domain units included in all of the n frequency domain resource segments are the same.

Feature 1-b: Quantities of frequency domain units included in at least two of the n frequency domain resource segments are different, that is, quantities of frequency domain units included in all of the n frequency domain resource segments are different, or quantities of frequency domain units included in some of the n frequency domain resource segments are the same, and quantities of frequency domain units included in some of the n frequency domain resource segments are different.

In the feature 1, a quantity of frequency domain units included in each of the n frequency domain resource segments is not limited in this embodiment of this application.

Figure 5A:
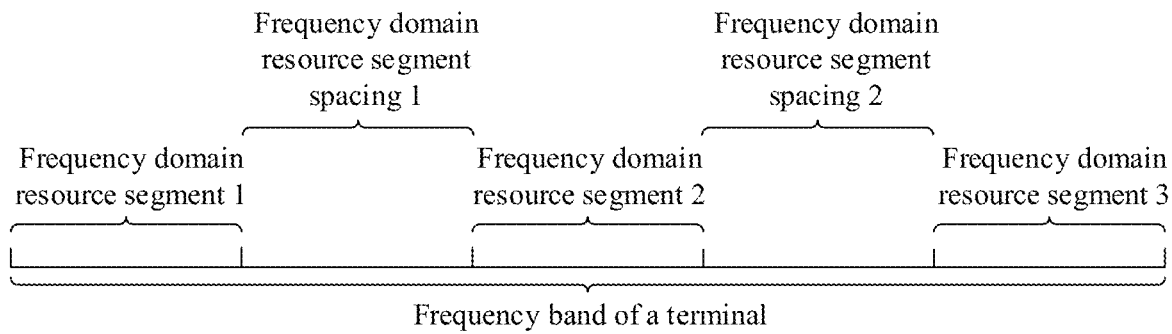
FIG. 5(a) to FIG. 5(c) and FIG. 6(a) to FIG. 6(c) are respectively schematic diagrams of distribution of frequency domain resource segments on a frequency band of a terminal according to an embodiment of this application.
Figure 5B:
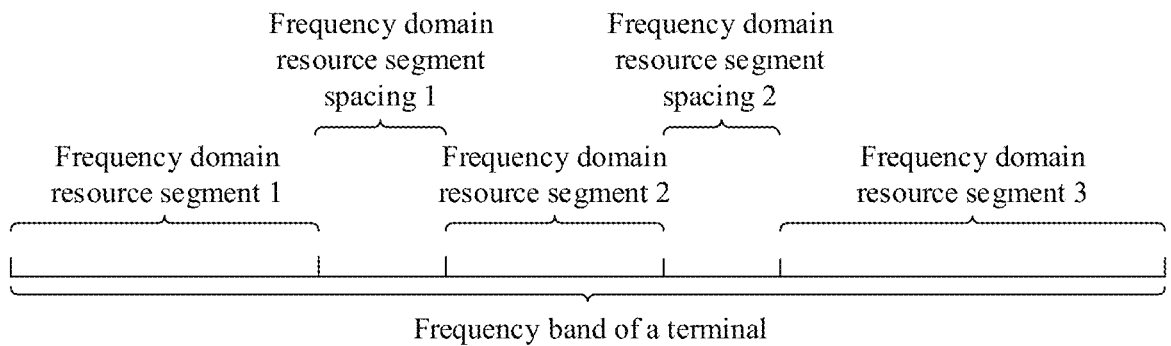
Figure 5C:
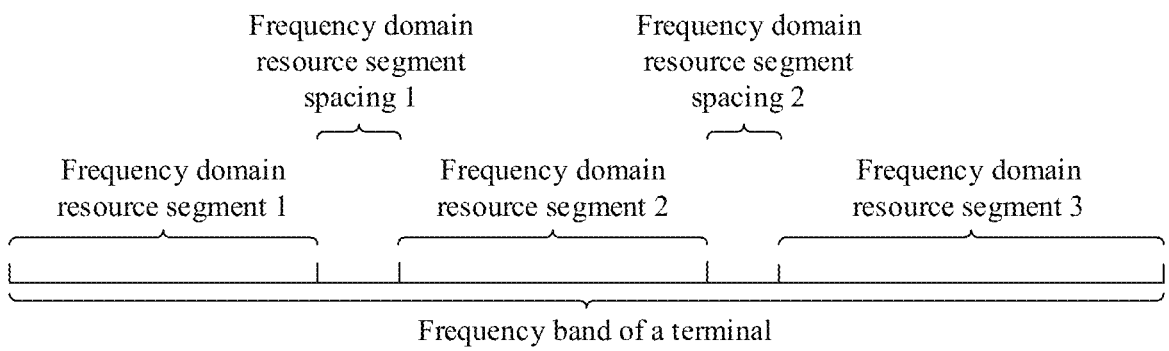

For example, referring to FIG. 5(a) to FIG. 5(c), a frequency band of the terminal includes three frequency domain resource segments, which are respectively: a frequency domain resource segment 1, a frequency domain resource segment 2, and a frequency domain resource segment 3.

Based on FIG. 5(a) to FIG. 5(c), when a frequency domain width of the frequency domain resource segment is counted by using subcarriers, in FIG. 5(a), three frequency domain resource segments include a same quantity of subcarriers. For example, each of the three frequency domain resource segments may include 12 subcarriers. In FIG. 5(b), all of the three frequency domain resource segments include different quantities of subcarriers. For example, the frequency domain resource segment 1 may include 18 subcarriers, the frequency domain resource segment 2 may include 12 subcarriers, and the frequency domain resource segment 3 may include 24 subcarriers. In FIG. 5(c), the frequency domain resource segment 1 and the frequency domain resource segment 2 include a same quantity of subcarriers, and the frequency domain resource segment 3 and the frequency domain resource segment 1 (or the frequency domain resource segment 2) include different quantities of subcarriers. For example, the frequency domain resource segment 1 and the frequency domain resource segment 2 both include 18 subcarriers, and the frequency domain resource segment 3 includes 24 subcarriers.

Based on FIG. 5(a) to FIG. 5(c), when the frequency domain width of the frequency domain resource segment is counted by using PRBs, in FIG. 5(a), all of the three frequency domain resource segments include a same frequency domain width. For example, each of the three frequency domain resource segments may include a frequency domain width of 1 PRB. In FIG. 5(b), all of the three frequency domain resource segments include different frequency domain widths. For example, the frequency domain resource segment 1 may include a frequency domain width of 1.5 PRBs, the frequency domain resource segment 2 may include a frequency domain width of 1 PRB, and the frequency domain resource segment 3 may include a frequency domain width of 2 PRBs. In FIG. 5(c), the frequency domain resource segment 1 and the frequency domain resource segment 2 include a same frequency domain width, and the frequency domain resource segment 3 and the frequency domain resource segment 1 (or the frequency domain resource segment 2) include different frequency domain widths. For example, the frequency domain resource segment 1 and the frequency domain resource segment 2 both include a frequency domain width of 1.5 PRBs, and the frequency domain resource segment 3 includes a frequency domain width of 2 PRBs.

Figure 6A:
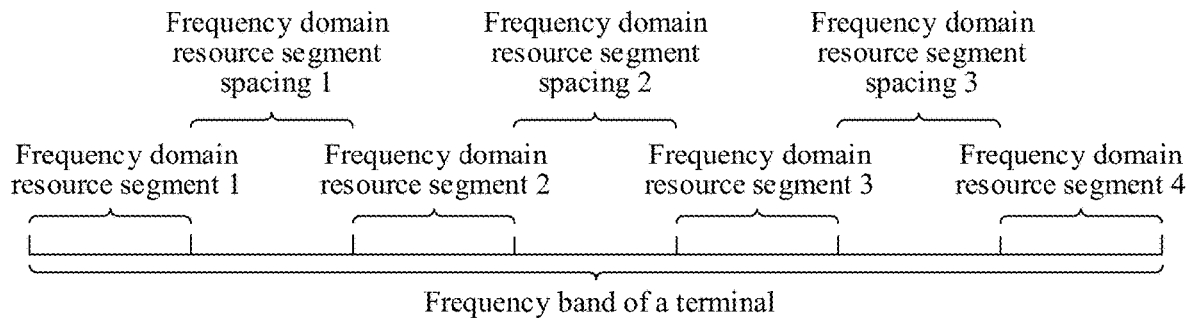
Figure 6B:
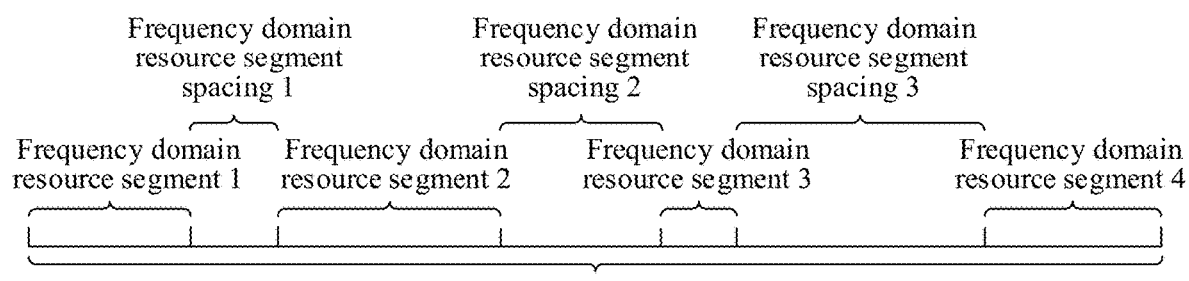
Figure 6C:
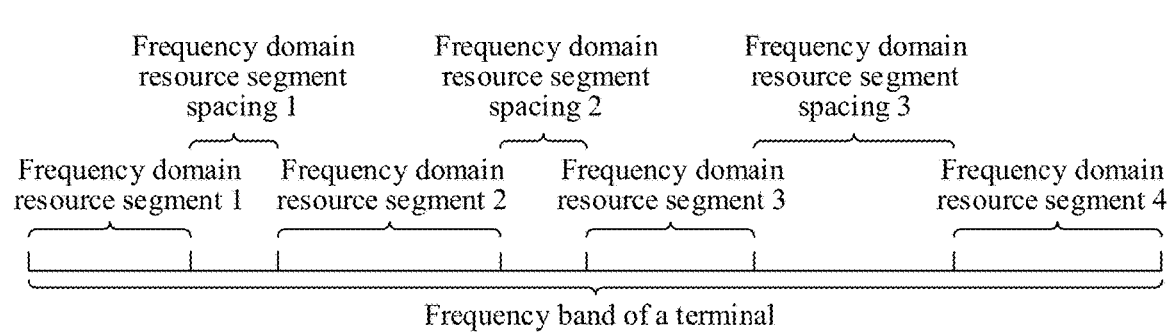

For example, referring to FIG. 6(a) to FIG. 6(c), a frequency band of the terminal includes four frequency domain resource segments, which are respectively: a frequency domain resource segment 1, a frequency domain resource segment 2, a frequency domain resource segment 3, and a frequency domain resource segment 4.

Based on FIG. 6(a) to FIG. 6(c), when a frequency domain width of the frequency domain resource segment is counted by using subcarriers, in FIG. 6(a), four frequency domain resource segments include a same quantity of subcarriers. For example, each of the four frequency domain resource segments may include 12 subcarriers. In FIG. 6(b), all of the four frequency domain resource segments include different quantities of subcarriers. For example, the frequency domain resource segment 1 may include 12 subcarriers, the frequency domain resource segment 2 may include 24 subcarriers, the frequency domain resource segment 3 may include 6 subcarriers, and the frequency domain resource segment 4 may include 15 subcarriers. In FIG. 6(c), the frequency domain resource segment 1 and the frequency domain resource segment 3 include a same quantity of subcarriers, and the frequency domain resource segment 2 and the frequency domain resource segment 4 include a same quantity of subcarriers. For example, the frequency domain resource segment 1 and the frequency domain resource segment 3 both include 12 subcarriers, and the frequency domain resource segment 2 and the frequency domain resource segment 4 both include 24 subcarriers.

Based on FIG. 6(a) to FIG. 6(c), when the frequency domain width of the frequency domain resource segment is counted by using PRBs, in FIG. 6(a), all of the four frequency domain resource segments include a same frequency domain width. For example, each of the four frequency domain resource segments may include a frequency domain width of 1 PRB. In FIG. 6(b), all of the four frequency domain resource segments include different frequency domain widths. For example, the frequency domain resource segment 1 may include a frequency domain width of 1 PRB, the frequency domain resource segment 2 may include a frequency domain width of 2 PRBs, the frequency domain resource segment 3 may include a frequency domain width of 0.5 PRB, and the frequency domain resource segment 4 may include a frequency domain width of 1.25 PRBs. In FIG. 6(c), the frequency domain resource segment 1 and the frequency domain resource segment 3 include a same frequency domain width, and the frequency domain resource segment 2 and the frequency domain resource segment 4 include a same frequency domain width. For example, the frequency domain resource segment 1 and the frequency domain resource segment 3 both include a frequency domain width of 1 PRB, and the frequency domain resource segment 2 and the frequency domain resource segment 4 both include a frequency domain width of 2 PRBs.

Feature 2: The feature 2 may be specifically the following feature 2-a or feature 2-b.

Feature 2-a: Quantities of frequency domain units included in any two adjacent frequency domain resource segment spacings in of the n−1 frequency domain resource segment spacings are the same, that is, quantities of frequency domain units included in all of the n−1 frequency domain resource segment spacings are the same.

Feature 2-b: Quantities of frequency domain units included in at least two of the n−1 frequency domain resource segment spacings are different, that is, quantities of frequency domain units included in all of the n−1 frequency domain resource segment spacings are different, or quantities of frequency domain units included in some of the n−1 frequency domain resource segment spacings are the same, and quantities of frequency domain units included in some of the n−1 frequency domain resource segment spacings are different.

There are n−1 frequency domain resource segment spacings between the n frequency domain resource segments, and the frequency domain resource segment spacing is a spacing between two adjacent frequency domain resource segments.

In the feature 2, a quantity of frequency domain units included in each of the n−1 frequency domain resource segment spacings is not limited in this embodiment of this application.

For example, refer to FIG. 5(a) to FIG. 5(c). A frequency domain resource segment spacing (denoted as a frequency domain resource segment spacing 1) is between the frequency domain resource segment 1 and the frequency domain resource segment 2 in FIG. 5(a) to FIG. 5(c). A frequency domain resource segment spacing (denoted as a frequency domain resource segment spacing 2) is between the frequency domain resource segment 2 and the frequency domain resource segment 3. FIG. 5(a), FIG. 5(b), and FIG. 5(c) are all drawn based on an example in which the frequency domain resource segment spacing 1 and the frequency domain resource segment spacing 2 include a same frequency domain width. For example, the frequency domain resource segment spacing 1 and the frequency domain resource segment spacing 2 may both include 12 subcarriers or a frequency domain width of 1 PRB.

For example, referring to FIG. 6(a) to FIG. 6(c), the frequency band of the terminal includes four frequency domain resource segments (that is, the frequency domain resource segment 1, the frequency domain resource segment 2, the frequency domain resource segment 3, and the frequency domain resource segment 4), and three frequency domain resource segment spacings (that is, a frequency domain resource segment spacing 1, a frequency domain resource segment spacing 2, and a frequency domain resource segment spacing 3).

Based on FIG. 6(a) to FIG. 6(c), when the frequency domain width of the frequency domain resource segment is counted by using subcarriers, in FIG. 6(a), three frequency domain resource segment spacings include a same quantity of subcarriers. For example, each of the three frequency domain resource segment spacings may include 12 subcarriers. In FIG. 6(b), all of the three frequency domain resource segment spacings include different quantities of subcarriers. For example, the frequency domain resource segment spacing 1 may include 6 subcarriers, the frequency domain resource segment spacing 2 may include 12 subcarriers, and the frequency domain resource segment spacing 3 may include 24 subcarriers. In FIG. 6(c), the frequency domain resource segment spacing 1 and the frequency domain resource segment spacing 2 include a same quantity of subcarriers, and the frequency domain resource segment spacing 3 and the frequency domain resource segment spacing 1 (or the frequency domain resource segment spacing 2) include different quantities of subcarriers. For example, the frequency domain resource segment spacing 1 and the frequency domain resource segment spacing 2 both include 6 subcarriers, and the frequency domain resource segment spacing 3 includes 18 subcarriers.

Based on FIG. 6(a) to FIG. 6(c), when the frequency domain width of the frequency domain resource segment is counted by using PRBs, in FIG. 6(a), all of the three frequency domain resource segment spacings include a same frequency domain width. For example, each of the three frequency domain resource segment spacings may include a frequency domain width of 1 PRB. In FIG. 6(b), all of the three frequency domain resource segment spacings include different frequency domain widths. For example, the frequency domain resource segment spacing 1 may include a frequency domain width of 0.5 PRB, the frequency domain resource segment spacing 2 may include a frequency domain width of 1 PRB, and the frequency domain resource segment spacing 3 may include a frequency domain width of 2 PRBs. In FIG. 6(c), the frequency domain resource segment spacing 1 and the frequency domain resource segment spacing 2 include a same frequency domain width, and the frequency domain resource segment spacing 3 and the frequency domain resource segment spacing 1 (or the frequency domain resource segment spacing 2) include different frequency domain widths. For example, the frequency domain resource segment spacing 1 and the frequency domain resource segment spacing 2 both include a frequency domain width of 0.5 PRB, and the frequency domain resource segment spacing 3 includes a frequency domain width of 1.5 PRBs.

That the frequency domain resource segment spacings are the same or different may be represented in a same OFDM symbol in one time domain unit. For example, referring to FIG. 7(a) or FIG. 8(a), any adjacent frequency domain resource segment spacings on an OFDM #13 are the same. Referring to FIG. 7(b) or FIG. 8(b), two frequency domain resource segment spacings between three frequency domain resource segments on an OFDM #11 (or an OFDM #12, or an OFDM #13) are different.

Figure 7C:
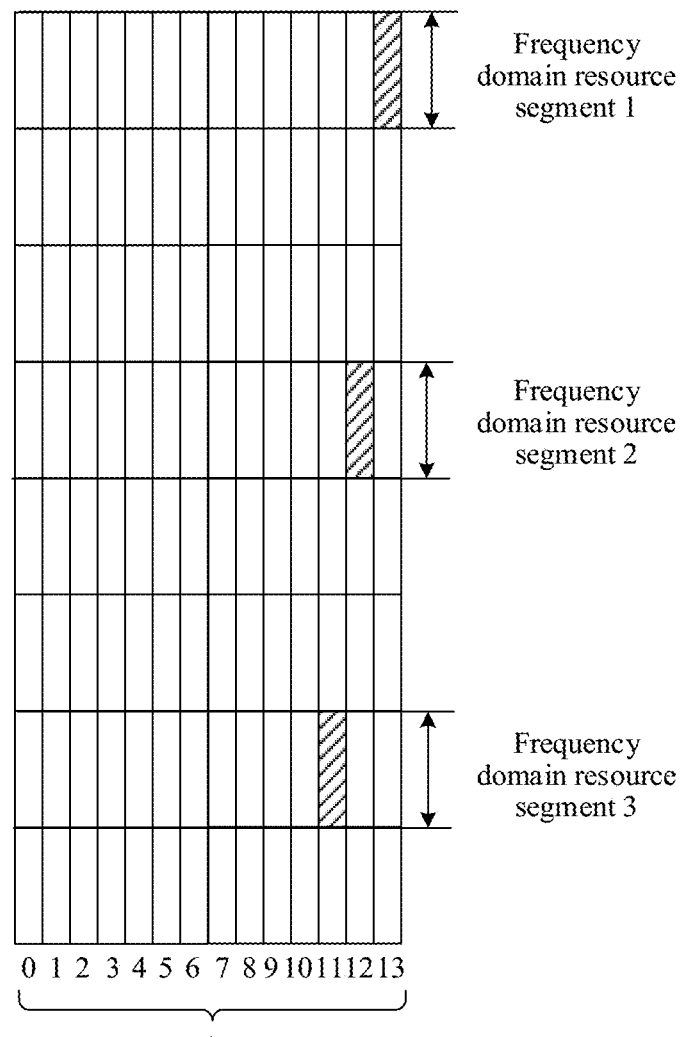
Figure 7D:
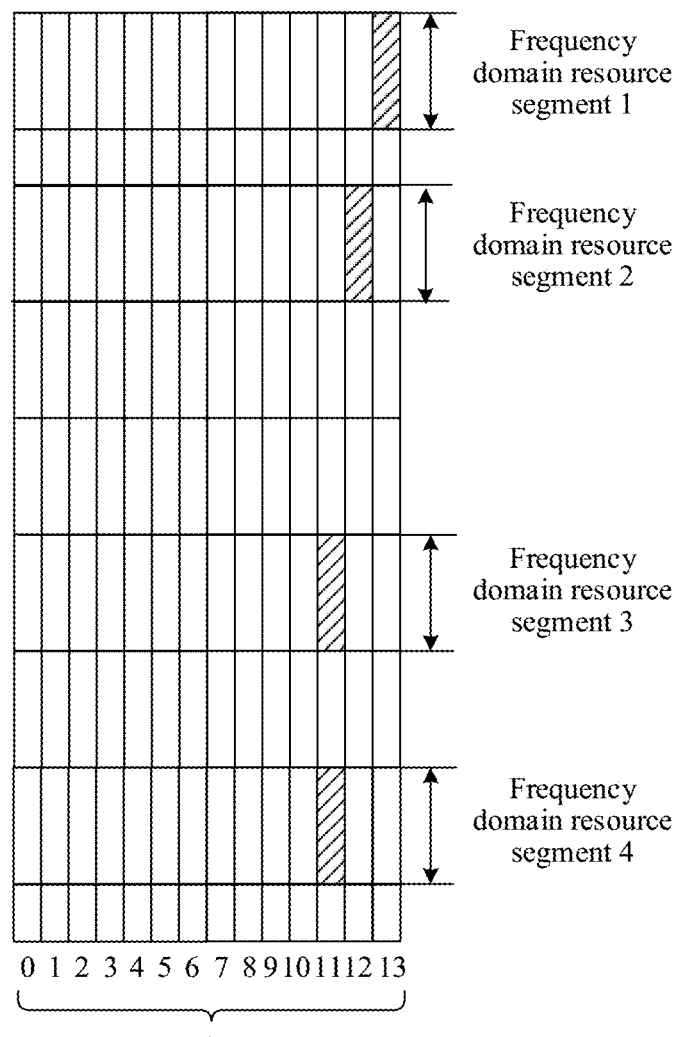
Figures 8A, 8B:
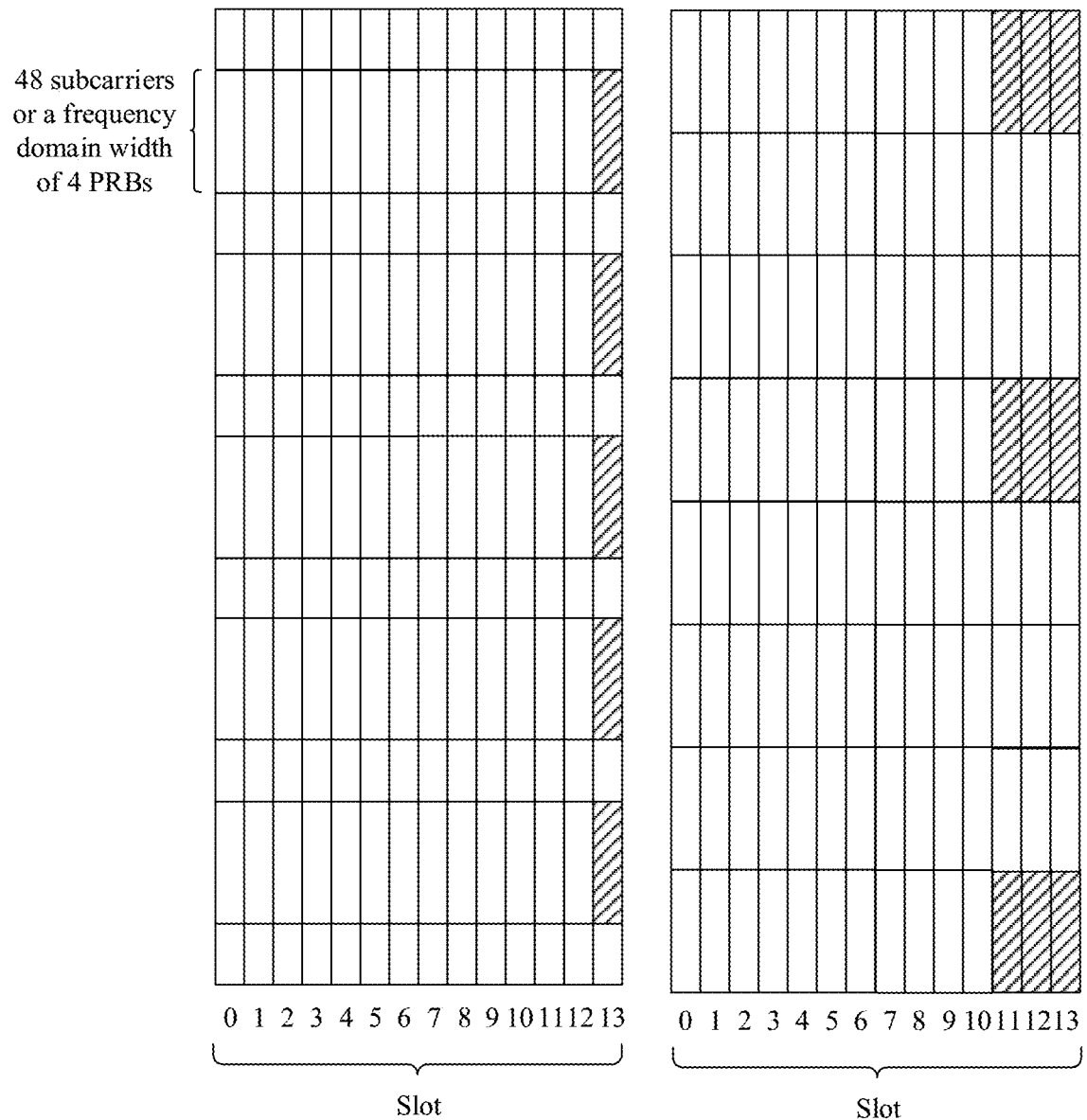
Figure 8C:
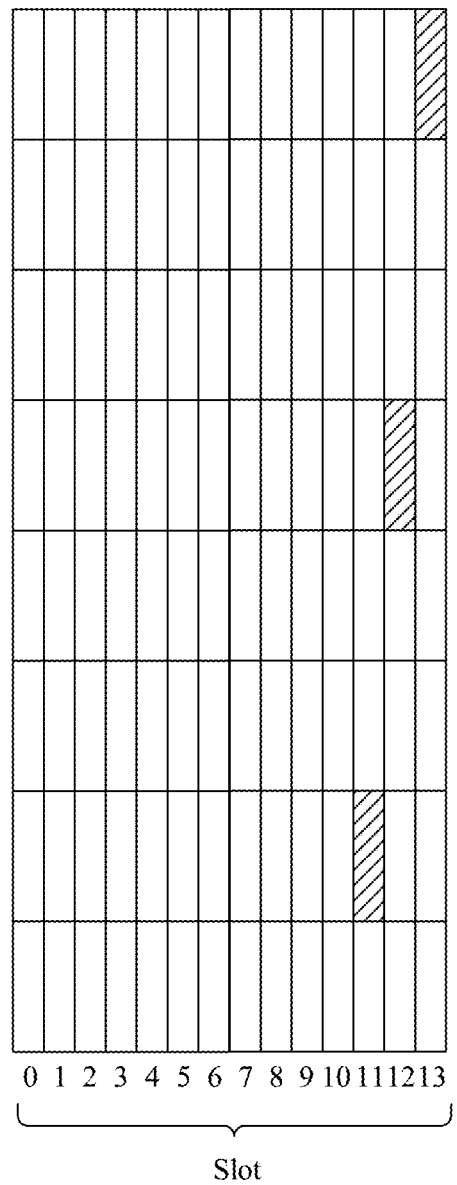
Figure 8D:
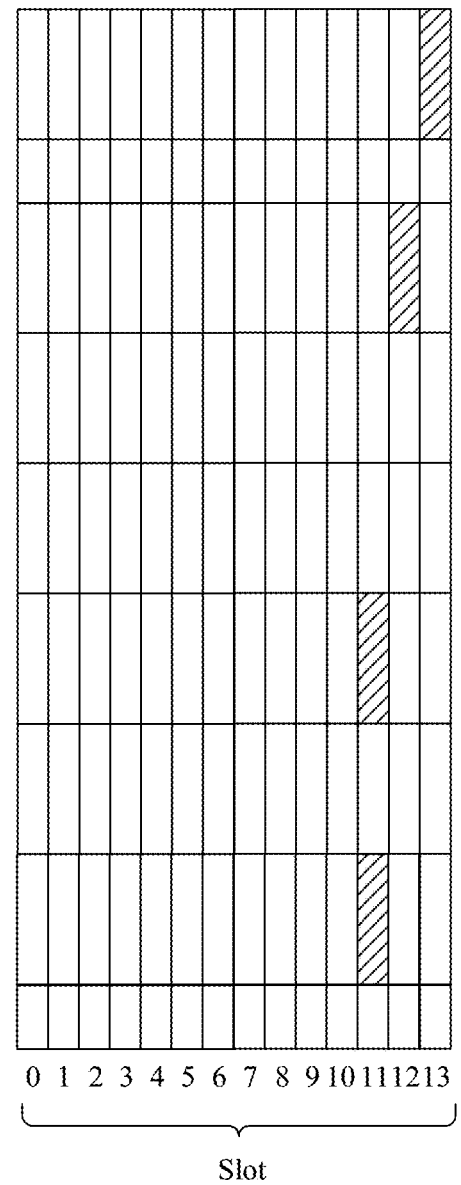

That the frequency domain resource segment spacings are the same or different may alternatively be represented in different OFDM symbols in one time domain unit. For example, referring to FIG. 7(c) or FIG. 8(c), a frequency domain resource segment spacing between frequency domain resource segments on an OFDM #13 and an OFDM #12 is the same as a frequency domain resource segment spacing between frequency domain resource segments on the OFDM #12 and an OFDM #11. Referring to FIG. 7(d) or FIG. 8(d), a frequency domain resource segment spacing between frequency domain resource segments on an OFDM #13 and an OFDM #12 is different from a frequency domain resource segment spacing between frequency domain resource segments on the OFDM #12 and an OFDM #11, and the frequency domain resource segment spacing between the frequency domain resource segments on the OFDM #12 and the OFDM #11 is different from a frequency domain resource segment spacing between frequency domain resource segments on the OFDM #11.

Figure 7A:
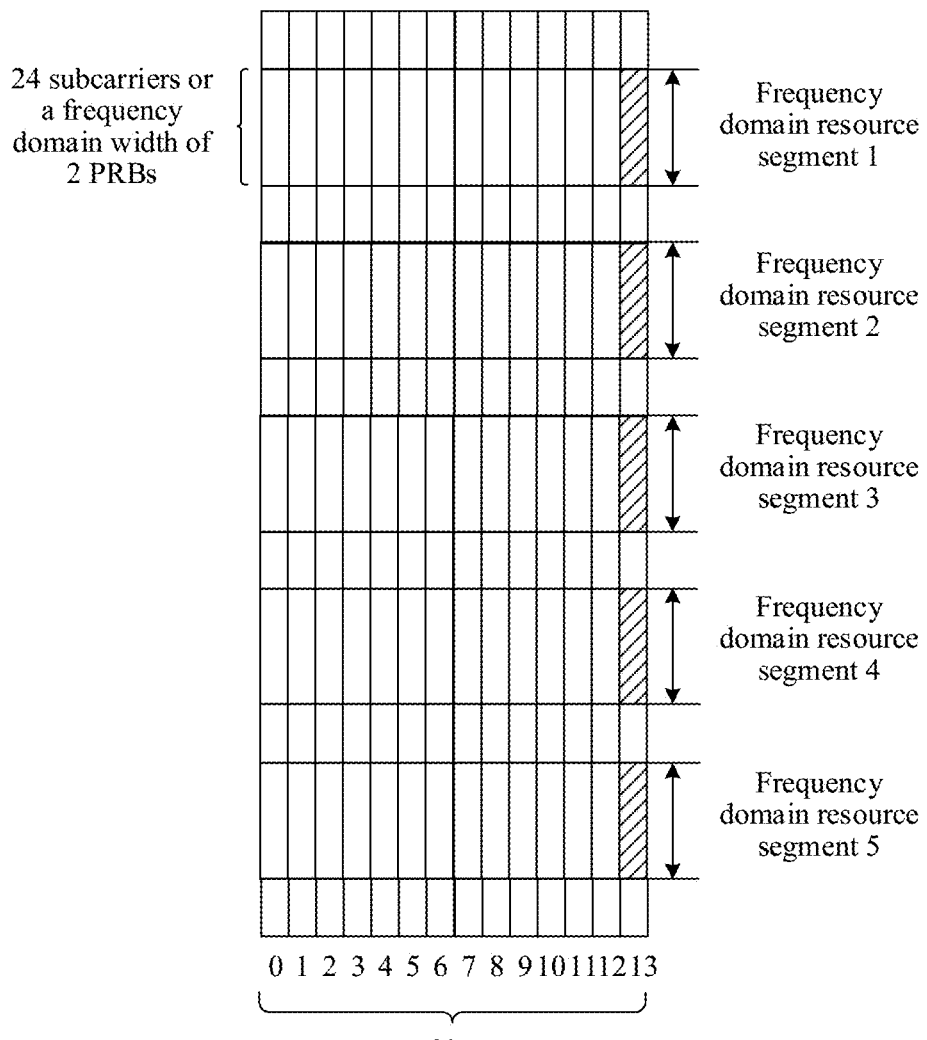
FIG. 7(a) to FIG. 23(b) are respectively schematic diagrams of distribution of frequency domain resource segments on a time-frequency resource according to an embodiment of this application.
Figure 7B:
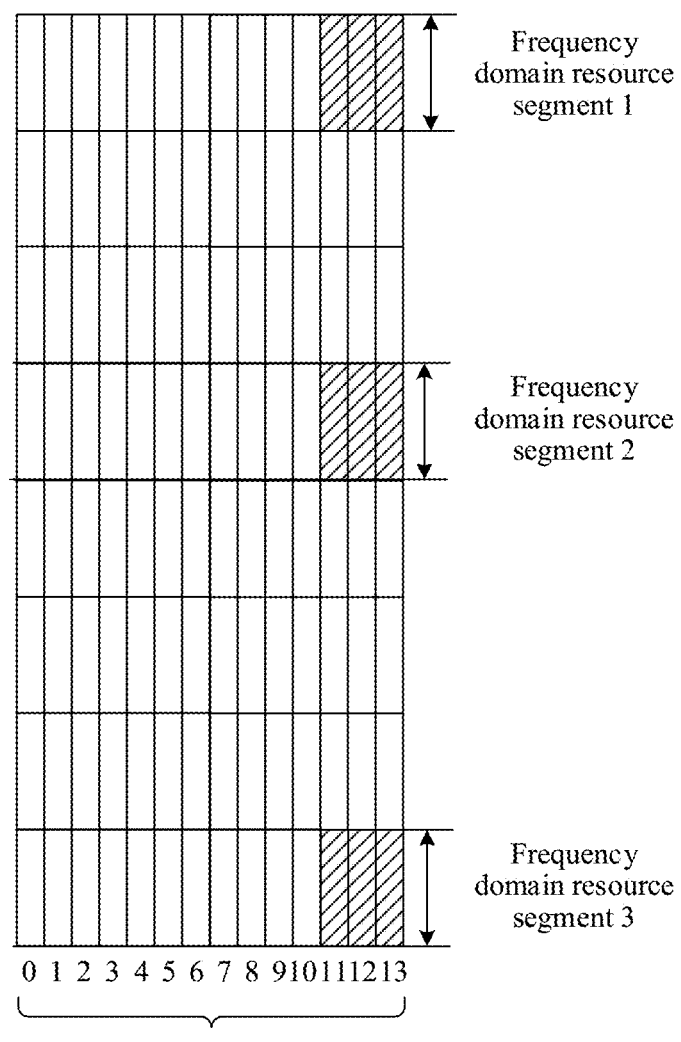

FIG. 7(a) includes five frequency domain resource segments. FIG. 7(b) and FIG. 7(c) each include three frequency domain resource segments. FIG. 7(d) includes four frequency domain resource segments. Meanings of frequency domain resource segments in FIG. 8(a) to FIG. 23(b) in the following specification are similar to that in FIG. 7(a) to FIG. 7(d), and details are not described again.

Feature 3: The n frequency domain resource segments are located on one or more OFDM symbols in the last m OFDM symbols in a time domain unit, and m is an integer greater than 0 and less than or equal to 14.

In the feature 3, a specific value of m is not limited in this embodiment of this application. For example, m may be a value such as 13, 7, 6, 4, or 1.

The feature 3 may be any case of the following case 1 to case 3.

Case 1: All of the n frequency domain resource segments are located on each of the one or more OFDM symbols in the last m OFDM symbols in the time domain unit. In this case, if the frequency domain resource segments are located on a same OFDM symbol, a larger bandwidth for CSI measurement can be provided for the device.

Figure 9A:
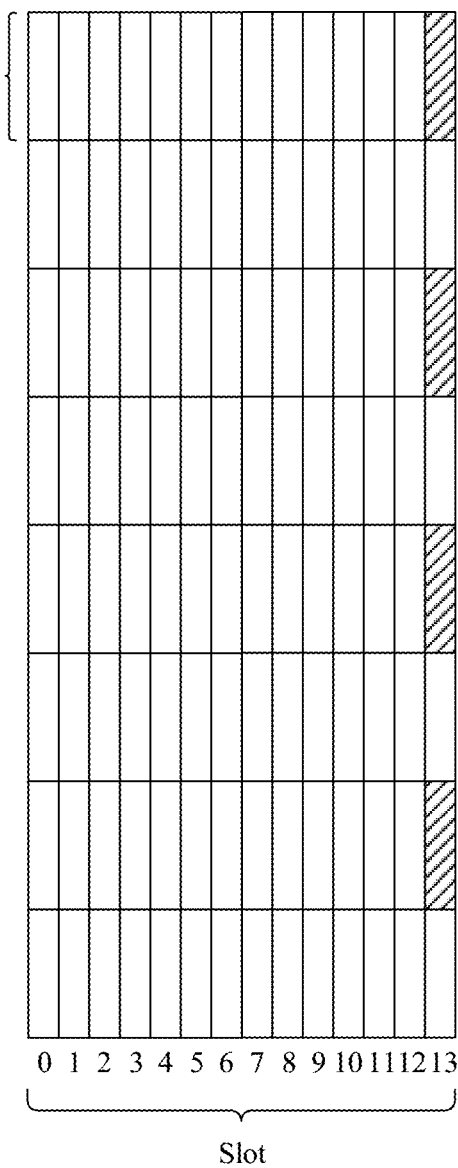
Figure 9B:
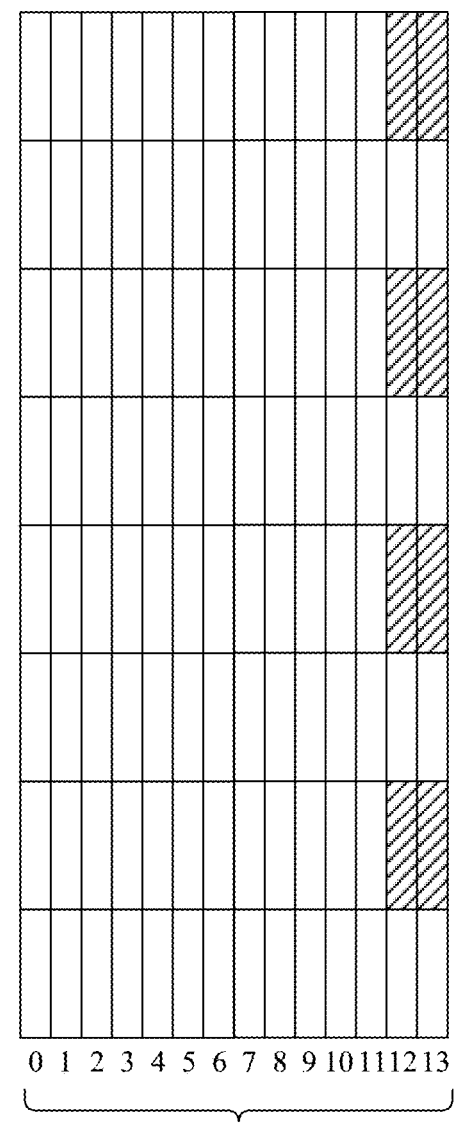
Figure 10A:
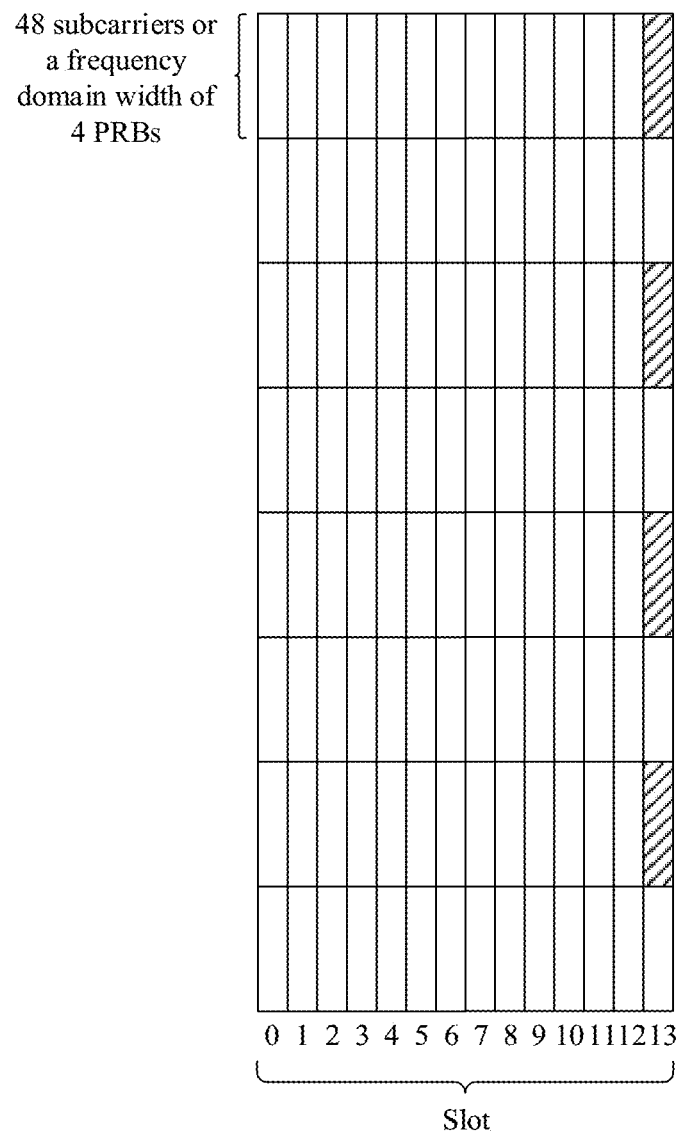
Figure 10B:
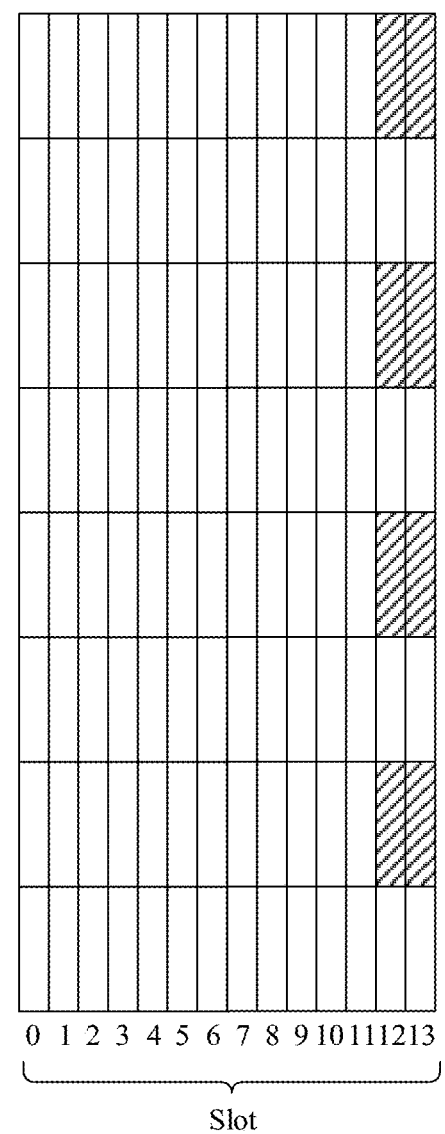
Figure 10C:
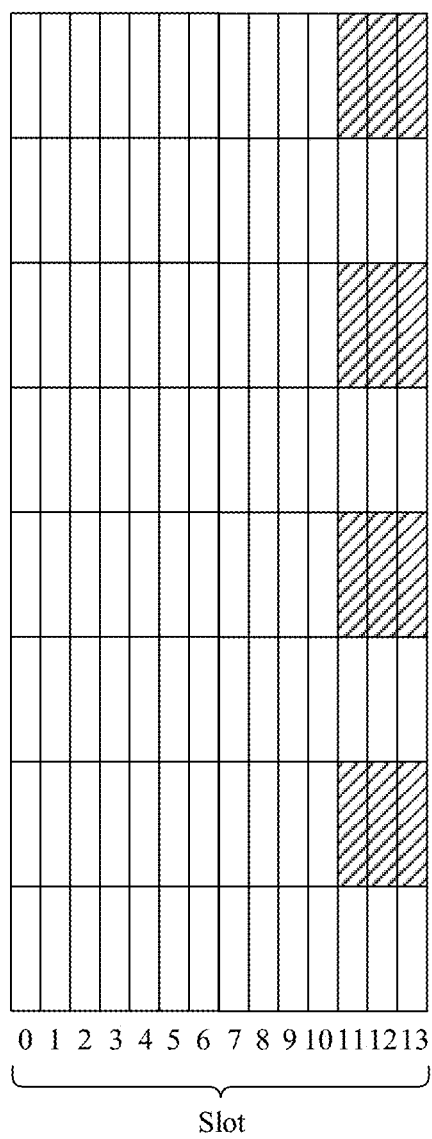
Figure 10D:
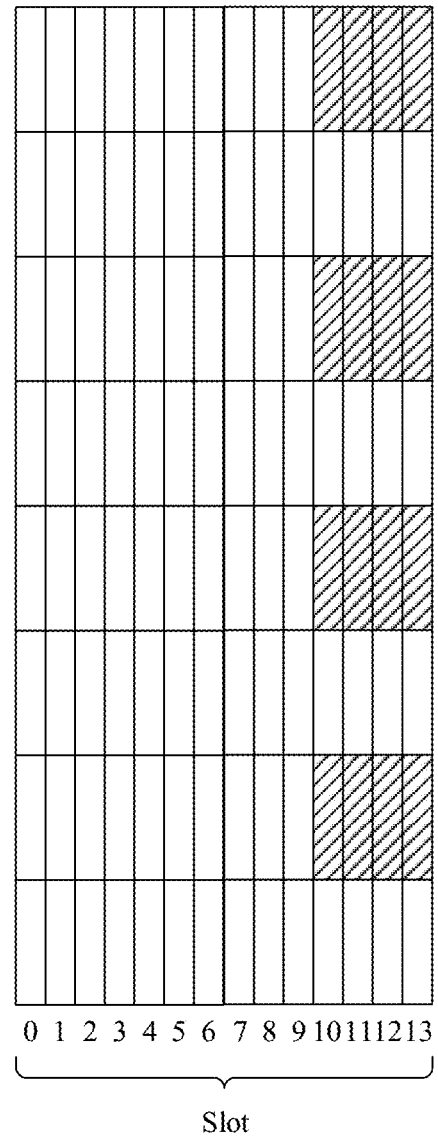

In the case 1, all of the n frequency domain resource segments may be located on one OFDM symbol in the last m OFDM symbols in the time domain unit, or may be located on each of a plurality of consecutive OFDM symbols in the last m OFDM symbols in the time domain unit. For example, it is assumed that m is equal to 4. Referring to FIG. 9(a) or FIG. 10(a), four frequency domain resource segments are located on the last OFDM symbol (namely, an OFDM #13) in the time domain unit. Referring to FIG. 9(b) or FIG. 10(b), four frequency domain resource segments are located on each of the last two OFDM symbols (namely, an OFDM #13 and an OFDM #12) in the time domain unit. Referring to FIG. 9(c) or FIG. 10(c), four frequency domain resource segments are located on each of the last three OFDM symbols (namely, an OFDM #13, an OFDM #12, and an OFDM #11) in the time domain unit. Referring to FIG. 9(d) or FIG. 10(d), four frequency domain resource segments are located on each of the last four OFDM symbols (namely, an OFDM #13, an OFDM #12, an OFDM #11, and an OFDM #10) in the time domain unit.

Figure 11A:
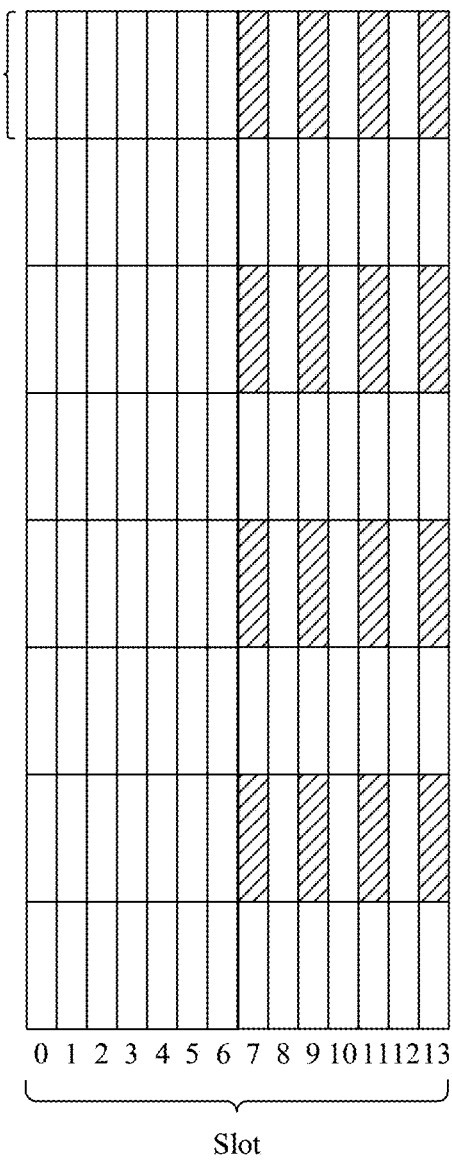
Figure 11B:
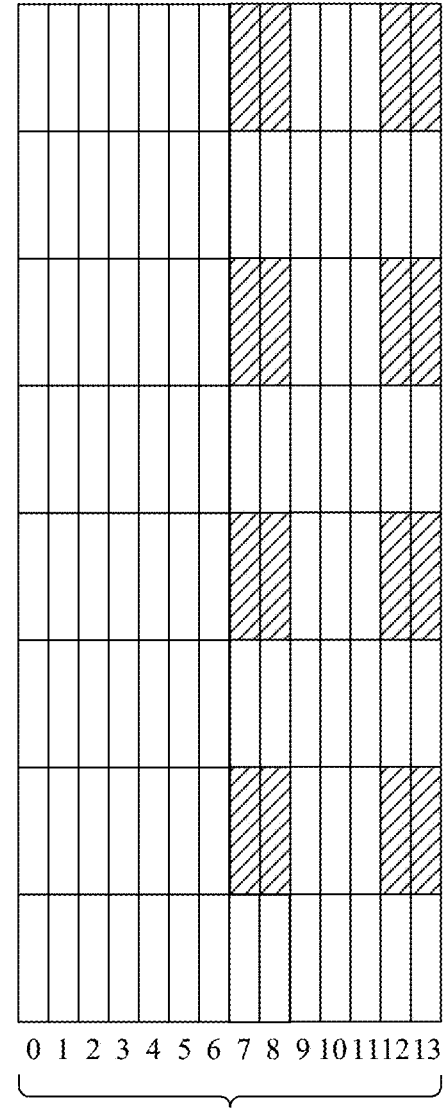
Figure 11C:
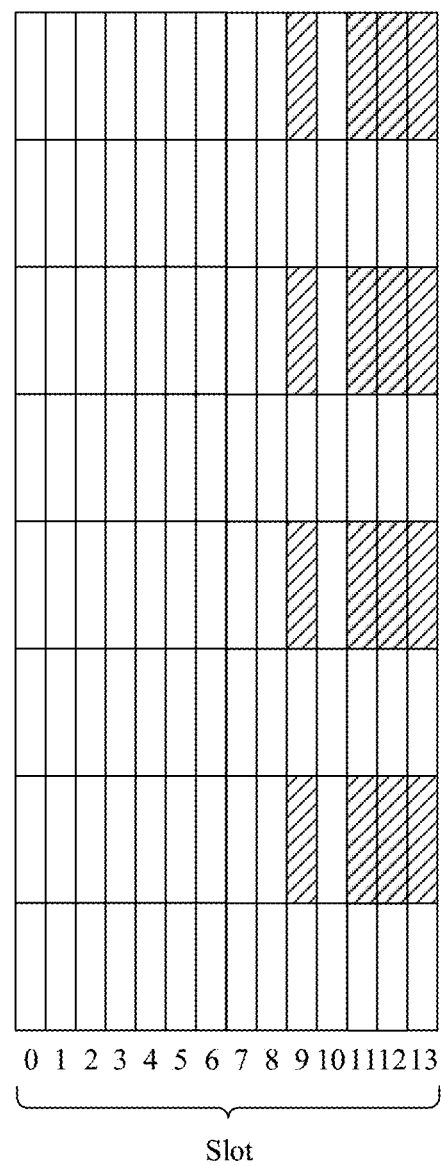
Figure 12A:
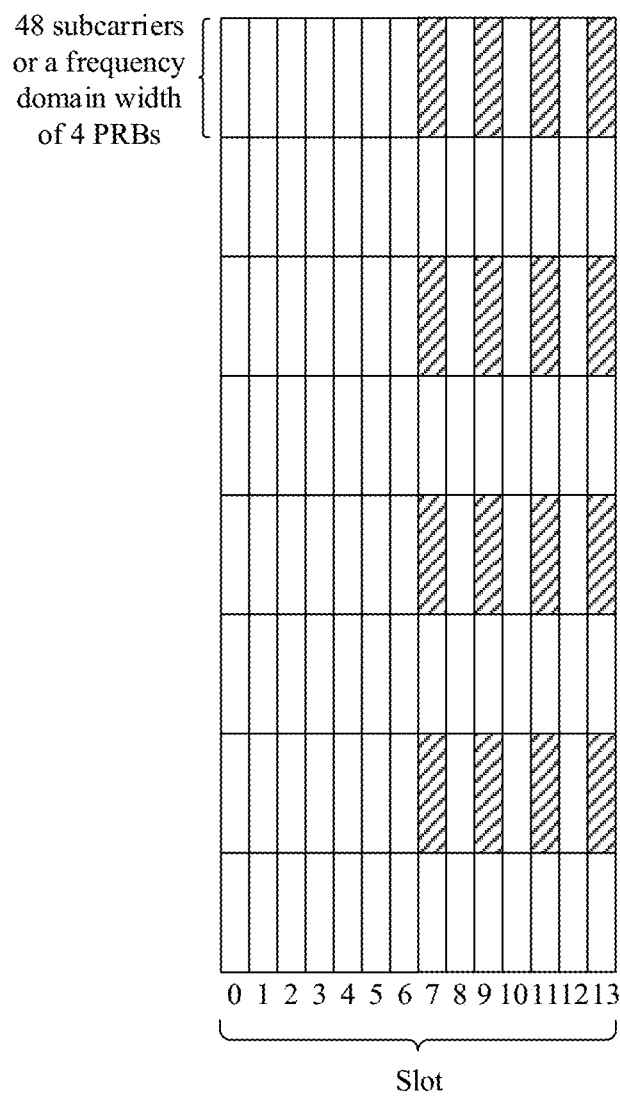
Figure 12B:
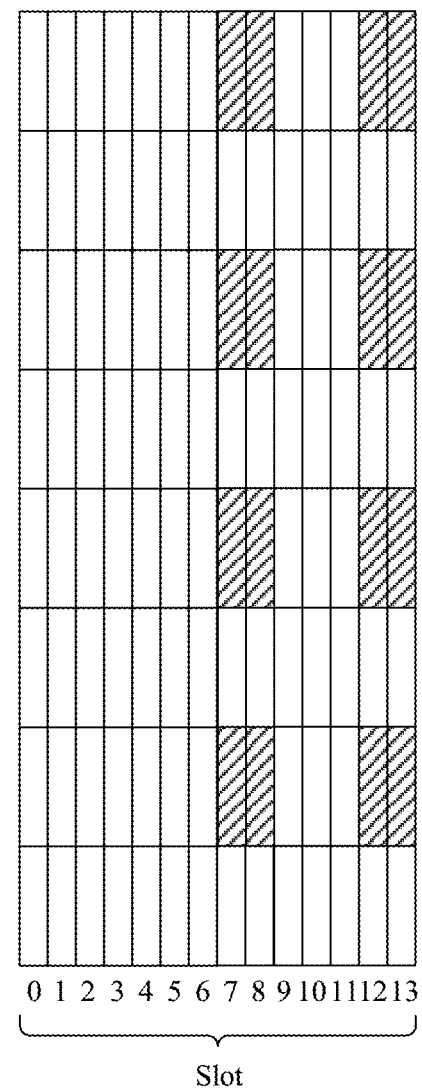
Figure 12C:
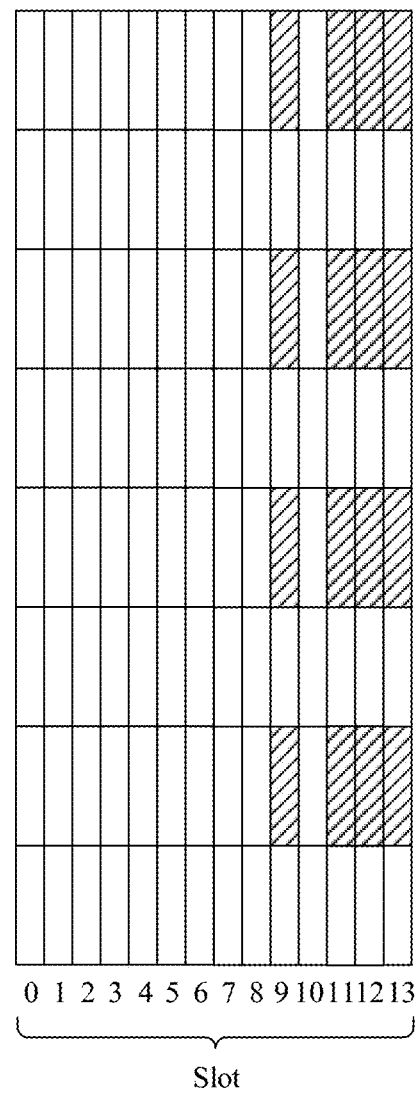

In the case 1, all of the n frequency domain resource segments may alternatively be located on a plurality of nonconsecutive OFDM symbols in the last m OFDM symbols in the time domain unit. For example, it is assumed that m is equal to 7. The n frequency domain resource segments are located on four nonconsecutive OFDM symbols in the last m OFDM symbols in the time domain unit. Referring to FIG. 11(a) or FIG. 12(a), four frequency domain resource segments are located on each OFDM symbol in an OFDM #13, an OFDM #11, an OFDM #9, and an OFDM #7 in the time domain unit. Referring to FIG. 11(b) or FIG. 12(b), four frequency domain resource segments are located on each OFDM symbol in an OFDM #13, an OFDM #12, an OFDM #8, and an OFDM #7 in the time domain unit. Referring to FIG. 11(c) or FIG. 12(c), four frequency domain resource segments are located on each OFDM symbol in an OFDM #13, an OFDM #12, an OFDM #11, and an OFDM #9 in the time domain unit.

Case 2: Different frequency domain resource segments in the n frequency domain resource segments are located on different OFDM symbols in a plurality of OFDM symbols in the last m OFDM symbols in the time domain unit. In this case, when the frequency domain resource segments are located on different OFDM symbols, a peak to average power ratio (peak to average power ratio, PAPR for short) can be reduced.

Figures 13A, 13B:
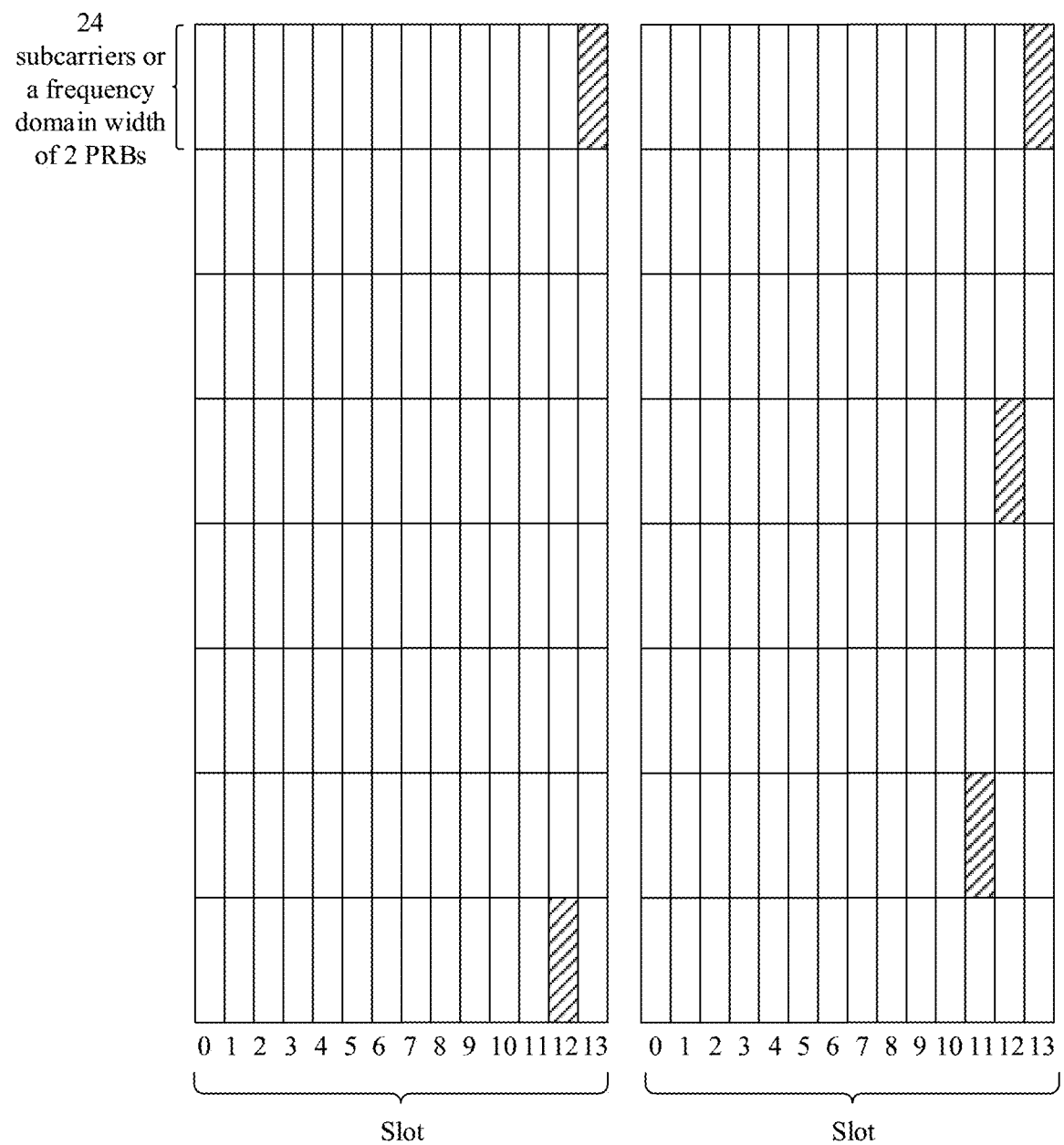
Figure 13C:
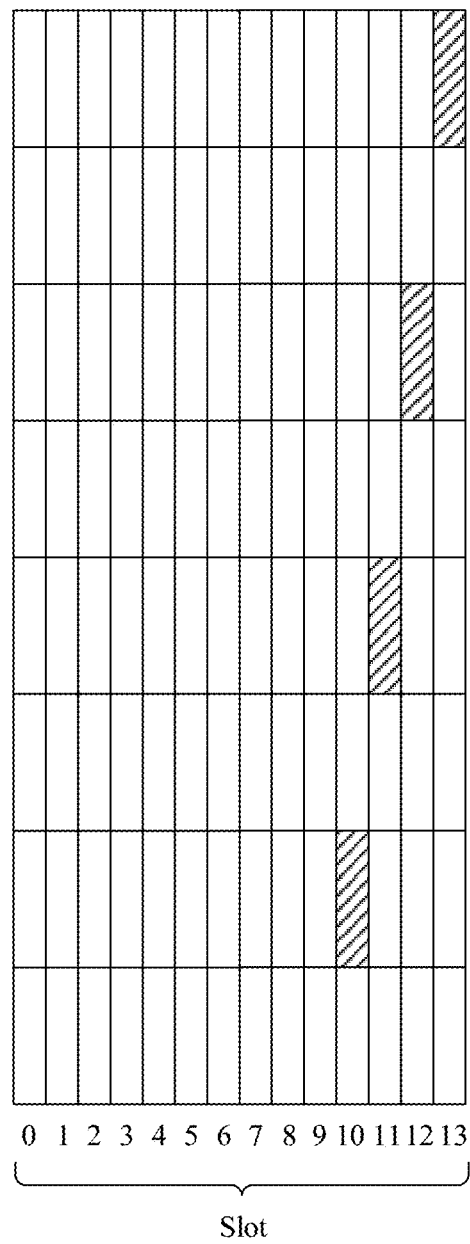
Figure 14A:
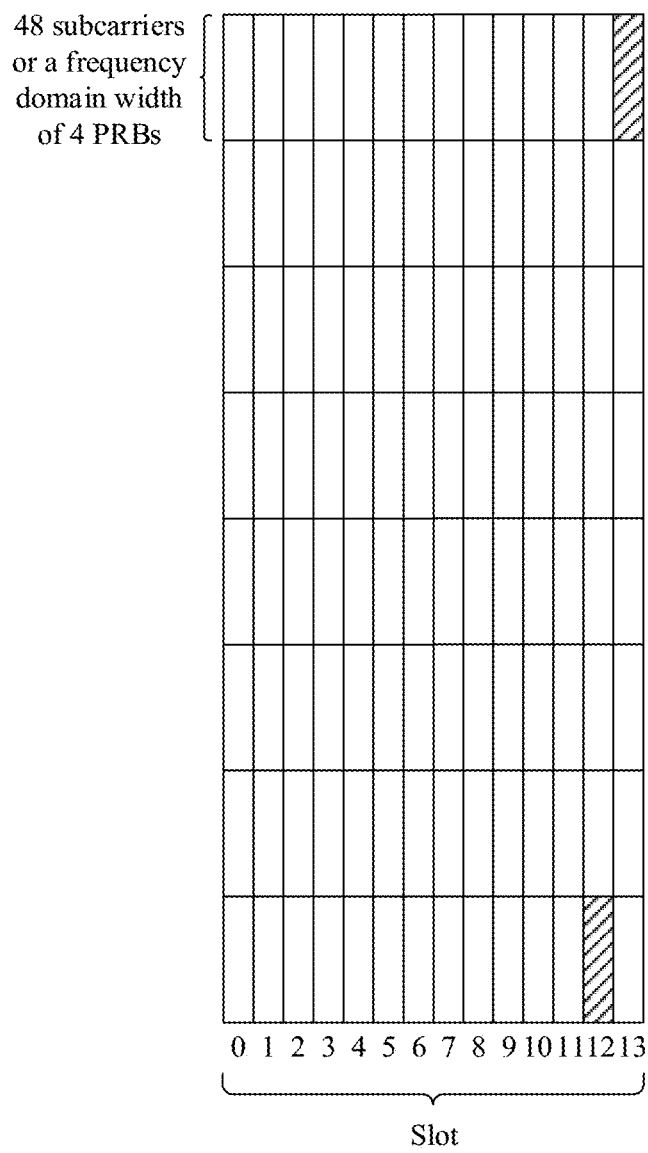
Figure 14B:
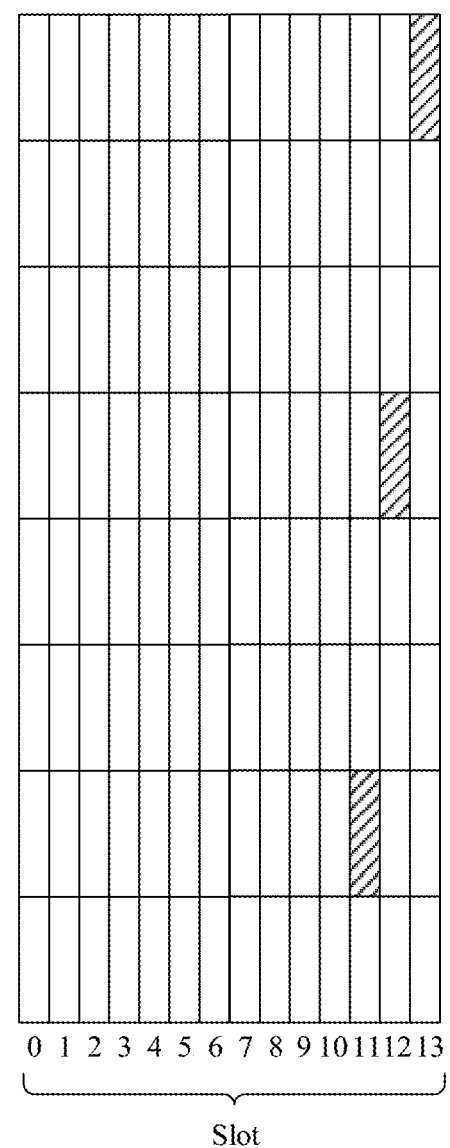
Figure 14C:
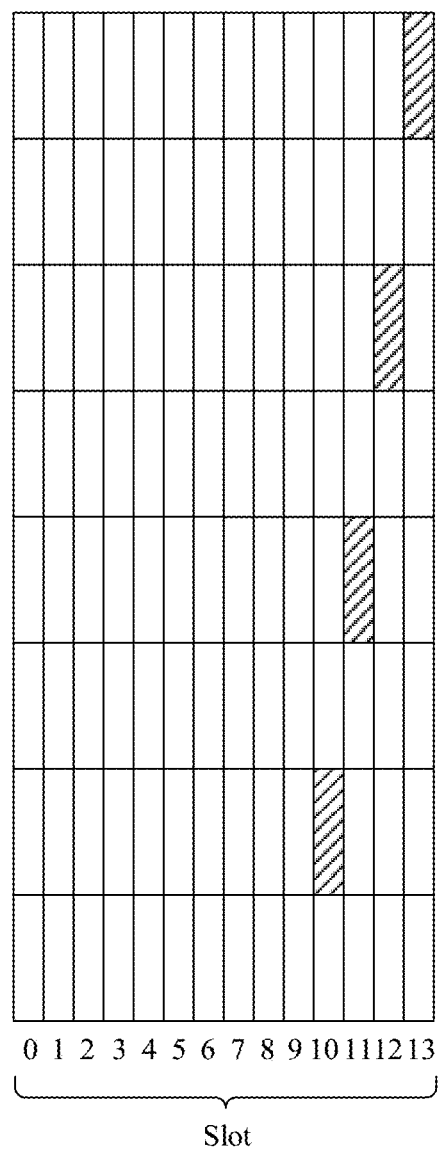

In the case 2, the plurality of OFDM symbols may be a plurality of consecutive OFDM symbols. For example, it is assumed that m is equal to 4. Referring to FIG. 13(a) or FIG. 14(a), two frequency domain resource segments are respectively located on an OFDM #13 and an OFDM #12. Referring to FIG. 13(b) or FIG. 14(b), three frequency domain resource segments are respectively located on an OFDM #13, an OFDM #12, and an OFDM #11 in the time domain unit. Referring to FIG. 13(c) or FIG. 14(c), four frequency domain resource segments are respectively located on an OFDM #13, an OFDM #12, an OFDM #11, and an OFDM #10 in the time domain unit.

Figure 15A:
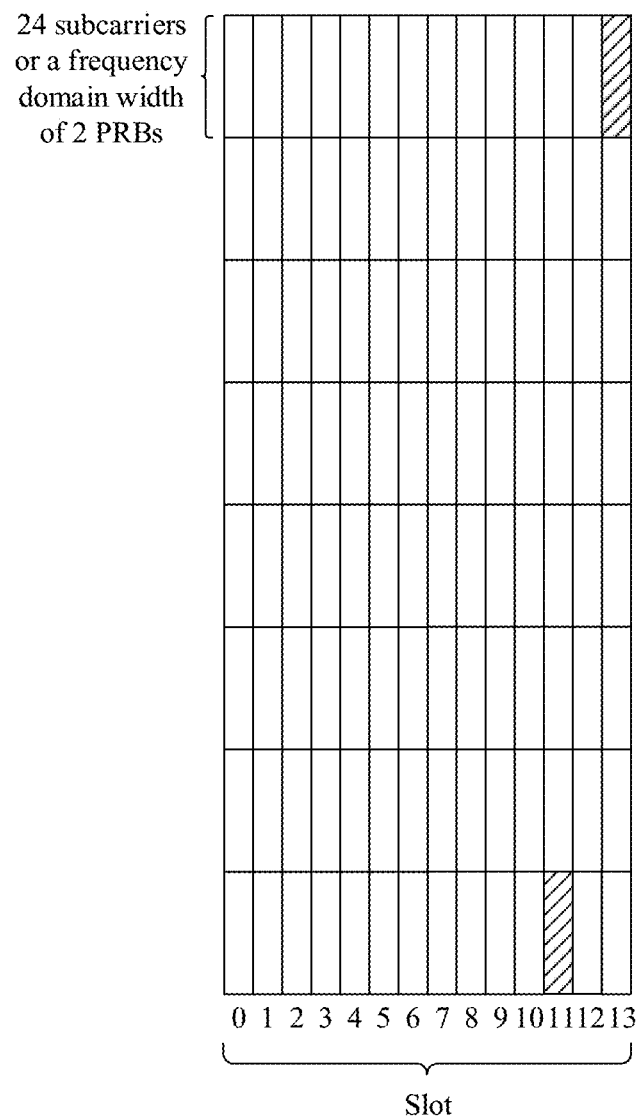
Figure 15B:
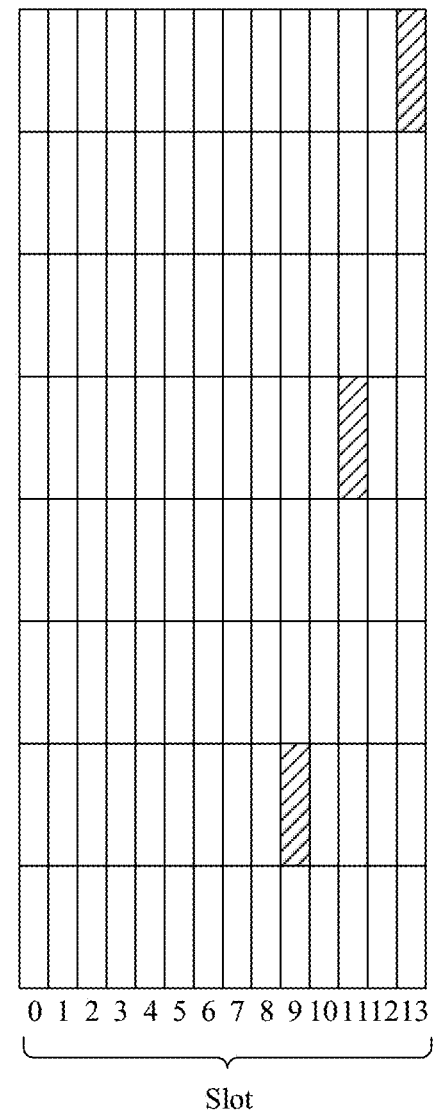
Figure 15C:
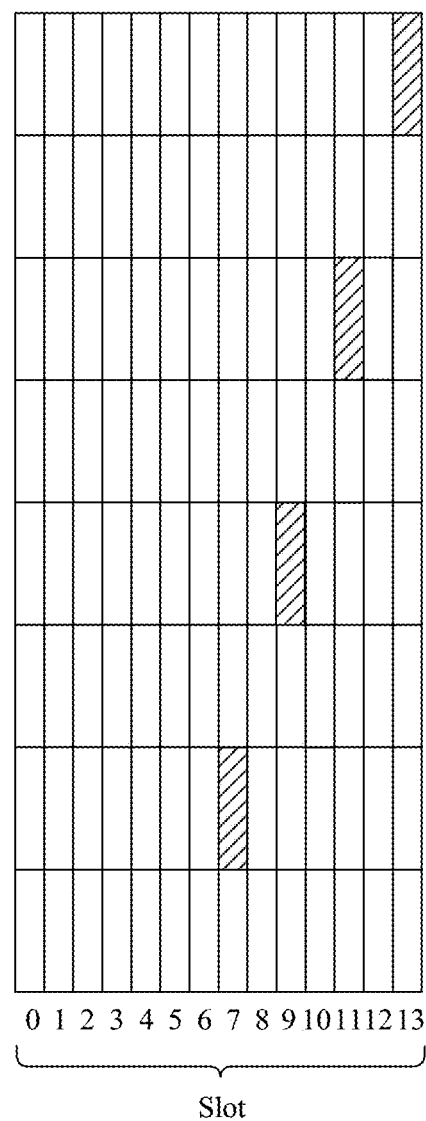
Figure 16A:
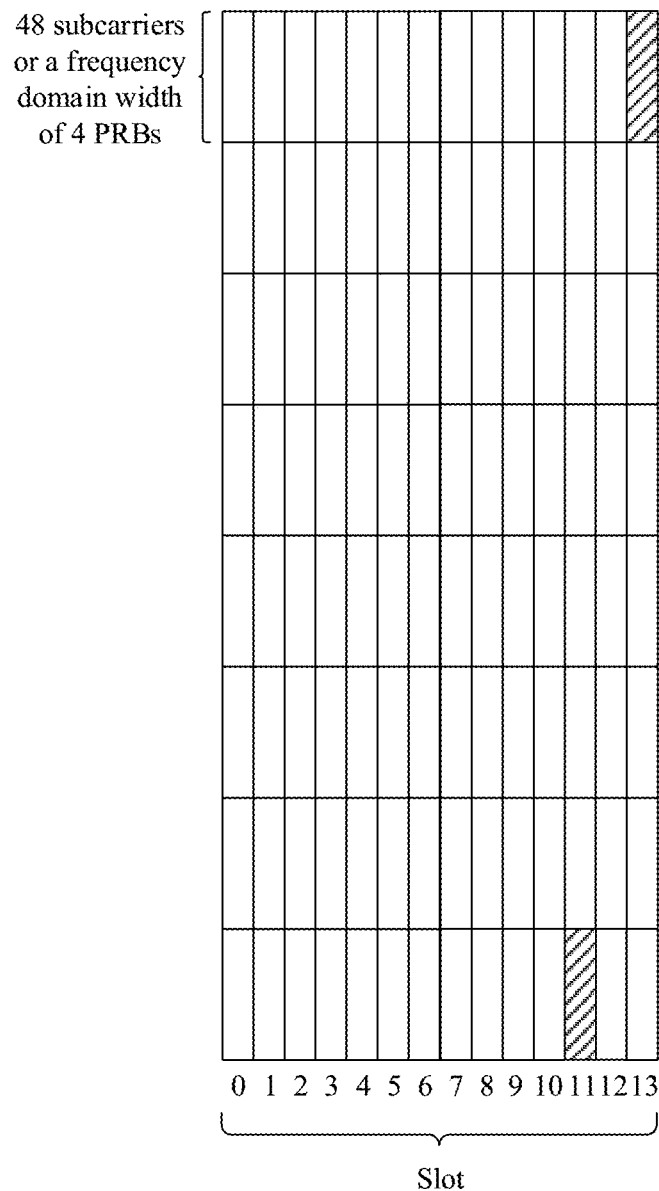
Figure 16B:
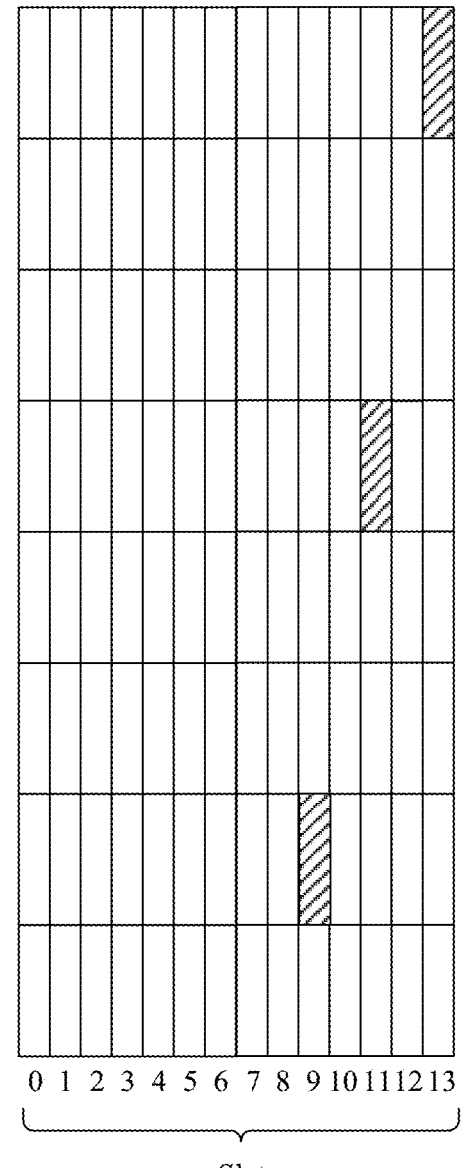
Figure 16C:
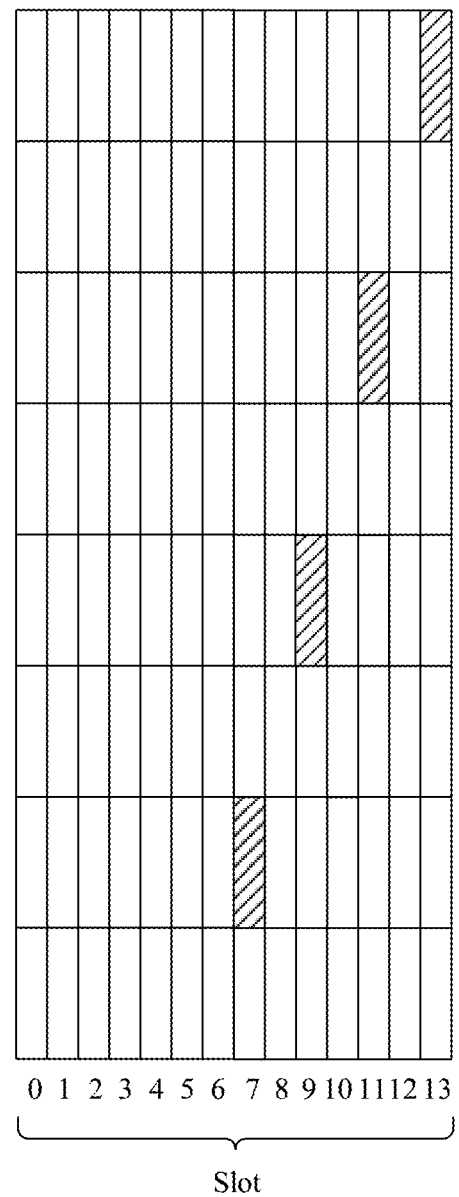

In the case 2, the plurality of OFDM symbols may alternatively be a plurality of nonconsecutive OFDM symbols. For example, it is assumed that m is equal to 7. Referring to FIG. 15(a) or FIG. 16(a), two frequency domain resource segments are respectively located on an OFDM #13 and an OFDM #11. Referring to FIG. 15(b) or FIG. 16(b), three frequency domain resource segments are respectively located on an OFDM #13, an OFDM #11, and an OFDM #9 in the time domain unit. Referring to FIG. 15(c) or FIG. 16(c), four frequency domain resource segments are respectively located on an OFDM #13, an OFDM #11, an OFDM #9, and an OFDM #7 in the time domain unit.

Case 3: At least two of the n frequency domain resource segments are located on different OFDM symbols in a plurality of OFDM symbols in the last m OFDM symbols in the time domain unit, and at least two of the n frequency domain resource segments are located on a same OFDM symbol in the plurality of OFDM symbols in the last m OFDM symbols in the time domain unit.

Figure 17A:
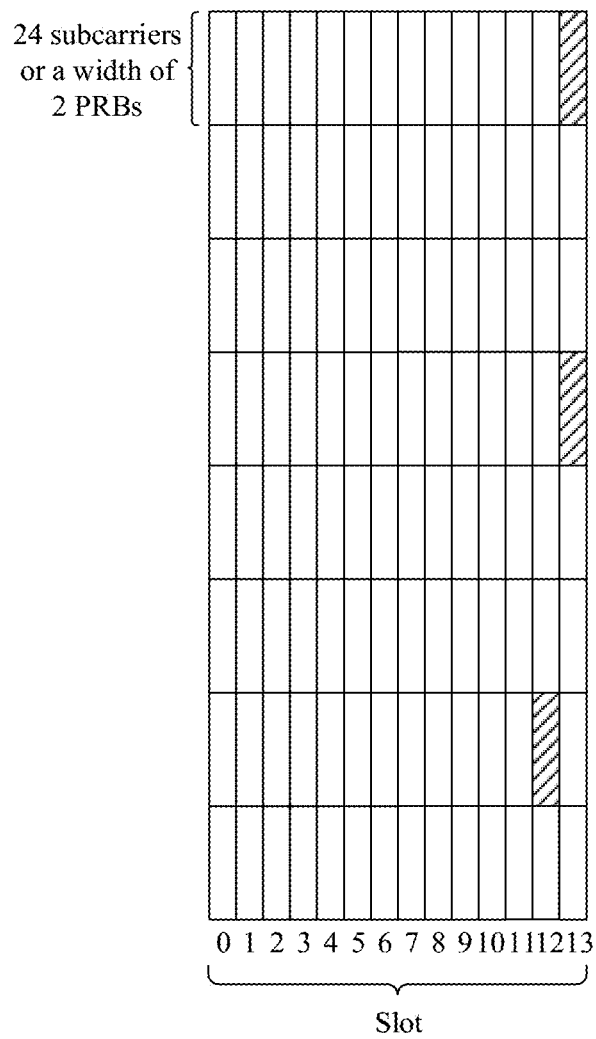
Figure 17B:
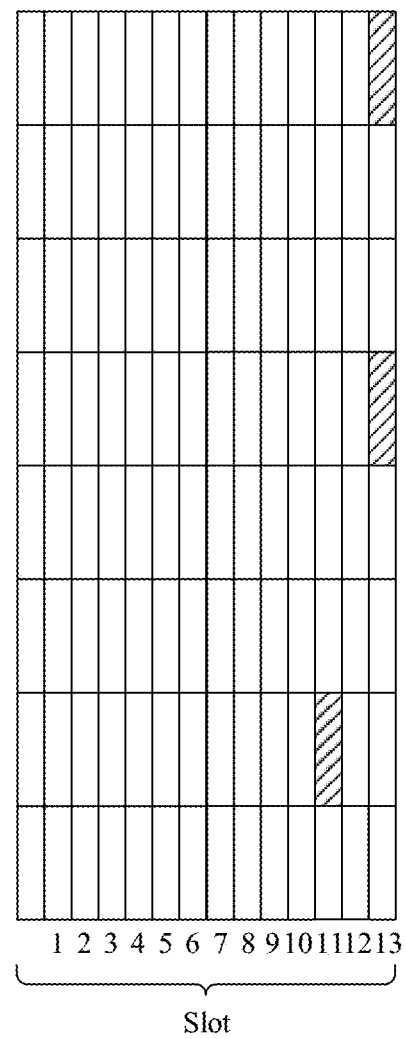
Figure 17C:
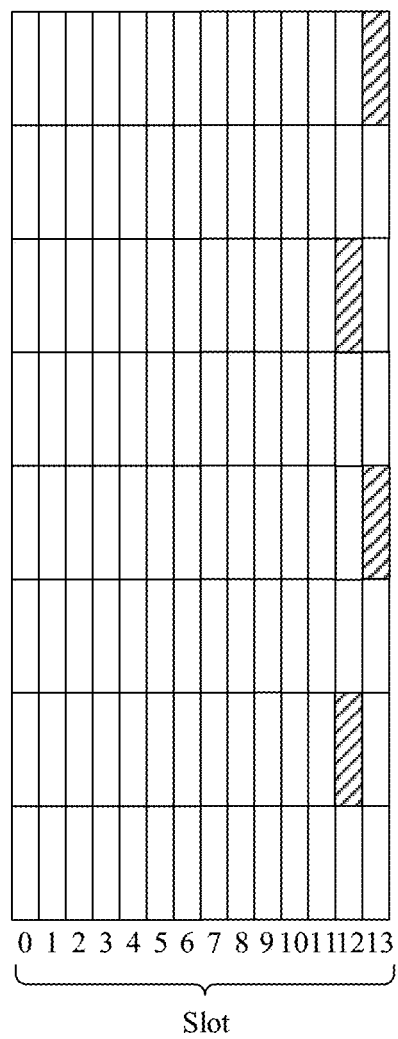
Figure 18A:
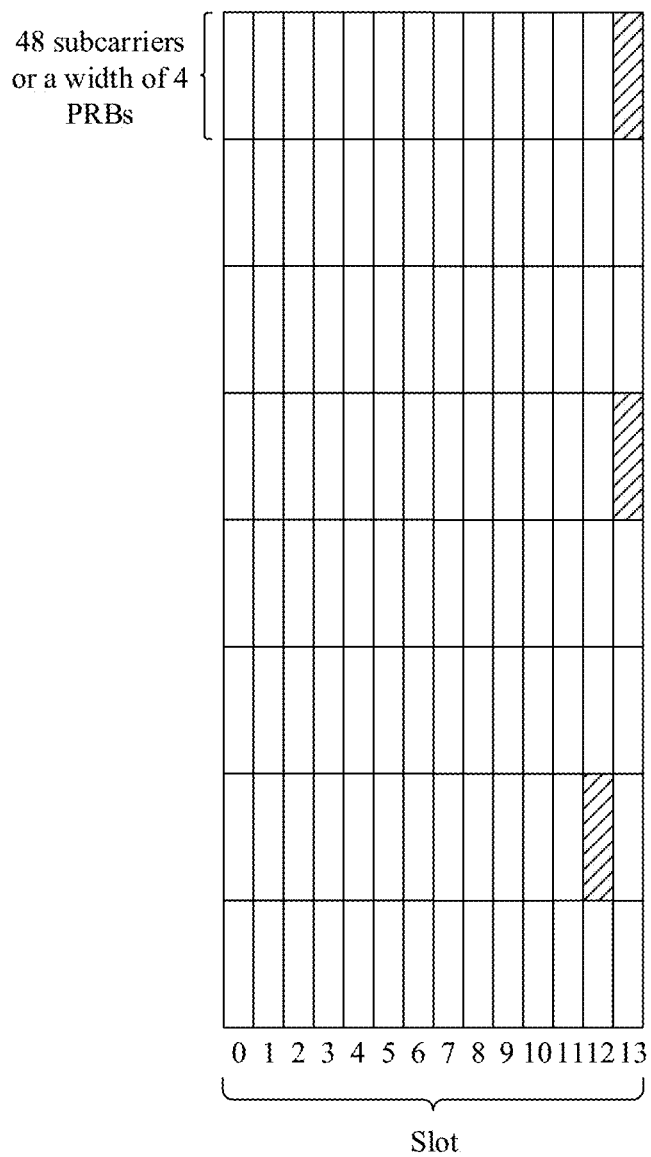
Figure 18B:
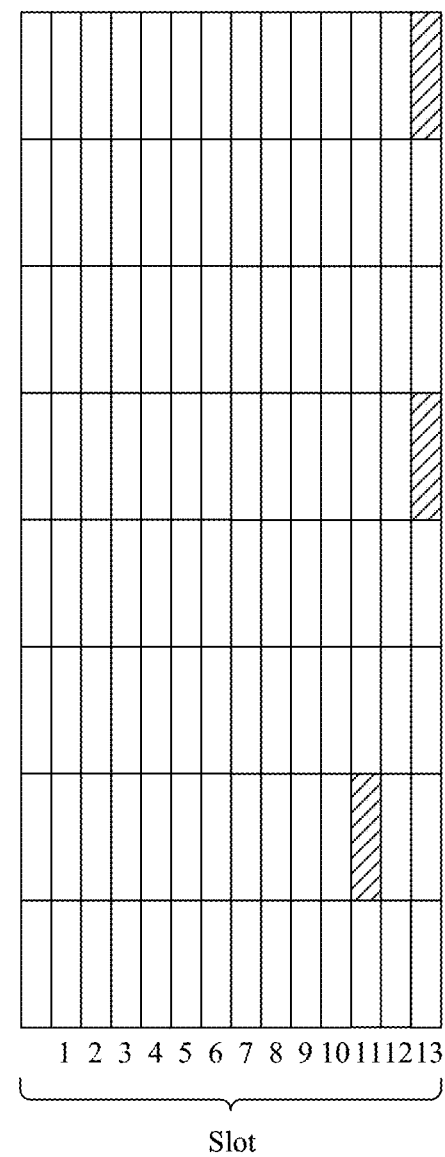
Figure 18C:
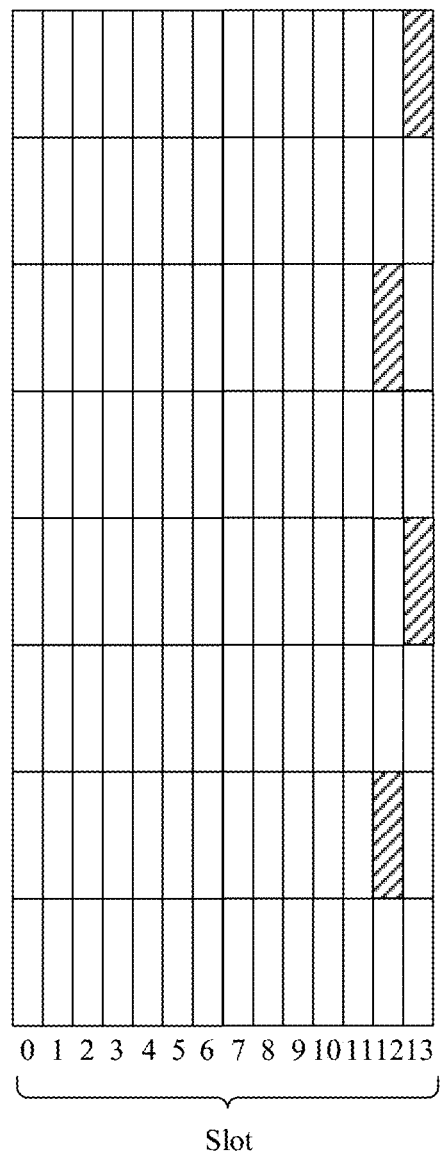

In the case 3, the plurality of OFDM symbols may be a plurality of consecutive OFDM symbols. For example, it is assumed that m is equal to 2. Referring to FIG. 17(a) or FIG. 18(a), three frequency domain resource segments are located on an OFDM #13 and an OFDM #12, where two frequency domain resource segments are located on the OFDM #13, and one frequency domain resource segment is located on the OFDM #12. Referring to FIG. 17(c) or FIG. 18(c), four frequency domain resource segments are located on an OFDM #13 and an OFDM #12, where two frequency domain resource segments are located on the OFDM #13, and two frequency domain resource segments are located on the OFDM #12.

Figure 17D:
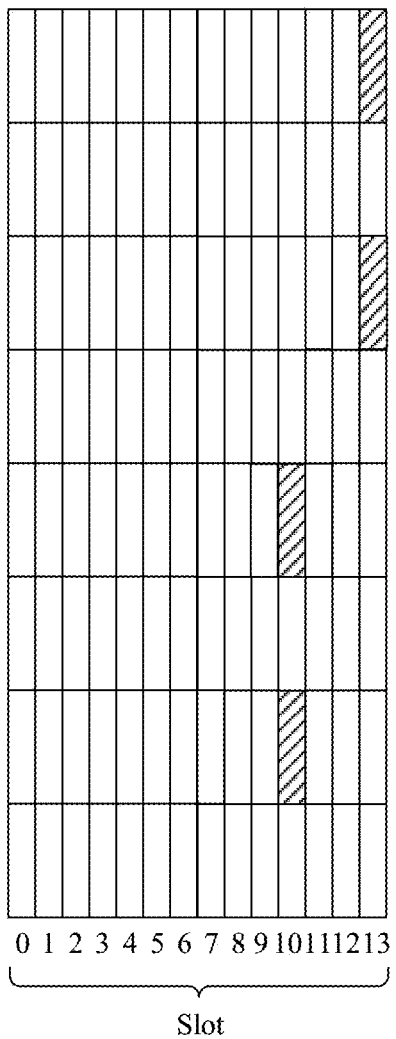
Figure 18D:
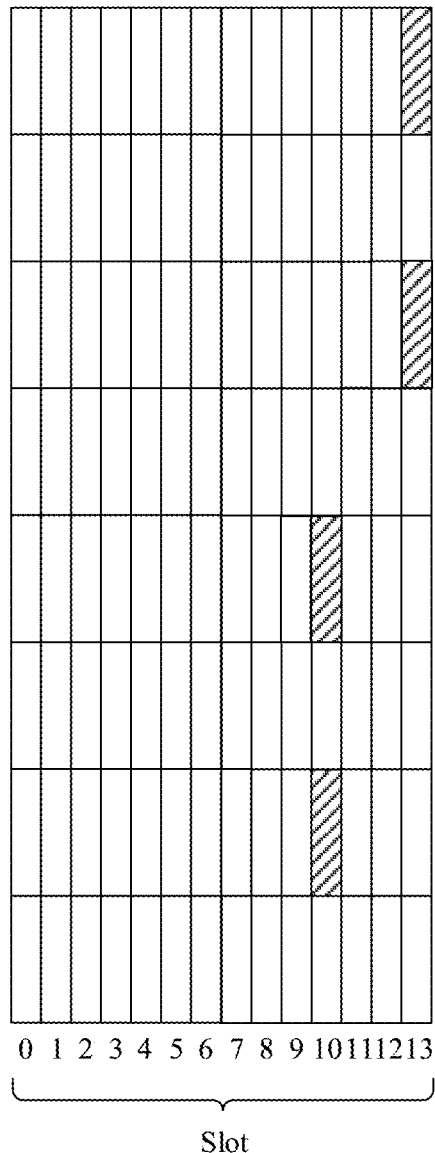

In the case 3, the plurality of OFDM symbols may alternatively be a plurality of nonconsecutive OFDM symbols. For example, it is assumed that m is equal to 4. Referring to FIG. 17(b) or FIG. 18(b), three frequency domain resource segments are located on an OFDM #13 and an OFDM #11, where two frequency domain resource segments are located on the OFDM #13, and one frequency domain resource segment is located on the OFDM #11. Referring to FIG. 17(d) or FIG. 18(d), four frequency domain resource segments are located on an OFDM #13 and an OFDM #10, where two frequency domain resource segments are located on the OFDM #13, and two frequency domain resource segments are located on the OFDM #10.

Feature 4: Distribution of the first RS, in frequency domain, carried on each of the n frequency domain resource segments uses a comb structure, that is, a pattern of the first RSs carried on each of the n frequency domain resource segments is a comb structure. In the feature 4, a time-frequency resource occupied by the first RS can be saved.

For example, the comb structure may be a comb structure of comb 2, comb 3, or comb 4, or may be another comb structure. This is not specifically limited in this embodiment of this application. For distribution of the first RS, in frequency domain, on the frequency domain resource segments in FIG. 7(a) to FIG. 18(d) and FIG. 21(a) to FIG. 23(b), refer to FIG. 3(a), FIG. 3(b), FIG. 3(c), FIG. 3(d), FIG. 3(e), or FIG. 3(f).

Figure 19A:
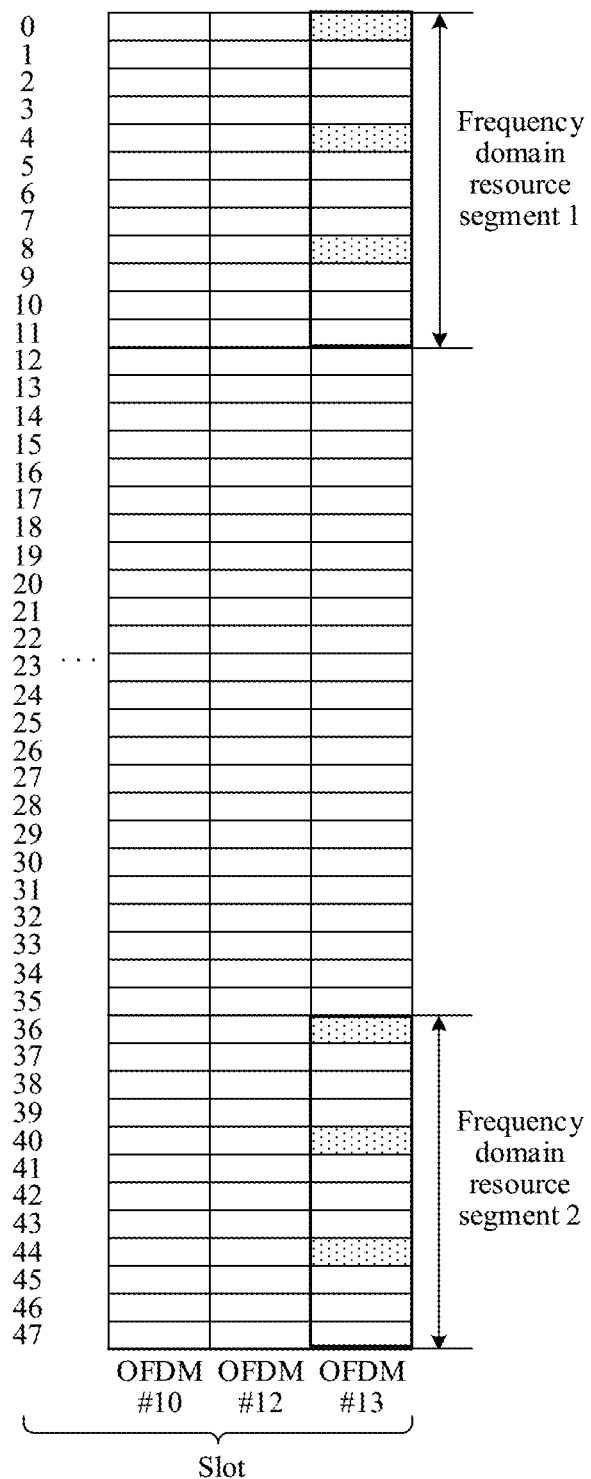

For example, FIG. 19(a) shows a schematic diagram of distribution of the first RS on a time-frequency resource including an OFDM #13 and a frequency domain resource segment 1 (including subcarriers whose indexes are 0 to 11) and a schematic diagram of distribution of the first RSs on a time-frequency resource including the OFDM #13 and a frequency domain resource segment 2 (including subcarriers whose indexes are 36 to 47) when the comb structure is comb 4.

Figure 19B:
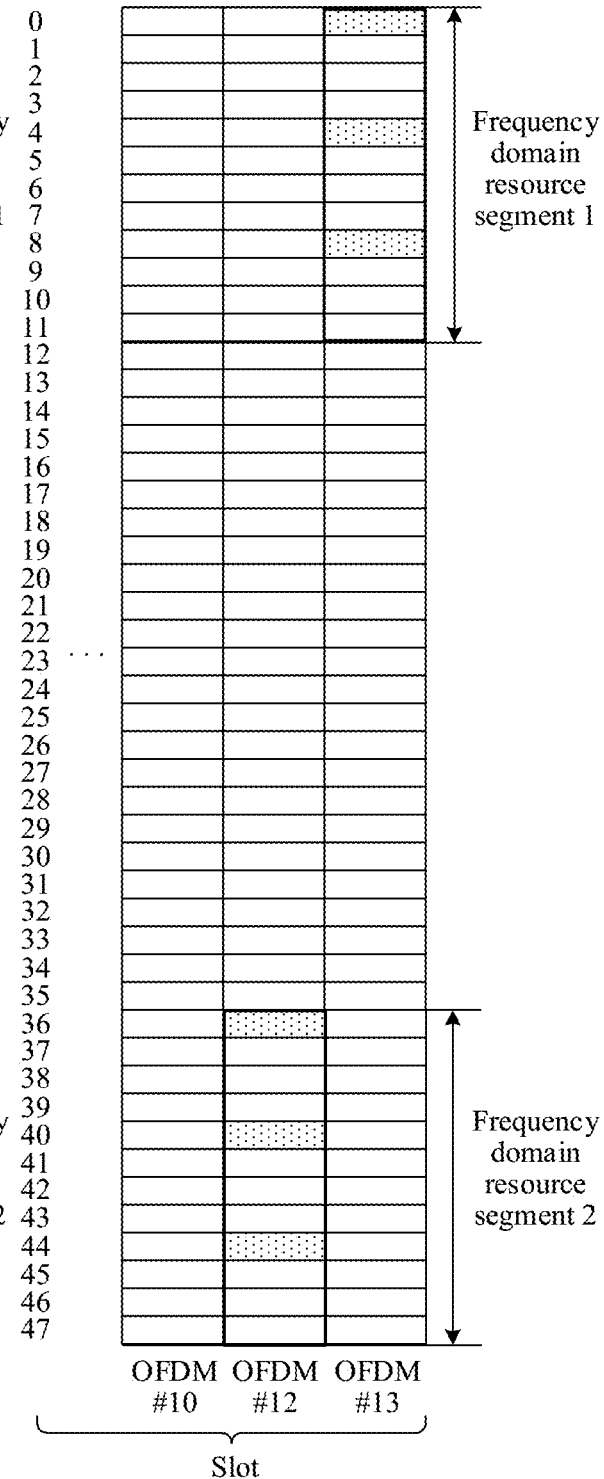

For example, FIG. 19(b) shows a schematic diagram of distribution of the first RS on a time-frequency resource including an OFDM #13 and a frequency domain resource segment 1 (including subcarriers whose indexes are 0 to 11) and a schematic diagram of distribution of the first RSs on a time-frequency resource including an OFDM #12 and a frequency domain resource segment 2 (including subcarriers whose indexes are 36 to 47) when the comb structure is comb 4.

In addition, distribution of the first RS, in frequency domain, carried on each of the n frequency domain resource segments may not use a comb structure. In this case, in FIG. 7(a) to FIG. 23(b), a first RS on a frequency domain resource segment on each OFDM symbol is distributed on all resources in the frequency domain resource segments on the OFDM symbol.

Feature 5: The first RS carried on each of the n frequency domain resource segments uses a same comb structure in frequency domain, and start frequency domain positions (start positions for short) or end frequency domain positions (end positions for short) of the first RSs on respective frequency domain resource segments are the same.

In other words, patterns of the first RSs on frequency domain resource segments in different OFDM symbols or on different frequency domain resource segments in a same OFDM symbol are the same.

For example, referring to FIG. 19(a), distribution of first RS, in frequency domain, on two frequency domain resource segments on an OFDM #13 are the same, that is, patterns of the first RSs on the two frequency domain resource segments on the OFDM #13 are the same.

It should be noted that, patterns of the first RSs on frequency domain resource segments in different OFDM symbols or patterns on different frequency domain resource segments in a same OFDM symbol may also be different. This is not limited in this embodiment of this application. For example, comb structures of first RSs on at least two of the n frequency domain resource segments are different, or start positions of first RSs on at least two frequency domain resource segments are different, or end positions of first RSs on at least two frequency domain resource segments are different.

In the feature 5, that start positions (or end positions) of first RSs on respective frequency domain resource segments are the same means that spacings between the start positions (or the end positions) of the first RSs on respective frequency domain resource segments and a subcarrier with the smallest index or a subcarrier with the largest index in the respective frequency domain resource segments are the same.

For example, referring to FIG. 19(a), a start position of a first RS on a frequency domain resource segment 1 is a subcarrier whose index is 0, and a subcarrier with the smallest index in the frequency domain resource segment 1 is also the subcarrier whose index is 0. In this case, for the frequency domain resource segment 1, a spacing between the start position of the first RS on the frequency domain resource segment 1 and the subcarrier with the smallest index in the frequency domain resource segment 1 is 0. A start position of a first RS on a frequency domain resource segment 2 is a subcarrier whose index is 36, and a subcarrier with the smallest index in the frequency domain resource segment 2 is also the subcarrier whose index is 36. In this case, for the frequency domain resource segment 2, a spacing between the start position of the first RS on the frequency domain resource segment 2 and the subcarrier with the smallest index in the frequency domain resource segment 2 is also 0. In this case, the start positions of the first RSs in respective frequency domain resource segments are the same.

For example, referring to FIG. 19(a), an end position of a first RS on a frequency domain resource segment 1 is a subcarrier whose index is 8, and a subcarrier with the largest index in the frequency domain resource segment 1 is a subcarrier whose index is 11. In this case, for the frequency domain resource segment 1, a spacing between the end position of the first RS on the frequency domain resource segment 1 and the subcarrier with the largest index in the frequency domain resource segment 1 is 3. An end position of a first RS on a frequency domain resource segment 2 is a subcarrier whose index is 44, and a subcarrier with the largest index in the frequency domain resource segment 2 is a subcarrier whose index is 47. In this case, for the frequency domain resource segment 2, a spacing between the end position of the first RS on the frequency domain resource segment 2 and the subcarrier with the largest index in the frequency domain resource segment 2 is 3. In this case, the end positions of the first RSs in respective frequency domain resource segments are the same.

Feature 6: The first RSs carried on different frequency domain resource segments in the n frequency domain resource segments are from one sequence, and elements included in the first RSs carried on the different frequency domain resource segments are all different, or elements included in the first RSs carried on the different frequency domain resource segments are at least partially the same; or the first RSs carried on different frequency domain resource segments in the n frequency domain resource segments are from some or all elements in respective corresponding sequences.

The different frequency domain resource segments in the feature 6 may be any one of the following case (1) or case (2).

Case (1): Different frequency domain resource segments on different OFDM symbols. For example, in FIG. 19(b), a frequency domain resource segment 1 on an OFDM #13 and a frequency domain resource segment 2 on an OFDM #12 belong to different frequency domain resource segments.

Case (2): Different frequency domain resource segments on a same OFDM symbol. For example, in FIG. 19(a), a frequency domain resource segment 1 and a frequency domain resource segment 2 on an OFDM #13 belong to different frequency domain resource segments.

In a possible implementation, elements included in first RSs carried on different frequency domain resource segments on different OFDM symbols are from one sequence, or elements included in first RSs carried on different frequency domain resource segments on a same OFDM symbol are from one sequence.

In another possible implementation, elements included in first RSs carried on different frequency domain resource segments on different OFDM symbols are from some or all elements in respective corresponding sequences, or elements included in first RSs carried on different frequency domain resource segments on a same OFDM symbol are from some or all elements in respective corresponding sequences.

Figure 22A:
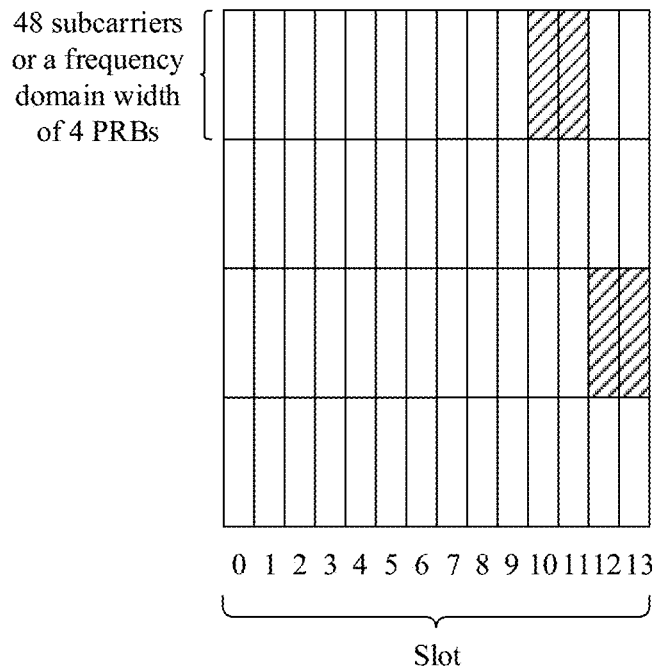

It should be noted that, in the feature 6, different parts of a same frequency domain resource segment on different OFDM symbols are referred to as different parts of the same frequency domain resource segment; elements included in first RSs carried on different parts of a same frequency domain resource segment may also be from one sequence, or from respective sequences. A frequency domain resource segment shown in FIG. 22(a) is distributed in two parts on an OFDM #10 and an OFDM #11. Elements included in first RSs carried on the two parts may be from one sequence, or from respective sequences.

Description is provided below by using an example of elements included in first RSs carried on different frequency domain resource segments, and a case of elements included in first RSs carried on different parts of different OFDM symbols on a same frequency domain resource segment are similar to this.

For example, when elements included in first RSs carried on different frequency domain resource segments in the n frequency domain resource segments are from one sequence, if a first RS carried on one frequency domain resource segment includes the fifth to the tenth elements in a sequence, and a first RS carried on another frequency domain resource segment includes the eighth to the thirteenth elements in the sequence, elements included in the first RSs carried on the two frequency domain resource segments are partially the same (the eighth, ninth, and tenth elements are the same);

if a first RS carried on one frequency domain resource segment includes the fifth to the tenth elements in a sequence, and a first RS carried on another frequency domain resource segment also includes the fifth to the tenth elements in the sequence, elements included in the first RSs carried on the two frequency domain resource segments are all the same;

if a first RS carried on one frequency domain resource segment includes the fifth to the tenth elements in a sequence, and a first RS carried on another frequency domain resource segment includes the eleventh to the fifteenth elements in the sequence, elements included in the first RSs carried on the two frequency domain resource segments are all different.

It should be noted that the elements are different or the same herein means that when elements are obtained from a sequence, positions of the elements in the original sequence are different or the same. An $n^{th}$ element (for example, an eleventh element) refers to an $n^{th}$ element in a sequence, and represents a position in the original sequence. The position is usually represented by using an index (index). For example, an element whose index is n represents the $n^{th}$ element in the original sequence. For example, a sequence is {1, 2, 3, 4, 5, 6, 1, 2, 3, 4, 5, 6}, a first RS carried on a frequency domain resource segment includes the first to the sixth elements (elements whose indexes are 1, 2, 3, 4, 5, and 6), and values of the elements are 1, 2, 3, 4, 5, and 6. A first RS carried on another frequency domain resource segment includes the seventh to the twelfth elements (elements whose indexes are 7, 8, 9, 10, 11, and 12), and values of the elements are also 1, 2, 3, 4, 5, and 6. Although the values of the elements are all 1, 2, 3, 4, 5, and 6, indexes of the elements are different. Therefore, in this case, it is considered that the elements included in RSs carried in the two frequency domain resource segments are all different.

The first RSs carried on different frequency domain resource segments in the n frequency domain resource segments include some or all elements in respective corresponding sequences. The respective corresponding sequences herein may be a same sequence or may be different sequences. For example:

When elements {1, 2} included in a first RS carried on a frequency domain resource segment are the first element and the second element from a first sequence {1, 2, 3, 4, 5, 6, 7, 8}, and elements {5, 6} included in a first RS carried on another frequency domain resource segment are the first element and the second element from a second sequence {5, 6, 7, 8, 9, 10}, in this case, elements included in the first RSs carried on the two frequency domain resource segments are from respective sequences, and the first sequence and the second sequence are different.

When elements {2, 3, 4, 5} included in a first RS carried on a frequency domain resource segment are the second to the fifth elements from a first sequence {1, 2, 3, 4, 5, 6}, and elements {2, 3, 4, 5} included in a first RS carried on another frequency domain resource segment are the third to the sixth elements from a second sequence {6, 1, 2, 3, 4, 5}, in this case, elements included in the first RSs carried on the two frequency domain resource segments are from respective corresponding sequences. A value of the first element (whose index is 1) in the first sequence is 1, and a value of the first element (whose index is 1) in the second sequence is 6. The two sequences are different sequences. Therefore, elements included in the first RSs carried on the two frequency domain resource segments are from respective corresponding and different sequences. The sequences described herein are different as long as values of elements corresponding to a same index are different. In other words, in the two sequences, as long as values of elements corresponding to a same index are different, the two sequences are considered to be different sequences.

When elements {1, 2} included in a first RS carried on a frequency domain resource segment are the first element and the second element from a first sequence {1, 2, 3, 4, 5, 6}, and elements {5, 6} included in a first RS carried on another frequency domain resource segment are the fifth element and the sixth element from a second sequence {1, 2, 3, 4, 5, 6}, in this case, elements included in the first RSs carried on the two frequency domain resource segments are from respective corresponding sequences, the first sequence and the second sequence are the same, but elements included in the first RSs carried on the two frequency domain resource segments are elements from respective corresponding sequences. Herein, the first sequence and the second sequence are the same means that in the two sequences, all values of elements corresponding to a same index are the same. In other words, in the two sequences, if all values of elements corresponding to a same index are the same, it is considered that the two sequences are the same sequence.

When elements {1, 2, 3, 4} included in a first RS carried on a frequency domain resource segment are the first to the fourth element from a first sequence {1, 2, 3, 4, 5, 6}, and elements {3, 4, 5, 6} included in a first RS carried on another frequency domain resource segment are the third to the sixth element from a second sequence {1, 2, 3, 4, 5, 6}, in this case, elements included in the first RSs carried on the two frequency domain resource segments are from respective corresponding sequences, the first sequence and the second sequence are the same, but elements included in the first RSs carried on the frequency domain resource segments are different.

When elements {1, 2, 3, 4} included in a first RS carried on a frequency domain resource segment are the first to the fourth element from a first sequence {1, 2, 3, 4, 5, 6}, and elements {1, 2, 3, 4} included in a first RS carried on another frequency domain resource segment are the first to the fourth element from a second sequence {1, 2, 3, 4, 5, 6}, in this case, elements included in the first RSs carried on the two frequency domain resource segments are from respective corresponding sequences, the first sequence and the second sequence are the same, and elements included in the first RSs carried on the frequency domain resource segments are also the same.

In the feature 6, elements carried on the n frequency domain resource segments are used to estimate a channel of one or more antenna ports.

In the feature 6, sequences corresponding to respective first RSs carried on different frequency domain resource segments may be the same or different. The different sequences may be sequences with different quantities of elements or sequences with different elements at at least one same position. The same sequences refer to sequences with a same quantity of elements and whose elements at each position are the same.

For example, when the sequences are ZC sequences, different sequences may be sequences corresponding to different cyclic shifts (cyclic shift), sequences corresponding to different root sequences (root sequence), sequences corresponding to different cyclic shifts and different root sequences, or sequences with different quantities of elements. Same sequences refer to sequences corresponding to a same cyclic shift and a same root sequence.

When first RSs carried on different frequency domain resource segments in the n frequency domain resource segments include elements from different parts of a sequence, the elements carried on different frequency domain resource segments may be determined by intercepting (or selecting) a sequence.

Figures 20A, 20B:
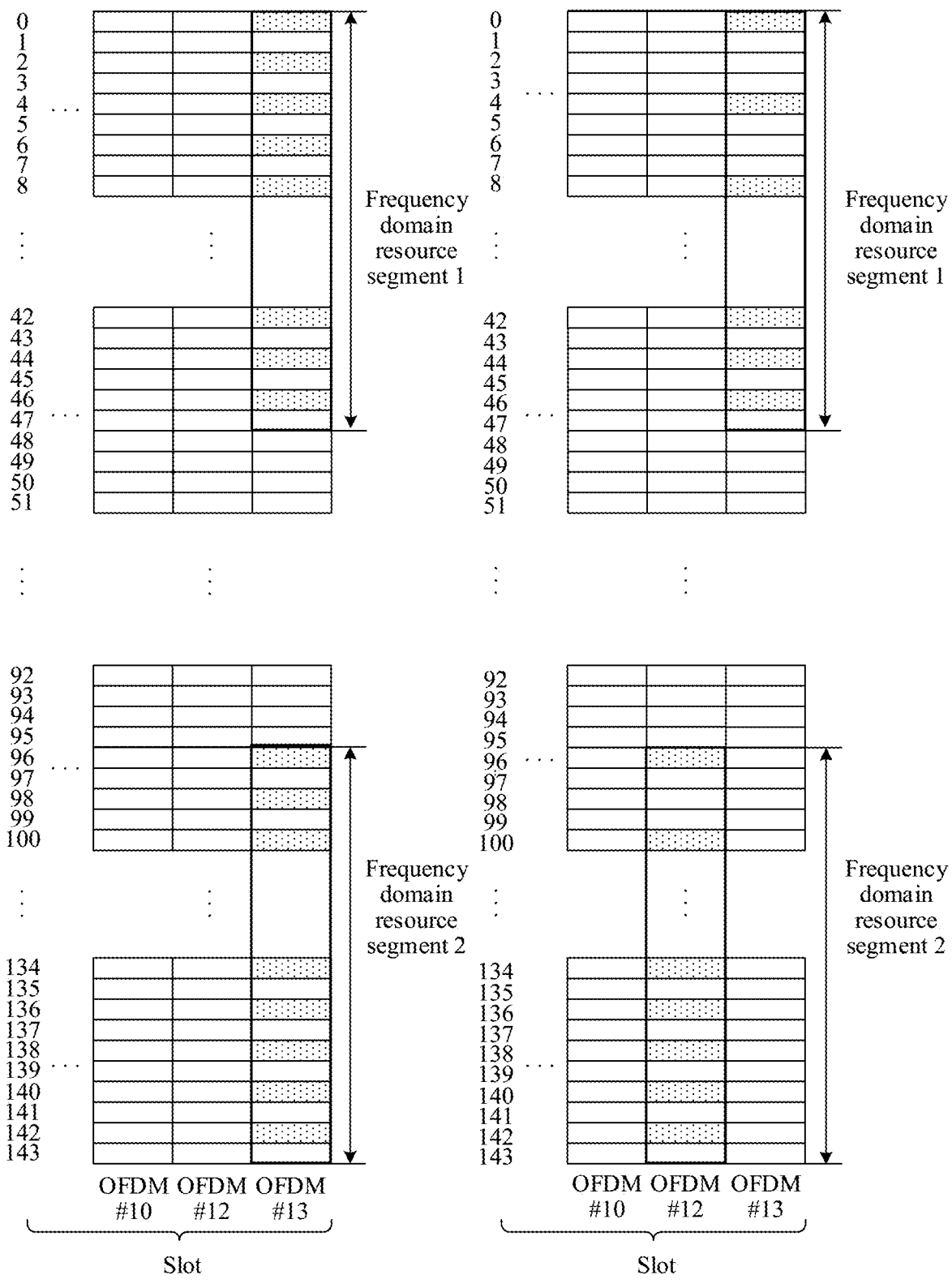
Figure 21A:
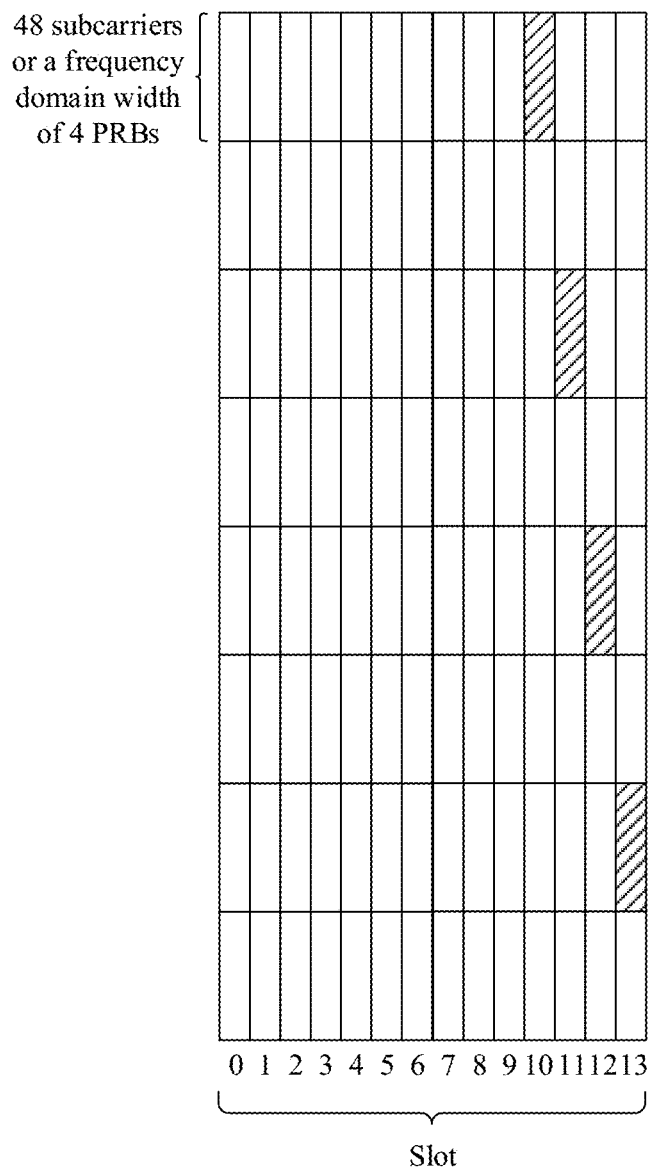
Figure 21B:
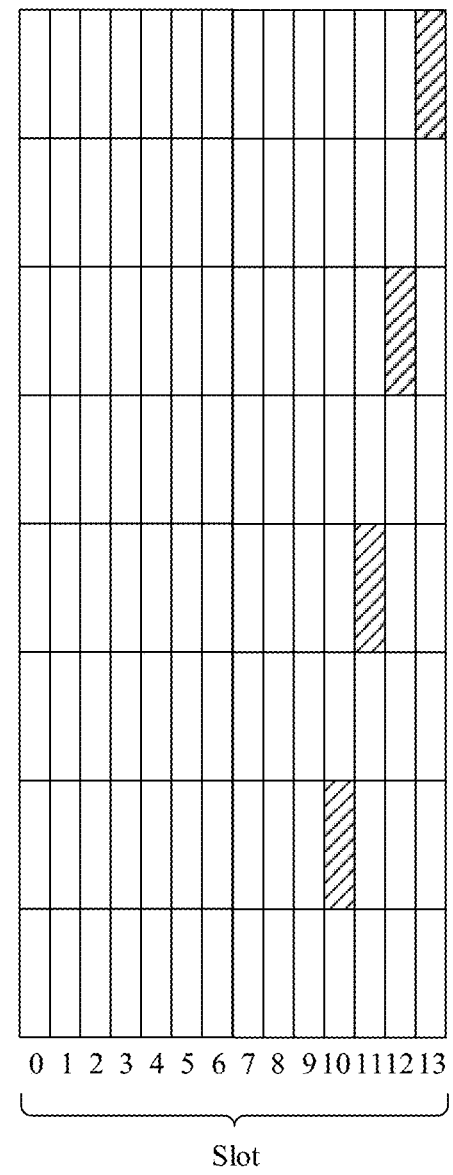
Figure 21C:
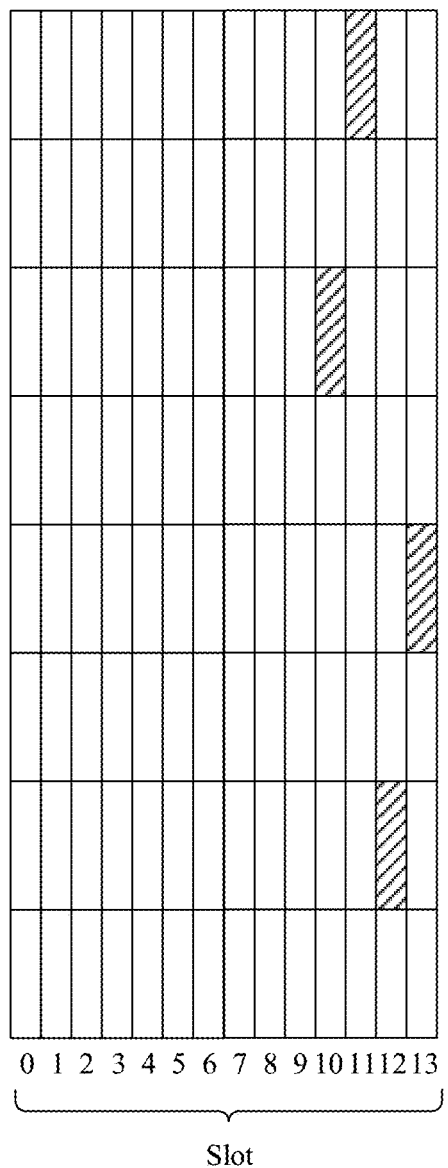
Figure 21D:
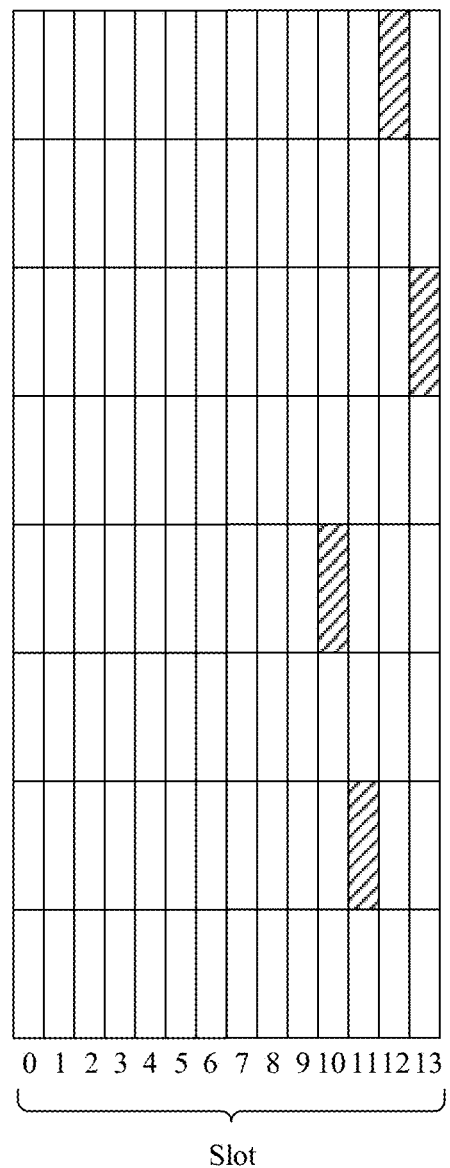
Figure 24:
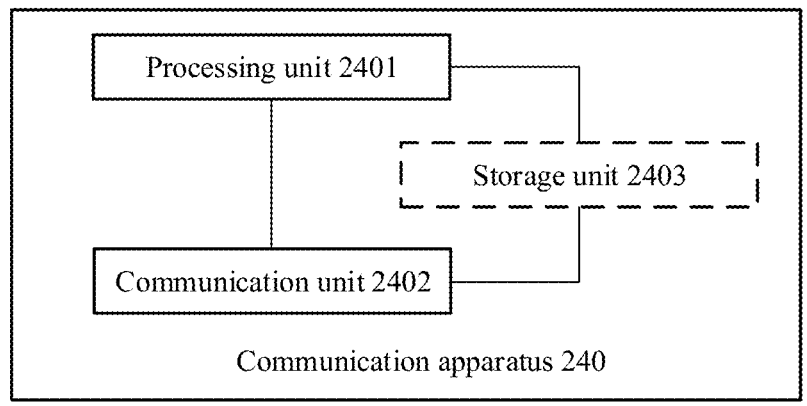
FIG. 24 is a schematic composition diagram of a communication apparatus according to an embodiment of this application.

If one sequence includes 48 elements, based on FIG. 20(a), 24 elements in REs that are used to carry the first RS and that are on a time-frequency resource including an OFDM #13 and a frequency domain resource segment 1 (including subcarriers whose indexes are 0 to 47) may be the first 24 elements in the sequence, and 24 elements in REs that are used to carry the first RS and that are on a time-frequency resource including the OFDM #13 and a frequency domain resource segment 2 (including subcarriers whose indexes are 96 to 143) may be the last 24 elements in the sequence.

Based on FIG. 20(b), 24 elements in REs that are used to carry the first RS and that are on a time-frequency resource including an OFDM #13 and a frequency domain resource segment 1 (including subcarriers whose indexes are 0 to 47) may be the first 24 elements in the sequence, and 24 elements in REs that are used to carry the first RS and that are on a time-frequency resource including an OFDM #12 and a frequency domain resource segment 2 (including subcarriers whose indexes are 96 to 143) may be the last 24 elements in the sequence.

The first RSs carried on different frequency domain resource segments in the n frequency domain resource segments include some or all elements in respective corresponding sequences. For example, based on FIG. 20(a), in one case, 24 elements in REs that are used to carry the first RS and that are on a time-frequency resource including an OFDM #13 and a frequency domain resource segment 1 may be the first 24 elements in a first sequence, and 24 elements in REs that are used to carry the first RS and that are on a time-frequency resource including the OFDM #13 and a frequency domain resource segment 2 may be the first 24 elements in a second sequence. In another case, 24 elements in REs that are used to carry the first RS and that are on a time-frequency resource including an OFDM #13 and a frequency domain resource segment 1 may be the first 24 elements in a first sequence, and 24 elements in REs that are used to carry the first RS and that are on a time-frequency resource including the OFDM #13 and a frequency domain resource segment 2 may be the last 24 elements in a second sequence.

For example, based on FIG. 20(b), in one case, 24 elements in REs that are used to carry the first RS and that are on a time-frequency resource including an OFDM #13 and a frequency domain resource segment 1 may be the last 24 elements in a first sequence, and 24 elements in REs that are used to carry the first RS and that are on a time-frequency resource including an OFDM #12 and a frequency domain resource segment 2 may be the first 24 elements in a second sequence. In another case, 24 elements in REs that are used to carry the first RS and that are on a time-frequency resource including an OFDM #13 and a frequency domain resource segment 1 may be the first 24 elements in a first sequence, and 24 elements in REs that are used to carry the first RS and that are on a time-frequency resource including an OFDM #12 and a frequency domain resource segment 2 may be the last 24 elements in a second sequence.

In addition to the above feature 1 to feature 5:

Discontinuous distribution of the n frequency domain resource segment spacings may be represented in a same OFDM symbol in one time domain unit. For example, referring to FIG. 9(a), the four frequency domain resource segments on the OFDM #13 are in discontinuous distribution. Referring to FIG. 9(b), the four frequency domain resource segments on the OFDM #12 and the OFDM #13 are separately in discontinuous distribution.

Discontinuous distribution of the n frequency domain resource segment spacings may alternatively be represented in different OFDM symbols in one time domain unit. For example, referring to FIG. 13(b), the three frequency domain resource segments on the OFDM #11, the OFDM #12, and the OFDM #13 are in discontinuous distribution. Referring to FIG. 17(c), the four frequency domain resource segments on the OFDM #12 and the OFDM #13 are in discontinuous distribution.

In addition, for one time domain unit, if frequency domain positions of frequency domain resource segments on any two of X OFDM symbol groups carrying the first RS are different, there may be X! types of frequency domain distribution positions of the frequency domain resource segments in one time domain unit. In this embodiment of this application, some cases are shown in the accompanying drawings, but there may be any one of the X! cases during specific implementation.

OFDM symbols whose frequency domain positions in the frequency domain resource segment are the same belong to one OFDM symbol group. It may be understood that a quantity of OFDM symbol groups is the same as a quantity of frequency domain resource segments. For example, referring to FIG. 9(b), the OFDM #12 and the OFDM #13 belong to one OFDM symbol group. Referring to FIG. 9(c), the OFDM #11, the OFDM #12, and the OFDM #13 belong to one OFDM symbol group. Referring to FIG. 11(b), the OFDM #7 and the OFDM #8 belong to one OFDM symbol group, and the OFDM #12 and the OFDM #13 belong to another OFDM symbol group. Referring to FIG. 13(b), each of the OFDM #11, the OFDM #12, and the OFDM #13 belongs to one OFDM symbol group.

For example, it is assumed that a quantity X of OFDM symbol groups is 4, in the four OFDM symbol groups, a first OFDM symbol group includes the OFDM #13, a second OFDM symbol group includes the OFDM #12, a third OFDM symbol group includes the OFDM #11, and a fourth OFDM symbol group includes an OFDM #10. There are four possible positions of a first frequency domain resource segment in the four frequency domain resource segments in the first OFDM symbol group. There are three possible positions of a second frequency domain resource segment in the four frequency domain resource segments in the second OFDM symbol group. There are two possible positions of a third frequency domain resource segment in the four frequency domain resource segments in the third OFDM symbol group. There is one possible position of a fourth frequency domain resource segment in the four OFDM symbol group in the four frequency domain resource segments. Therefore, there are a total of 4!=24 distribution manners of the four frequency domain resource segments in the four OFDM symbol groups. For example, FIG. 21(a), FIG. 21(b), FIG. 21(c), and FIG. 21(d) show four of the 24 types of distribution manners of the four frequency domain resource segments in the four OFDM symbol groups.

Figure 22B:
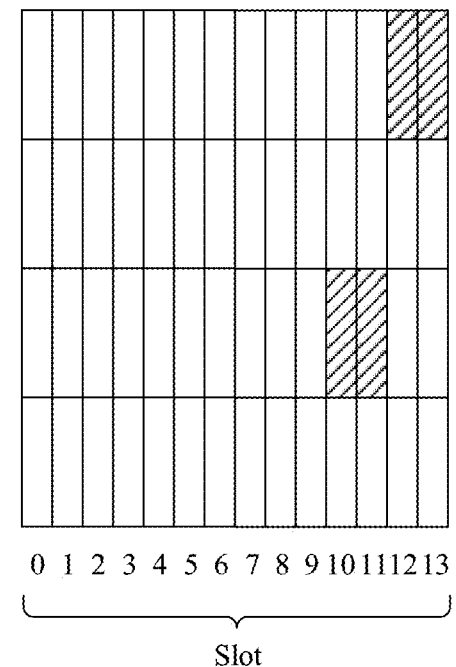

For example, it is assumed that the quantity X of OFDM symbol groups is 2, a first OFDM symbol group in the two OFDM symbol groups includes an OFDM #13 and an OFDM #12, and a second OFDM symbol group includes an OFDM #11 and an OFDM #10. There are two possible positions of a first frequency domain resource segment in the two frequency domain resource segments in the first OFDM symbol group. There is one possible position of a second frequency domain resource segment in the two frequency domain resource segments in the second OFDM symbol group. Therefore, there are a total of 2!=2 possible distribution manners. For example, FIG. 22(a) and FIG. 22(b) show the two types of possible distribution manners.

Figure 23A:
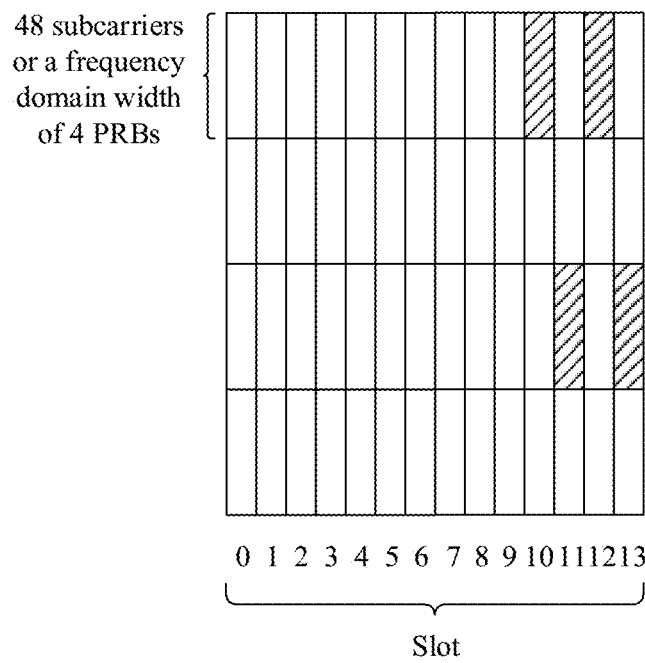
Figure 23B:
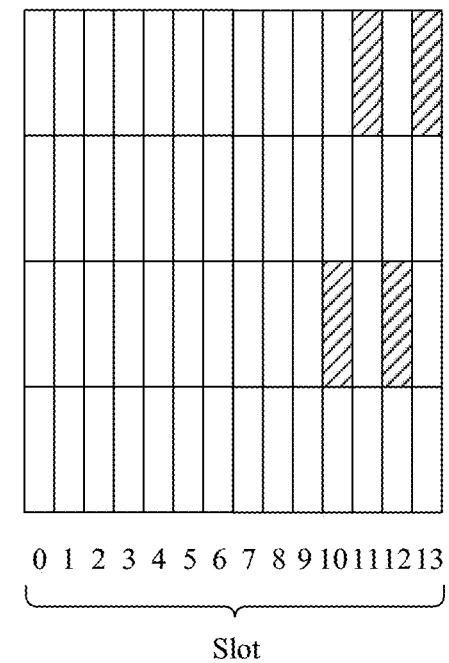

For example, it is assumed that the quantity X of OFDM symbol groups is 2, a first OFDM symbol group in the two OFDM symbol groups includes an OFDM #13 and an OFDM #11, and a second OFDM symbol group includes an OFDM #12 and an OFDM #10. There are two possible positions of a first frequency domain resource segment in the two frequency domain resource segments in the first OFDM symbol group. There is one possible position of a second frequency domain resource segment in the two frequency domain resource segments in the second OFDM symbol group. Therefore, there are a total of 2!=2 possible distribution manners. For example, FIG. 23(a) and FIG. 23(b) show the two types of possible distribution manners.

In the embodiments of this application, FIG. 7(a) to FIG. 7(d), FIG. 9(a) to FIG. 9(d), FIG. 11(a) to FIG. 11(c), FIG. 13(a) to FIG. 13(c), FIG. 15(a) to FIG. 15(c), and FIG. 17(a) to FIG. 17(d) are drawn by using an example in which a frequency domain width of a frequency domain resource segment is a frequency domain width of 2 PRBs or 24 subcarriers, FIG. 8(a) to FIG. 8(d), FIG. 10(a) to FIG. 10(d), FIG. 12(a) to FIG. 12(c), FIG. 14(a) to FIG. 14(c), FIG. 16(a) to FIG. 16(c), and FIG. 18(a) to FIG. 18(d) are drawn by using an example in which a frequency domain width of a frequency domain resource segment is a frequency domain width of 4 PRBs or 48 subcarriers, FIG. 19(a) and FIG. 19(b) are drawn by using an example in which a frequency domain width of a frequency domain resource segment is 12 subcarriers, and FIG. 20(a) and FIG. 20(b), FIG. 21(a) to FIG. 21(d), FIG. 22(a) and FIG. 22(b), and FIG. 23(a) and FIG. 23(b) are drawn by using an example in which a frequency domain width of a frequency domain resource segment is 48 subcarriers. The frequency domain widths of the frequency domain resource segments in the figures are merely examples, and are not limitations on the frequency domain widths of the frequency domain resource segments. In actual implementation, the frequency domain width of the frequency domain resource segment may alternatively be a width (for example, a frequency domain width of 8 PRBs) other than that shown in the figures. This is not specifically limited in the embodiments of this application.

The foregoing mainly describes the solutions in the embodiments of this application from a perspective of interaction between the network elements. It may be understood that to implement the foregoing functions, the network elements, for example, the network device and the terminal, include at least one of corresponding hardware structures and software modules for implementing the functions. A person skilled in the art should easily be aware that, in combination with units and algorithm steps of the examples described in this embodiment disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that in the embodiments of this application, division into the units is an example and is merely logical function division, and may be other division in an actual implementation.

When the integrated unit is used, FIG. 24 is a possible schematic structural diagram of the communication apparatus (denoted as a communication apparatus 240) in the foregoing embodiments. The communication apparatus 240 includes a processing unit 2401 and a communication unit 2402, and may further include a storage unit 2403. The schematic structural diagram shown in FIG. 24 may be used to show structures of the network device and the terminal in the foregoing embodiments.

When the schematic structural diagram shown in FIG. 24 is used to illustrate a structure of the terminal in the foregoing embodiments, the processing unit 2401 is configured to control and manage actions of the terminal. For example, the processing unit 2401 is configured to support the terminal in performing 401 and 402 in FIG. 4 and some or all of actions performed by the terminal in another process described in the embodiments of this application. The processing unit 2401 may communicate with another network entity through the communication unit 2402, for example, communicate with the network device shown in FIG. 4. The storage unit 2403 is configured to store program code and data of the terminal.

When the schematic structural diagram shown in FIG. 24 is used to show the structure of the terminal in the foregoing embodiments, the communication apparatus 240 may be a terminal, or may be a chip in a terminal.

When the schematic structural diagram shown in FIG. 24 is used to illustrate a structure of the network device in the foregoing embodiments, the processing unit 2401 is configured to control and manage actions of the network device. For example, the processing unit 2401 is configured to support the network device in performing 402 and 403 in FIG. 4 and some or all of actions performed by the network device in another process described in the embodiments of this application. The processing unit 2401 may communicate with another network entity through the communication unit 2402, for example, communicate with the terminal shown in FIG. 4. The storage unit 2403 is configured to store program code and data of the network device.

When the schematic structural diagram shown in FIG. 24 is used to show the structure of the network device in the foregoing embodiments, the communication apparatus 240 may be a network device, or may be a chip in a network device.

When the communication apparatus 240 is the terminal or the network device, the processing unit 2401 may be a processor or a controller, and the communication unit 2402 may be a communication interface, a transceiver, a transceiver, a transceiver circuit, a transceiver apparatus, or the like. The communication interface is a collective term, and may include one or more interfaces. The storage unit 2403 may be a memory. When the communication apparatus 240 is a chip in the terminal or the network device, the processing unit 2401 may be a processor or a controller, and the communication unit 2402 may be an input/output interface, a pin, a circuit, or the like. The storage unit 2403 may be a storage unit (for example, a register or a cache) in the chip, or may be a storage unit (for example, a read-only memory or a random access memory) that is in the terminal or the network device and that is located outside the chip.

The communication unit may also be referred to as a transceiver unit. An antenna and a control circuit that have receiving and sending functions in the communication apparatus 240 may be considered as the communication unit 2402 in the communication apparatus 240, and a processor that has a processing function in the communication apparatus 240 may be considered as the processing unit 2401 in the communication apparatus 240. Optionally, a component configured to implement a receiving function in the communication unit 2402 may be considered as a receiving unit. The receiving unit is configured to perform a receiving step in the embodiments of this application. For example, the receiving unit in the network device may be configured to receive the first RS, and may be further configured to receive the second RS. The receiving unit in the terminal may be configured to receive the configuration information. The receiving unit may be a receiver, a receiver, a receiver circuit, or the like. A component configured to implement a sending function in the communication unit 2402 may be considered as a sending unit. The sending unit is configured to perform a sending step in the embodiments of this application. For example, the sending unit in the network device may be configured to send the configuration information, and the sending unit in the terminal may be configured to send the first RS, or may be configured to send the second RS. The sending unit may be a transmitter, a transmitter, a transmitter circuit, or the like.

When an integrated unit in FIG. 24 is implemented in a form of a software function module and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor (processor) to perform all or some of the steps of the methods in the embodiments of this application. The storage medium that stores the computer software product includes any medium that can store program code, for example, a USB flash drive, a removable hard disk, a read-only memory (read-only memory, ROM for short), a random access memory (random access memory, RAM for short), a magnetic disk, or an optical disc.

The unit in FIG. 24 may alternatively be referred to as a module. For example, the processing unit may be referred to as a processing module.

Figure 25:
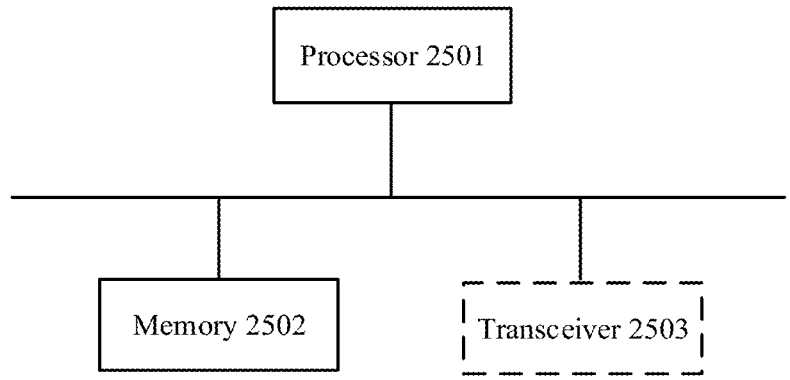
FIG. 25 and FIG. 26 are respectively schematic structural diagrams of hardware of a communication apparatus according to an embodiment of this application.
Figure 26:
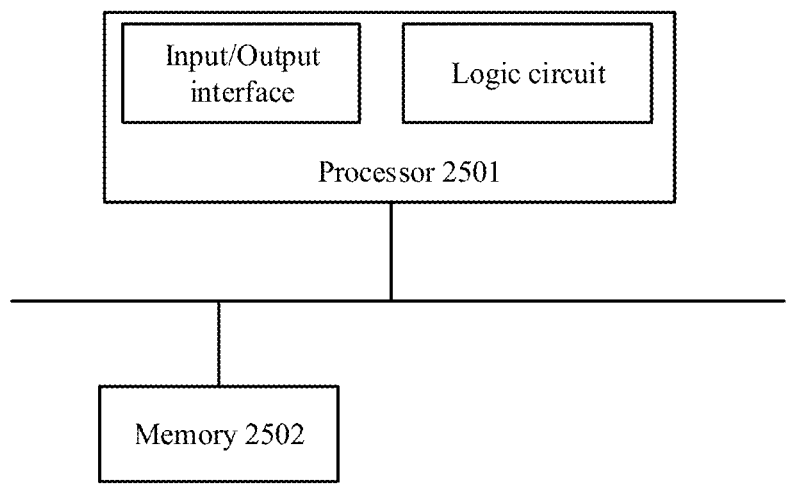

An embodiment of this application further provides a schematic structural diagram of hardware of a communication apparatus. Referring to FIG. 25 or FIG. 26, the communication apparatus includes a processor 2501, and optionally, further includes a memory 2502 connected to the processor 2501.

The processor 2501 may be a general-purpose central processing unit (central processing unit, CPU for short), a microprocessor, an application-specific integrated circuit (application-specific integrated circuit, ASIC for short), or one or more integrated circuits configured to control program execution in the solutions in this application. The processor 2501 may alternatively include a plurality of CPUs, and the processor 2501 may be a single-core (single-CPU) processor or a multi-core (multi-CPU) processor. The processor herein may refer to one or more devices, circuits, or processing cores configured to process data (for example, computer program instructions).

The memory 2502 may be a ROM or another type of static storage device that can store static information and instructions, or a RAM or another type of dynamic storage device that can store information and instructions, or may be an electrically erasable programmable read-only memory (electrically erasable programmable read-only memory, EEPROM for short), a compact disc read-only memory (compact disc read-only memory, CD-ROM for short) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, this is not limited in this embodiment of this application. The memory 2502 may exist independently, or may be integrated into the processor 2501. The memory 2502 may include computer program code. The processor 2501 is configured to execute the computer program code stored in the memory 2502, to implement a method provided in the embodiments of this application.

In a first possible implementation, referring to FIG. 25, the communication apparatus further includes a transceiver 2503. The processor 2501, the memory 2502, and the transceiver 2503 are connected through a bus. The transceiver 2503 is configured to communicate with another device or a communication network. Optionally, the transceiver 2503 may include a transmitter and a receiver. A component configured to implement a receiving function in the transceiver 2503 may be considered as a receiver. The receiver is configured to perform a receiving step in the embodiments of this application. For example, the receiver in the network device may be configured to receive the first RS, and may be further configured to receive the second RS. The receiver in the terminal may be configured to receive the configuration information. A component configured to implement a sending function in the transceiver 2503 may be considered as a transmitter. The transmitter is configured to perform a sending step in the embodiments of this application. For example, the transmitter in the network device may be configured to send the configuration information, and the transmitter in the terminal may be configured to send the first RS, or may be configured to send the second RS.

Based on the first possible implementation, the schematic structural diagram shown in FIG. 25 may be used to show a structure of the network device or the terminal in the foregoing embodiments.

When the schematic structural diagram shown in FIG. 25 is used to illustrate a structure of the terminal in the foregoing embodiments, the processor 2501 is configured to control and manage actions of the terminal. For example, the processor 2501 is configured to support the terminal in performing 401 and 402 in FIG. 4 and some or all of actions performed by the terminal in another process described in the embodiments of this application. The processor 2501 may communicate with another network entity through the transceiver 2503, for example, communicate with the network device shown in FIG. 4. The memory 2502 is configured to store program code and data of the terminal.

When the schematic structural diagram shown in FIG. 25 is used to illustrate a structure of the network device in the foregoing embodiments, the processor 2501 is configured to control and manage actions of the network device. For example, the processor 2501 is configured to support the network device in performing 402 and 403 in FIG. 4 and some or all of actions performed by the network device in another process described in the embodiments of this application. The processor 2501 may communicate with another network entity through the transceiver 2503, for example, communicate with the terminal shown in FIG. 4. The memory 2502 is configured to store program code and data of the network device.

In a second possible implementation, the processor 2501 includes a logic circuit and at least one of an input interface and an output interface. The output interface is configured to perform a sending action in a corresponding method. For example, the output interface in the network device may be configured to send the configuration information, and the output interface in the terminal may be configured to send the first RS, or may be configured to send the second RS. The input interface is configured to perform a receiving action in a corresponding method. For example, the input interface in the network device may be configured to receive the first RS, and may be further configured to receive the second RS. The input interface in the terminal may be configured to receive the configuration information.

Based on the second possible implementation, referring to FIG. 26, the schematic structural diagram shown in FIG. 26 may be used to show a structure of the network device or the terminal in the foregoing embodiments.

When the schematic structural diagram shown in FIG. 26 is used to illustrate a structure of the terminal in the foregoing embodiments, the processor 2501 is configured to control and manage actions of the terminal. For example, the processor 2501 is configured to support the terminal in performing 401 and 402 in FIG. 4 and some or all of actions performed by the terminal in another process described in the embodiments of this application. The processor 2501 may communicate with another network entity through at least one of the input interface and the output interface, for example, communicate with the network device shown in FIG. 4. The memory 2502 is configured to store program code and data of the terminal.

When the schematic structural diagram shown in FIG. 26 is used to illustrate a structure of the network device in the foregoing embodiments, the processor 2501 is configured to control and manage actions of the network device. For example, the processor 2501 is configured to support the network device in performing 402 and 403 in FIG. 4 and some or all of actions performed by the network device in another process described in the embodiments of this application. The processor 2501 may communicate with another network entity through at least one of the input interface and the output interface, for example, communicate with the terminal shown in FIG. 4. The memory 2502 is configured to store program code and data of the network device.

In addition, an embodiment of this application further provides a schematic structural diagram of hardware of a terminal (denoted as a terminal 270) and a network device (denoted as a network device 280). For details, refer to FIG. 27 and FIG. 28.

Figure 27:
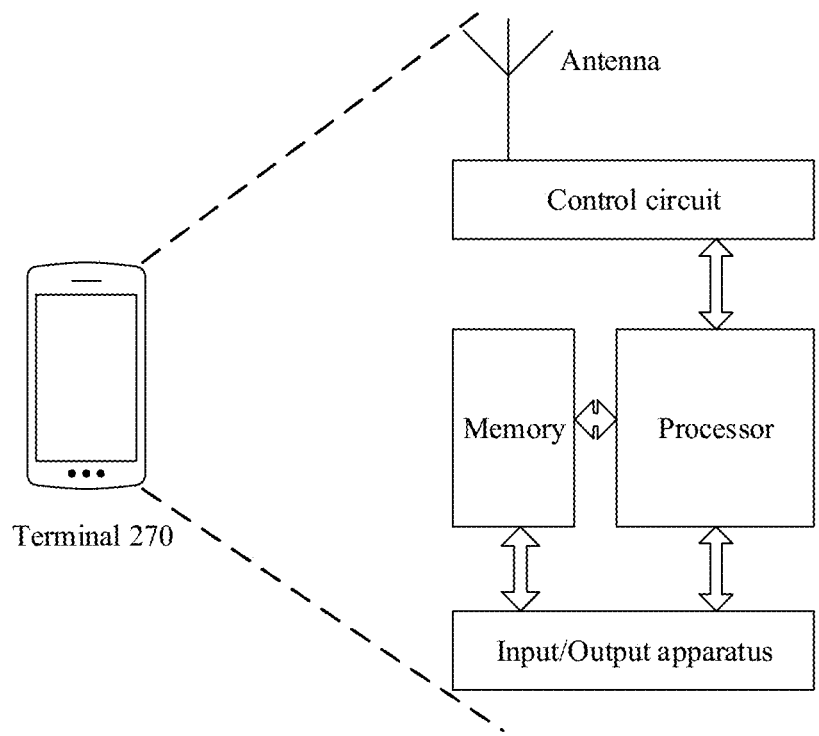
FIG. 27 is a schematic diagram of a hardware structure of a terminal according to an embodiment of this application.

FIG. 27 is a schematic structural diagram of hardware of the terminal 270. For ease of description, FIG. 27 shows only main components of the terminal. As shown in FIG. 27, the terminal 270 includes a processor, a memory, a control circuit, an antenna, and an input/output apparatus.

The processor is mainly configured to: process a communication protocol and communication data, control the entire terminal, execute a software program, and process data of the software program. For example, the processor is configured to control the terminal to perform 401 and 402 in FIG. 4, and perform some or all actions performed by the terminal in another process described in this embodiment of this application. The memory is mainly configured to store the software program and data. The control circuit (which may also be referred to as a radio frequency circuit) is mainly configured to: perform conversion between a baseband signal and a radio frequency signal, and process the radio frequency signal. A combination of the control circuit and the antenna may also be referred to as a transceiver that is mainly configured to send and receive a radio frequency signal in an electromagnetic wave form. The input/output apparatus such as a touchscreen, a display, or a keyboard is mainly configured to receive data entered by a user, and output data to the user.

After the terminal is powered on, the processor can read the software program in the memory, interpret and execute instructions of the software program, and process the data of the software program. When data (for example, the first RS and the second RS) needs to be sent through the antenna, the processor performs baseband processing on the to-be-sent data, and outputs a baseband signal to the control circuit in the control circuit. After performing radio frequency processing on the baseband signal, the control circuit sends the radio frequency signal in the form of the electromagnetic wave through the antenna. When data (for example, the configuration information) is sent to the terminal, the control circuit receives the radio frequency signal through the antenna, converts the radio frequency signal into a baseband signal, and outputs the baseband signal to the processor. The processor converts the baseband signal into data, and processes the data (for example, determines, based on the configuration information, one or more of the sequence carried and the time-frequency resource occupied by the frequency domain resource segment that sends the first RS).

A person skilled in the art may understand that for ease of description, FIG. 27 shows only one memory and one processor. An actual terminal may include a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data, and the central processing unit is mainly configured to: control the entire terminal, execute the software program, and process the data of the software program. The processor in FIG. 27 integrates functions of the baseband processor and the central processing unit. A person skilled in the art may understand that the baseband processor and the central processing unit may be independent processors, and are connected to each other by using technologies such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

Figure 28:
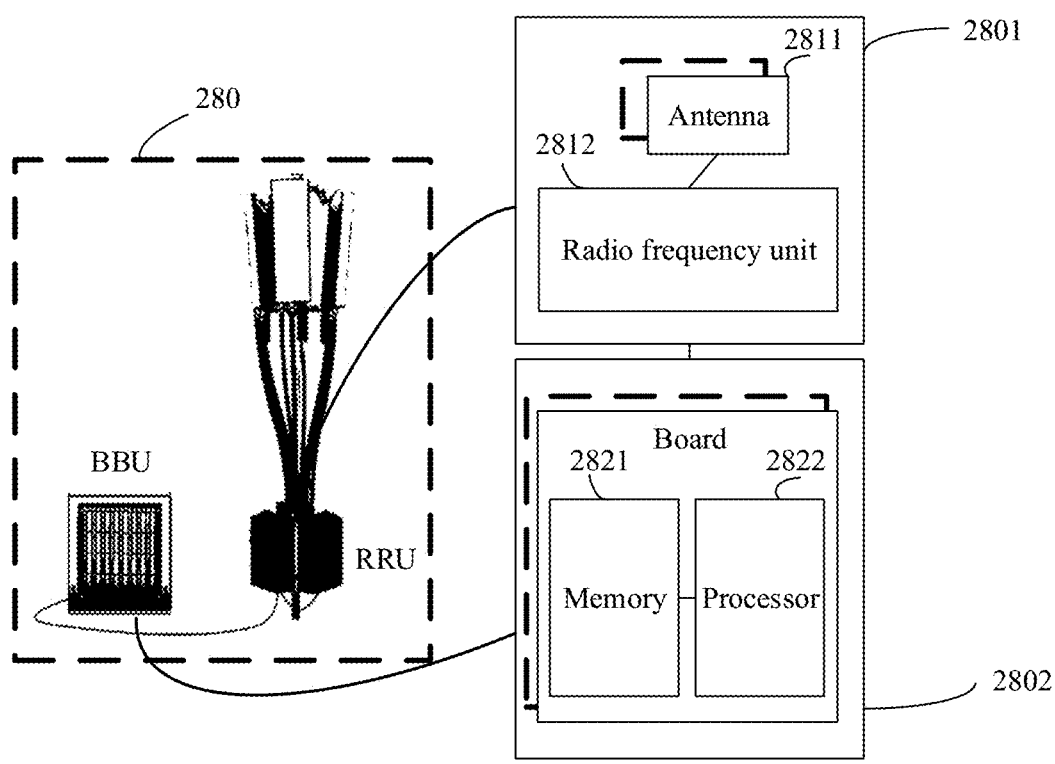
FIG. 28 is a schematic diagram of a hardware structure of a network device according to an embodiment of this application.

FIG. 28 is a schematic structural diagram of hardware of the network device 280. The network device 280 may include one or more radio frequency units, such as a remote radio unit (remote radio unit, RRU for short) 2801 and one or more baseband units (baseband unit, BBU for short) (which may also be referred to as digital unit (digital unit, DU for short)) 2802.

The RRU 2801 may be referred to as a transceiver unit, a transceiver, a transceiver circuit, a transceiver, or the like, and may include at least one antenna 2811 and a radio frequency unit 2812. The RRU 2801 is mainly configured to: send and receive a radio frequency signal and perform conversion between a radio frequency signal and a baseband signal. The RRU 2801 and the BBU 2802 may be physically disposed together, or may be physically separated, for example, a distributed base station.

The BBU 2802 is a control center of the network device, may be referred to as a processing unit, and is mainly configured to complete baseband processing functions such as channel coding, multiplexing, modulation, and spectrum spreading.

In an embodiment, the BBU 2802 may include one or more boards. A plurality of boards may jointly support a radio access network (such as an LTE network) of a single access standard, or may separately support radio access networks (such as an LTE network, a 5G network, or another network) of different access standards. The BBU 2802 further includes a memory 2821 and a processor 2822. The memory 2821 is configured to store necessary instructions and data. The processor 2822 is configured to control the network device to perform a necessary action. The memory 2821 and the processor 2822 may serve the one or more boards. In other words, a memory and a processor may be separately disposed on each board. Alternatively, a plurality of boards may share a same memory and a same processor. In addition, a necessary circuit may be further disposed on each board.

It should be understood that the processor 280 shown in FIG. 28 is capable of supporting the network device in performing 402 and 403 in FIG. 4 and some or all of actions performed by the network device in another process described in the embodiments of this application. Operations, functions, or operations and functions of modules in the network device 280 are respectively disposed to implement corresponding procedures performed in the method embodiments. For details, refer to the descriptions in the foregoing method embodiments. To avoid repetition, detailed descriptions are properly omitted herein.

In an implementation process, the steps of the methods in the embodiments may be performed by using a hardware integrated logic circuit in the processor, or by using instructions in a form of software. The steps of the method disclosed with reference to the embodiments of this application may be directly performed by a hardware processor, or may be performed by using a combination of hardware and software modules in the processor. For other descriptions about the processors in FIG. 27 and FIG. 28, refer to the descriptions related to the processors in FIG. 25 and FIG. 26. Details are not described again.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing network device and the foregoing terminal.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of "a plurality". A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to this application without departing from the spirit and scope of this application. Correspondingly, the specification and accompanying drawings are merely example descriptions of this application defined by the appended claims, and are considered as any of or all modifications, variations, combinations or equivalents that cover the scope of this application. Clearly, a person skilled in the art can make various modifications and variations to this application without departing from the spirit and scope of this application. In this way, this application is intended to cover these modifications and variations of this application provided that they fall within the scope of the claims of this application and equivalent technologies thereof

What is claimed is:

1. A channel state information (CSI) measurement apparatus, comprising:
   a memory configured to store computer-executable instructions; and
   a processor connected to the memory, wherein the processor is configured to execute the computer-executable instructions to perform operations for:
   receiving a first reference signal (RS) sent by a terminal, wherein the first RS is configured for measuring CSI; the first RS occupies n frequency domain resource segments in a time domain unit, and the n frequency domain resource segments are discontinuously distributed on a frequency band of the terminal; and the time domain unit includes a plurality of consecutive orthogonal frequency division multiplexing (OFDM) symbols, and n is an integer greater than 1; and measuring the CSI based on the first RS;

wherein there are n−1 frequency domain resource segment spacings between the n frequency domain resource segments, the frequency domain resource segment spacing is a spacing between two adjacent frequency domain resource segments of the n frequency domain resource segments.

2. The apparatus according to claim 1, wherein the processor is further configured to perform operations for:

sending configuration information to the terminal, wherein the configuration information is used to configure a sequence carried on each of the n frequency domain resource segments or a time-frequency resource occupied by each of the n frequency domain resource segments, and the time-frequency resource comprises a time domain resource and a frequency domain resource.

3. The apparatus according to claim 1, wherein the processor is further configured to perform operations for:

receiving a second RS from the terminal, wherein the second RS is configured for measuring the CSI, and at least some of antenna ports that are of the terminal and that correspond to RS ports comprised in the second RS are the same as antenna ports that are of the terminal and that correspond to RS ports that transmit the first RS; and wherein the measuring the CSI based on the first CSI includes measuring the CSI based on the first RS and the second RS.

4. The apparatus according to claim 1, wherein quantities of frequency domain units in any two of the n frequency domain resource segments are the same, or the quantities of frequency domain units in at least two of the n frequency domain resource segments are different.

5. The apparatus according to claim 1, wherein quantities of frequency domain units in any two adjacent frequency domain resource segment spacings of the n−1 frequency domain resource segment spacings are the same, or the quantities of frequency domain units of at least two of the n−1 frequency domain resource segment spacings are different.

6. The apparatus according to claim 1, wherein the n frequency domain resource segments are located on one or more OFDM symbols in the last m OFDM symbols of the plurality of consecutive OFDM symbols in the time domain unit, and m is an integer greater than 0 and less than or equal to 14.

7. The apparatus according to claim 1, wherein the apparatus includes a network device, a chip, or a chip system.

8. A channel state information (CSI) measurement method, comprising:

determining a first reference signal (RS), wherein the first RS is configured for measuring CSI; and sending the first RS to a network device, wherein the first RS occupies n frequency domain resource segments in a time domain unit, and the n frequency domain resource segments are discontinuously distributed on a frequency band of a terminal; and the time domain unit includes a plurality of consecutive orthogonal frequency division multiplexing (OFDM) symbols, and n is an integer greater than 1;

wherein there are n−1 frequency domain resource segment spacings between the n frequency domain resource segments, the frequency domain resource segment spacing is a spacing between two adjacent frequency domain resource segments of the n frequency domain resource segments.

9. The method according to claim 8, wherein the method further comprises:

receiving configuration information from the network device, wherein the configuration information configures a sequence carried on each of the n frequency domain resource segments or a time-frequency resource occupied by each of the n frequency domain resource segments, and the time-frequency resource comprises a time domain resource and a frequency domain resource; and the sending the first RS to a network device comprises: sending the first RS to the network device based on the configuration information.

10. The method according to claim 8, wherein the method further comprises:

sending a second RS to the network device, wherein the second RS is configured for measuring the CSI, and at least some of antenna ports that are of the terminal and that correspond to RS ports that transmit the second RS are the same as antenna ports that are of the terminal and that correspond to RS ports that transmit the first RS.

11. The method according to claim 8, wherein quantities of frequency domain units in any two of the n frequency domain resource segments are the same, or the quantities of frequency domain units in at least two of the n frequency domain resource segments are different.

12. The method according to claim 8, wherein quantities of frequency domain units in any two adjacent frequency domain resource segment spacings of the n−1 frequency domain resource segment spacings are the same, or the quantities of frequency domain units in at least two of the n−1 frequency domain resource segment spacings are different.

13. The method according to claim 8, wherein the n frequency domain resource segments are located on one or more OFDM symbols in the last m OFDM symbols of the plurality of consecutive OFDM symbols in the time domain unit, and m is an integer greater than 0 and less than or equal to 14.

14. A channel state information (CSI) measurement apparatus, comprising:

a memory configured to store computer-executable instructions; and a processor connected to the memory, wherein the processor is configured to execute the computer-executable instructions to perform operations for:

determining a first reference signal (RS), wherein the first RS is configured for measuring CSI; and sending the first RS to a network device, wherein the first RS occupies n frequency domain resource segments in a time domain unit, and the n frequency domain resource segments are discontinuously distributed on a frequency band of a terminal; and the time domain unit includes a plurality of consecutive orthogonal frequency division multiplexing (OFDM) symbols, and n is an integer greater than 1;

wherein there are n−1 frequency domain resource segment spacings between the n frequency domain resource segments, the frequency domain resource segment spacing is a spacing between two adjacent frequency domain resource segments of the n frequency domain resource segments.

15. The apparatus according to claim 14, wherein the processor is further configured to perform operations for:
- receiving configuration information from the network device, wherein the configuration information configures a sequence carried on each of the n frequency domain resource segments or a time-frequency resource occupied by each of the n frequency domain resource segments, and the time-frequency resource comprises a time domain resource and a frequency domain resource; and
- the sending the first RS to a network device includes: sending the first RS to the network device based on the configuration information.

16. The apparatus according to claim 14, wherein the processor is further configured to perform operations for:
- sending a second RS to the network device, wherein the second RS is configured for measuring the CSI, and at least some of antenna ports that are of the terminal and that correspond to RS ports comprised in the second RS are the same as antenna ports that are of the terminal and that correspond to RS ports comprised in that transmit the first RS.

17. The apparatus according to claim 14, wherein quantities of frequency domain units in any two of the n frequency domain resource segments are the same, or the quantities of frequency domain units in at least two of the n frequency domain resource segments are different.

18. The apparatus according to claim 14, wherein quantities of frequency domain units comprised in any two adjacent frequency domain resource segment spacings of the n−1 frequency domain resource segment spacings are the same, or the quantities of frequency domain units in at least two of the n−1 frequency domain resource segment spacings are different.

19. The apparatus according to claim 14, wherein the n frequency domain resource segments are located on one or more OFDM symbols in the last m OFDM symbols of the plurality of consecutive OFDM symbols in the time domain unit, and m is an integer greater than 0 and less than or equal to 14.

20. The apparatus according to claim 14, wherein the apparatus includes a terminal device, a chip, or a chip system.

* * * * *